US012244782B2

(12) United States Patent
Jayaram et al.

(10) Patent No.: US 12,244,782 B2
(45) Date of Patent: Mar. 4, 2025

(54) AUGMENTED REALITY SYSTEM FOR REMOTE PRESENTATION FOR VIEWING AN EVENT

(71) Applicant: Quintar, Inc., Santa Clara, CA (US)

(72) Inventors: Sankar Jayaram, Los Gatos, CA (US); Wayne O. Cochran, Ridgefield, WA (US); John Harrison, Hillsboro, OR (US); Timothy P. Heidmann, Los Altos, CA (US); Thomas Sahara, Atlanta, GA (US); John Buddy Scott, Lawrenceville, CA (US)

(73) Assignee: Quintar, Inc., Santa Clara, CA (US)

( * ) Notice: Subject to any disclaimer, the term of this patent is extended or adjusted under 35 U.S.C. 154(b) by 791 days.

(21) Appl. No.: 17/519,121

(22) Filed: Nov. 4, 2021

(65) Prior Publication Data

US 2022/0295032 A1 Sep. 15, 2022

Related U.S. Application Data

(63) Continuation-in-part of application No. 17/242,275, filed on Apr. 27, 2021, now Pat. No. 11,645,819, and (Continued)

(51) Int. Cl.
*H04N 13/111* (2018.01)
*G06T 19/00* (2011.01)
(Continued)

(52) U.S. Cl.
CPC .......... *H04N 13/111* (2018.05); *G06T 19/006* (2013.01); *G06V 10/255* (2022.01); *G06V 20/46* (2022.01); *H04N 13/344* (2018.05)

(58) Field of Classification Search
None
See application file for complete search history.

(56) References Cited

U.S. PATENT DOCUMENTS

| 5,742,521 A | 4/1998 | Ellenby et al. |
| 5,850,352 A | 12/1998 | Moezzi et al. |
(Continued)

FOREIGN PATENT DOCUMENTS

WO    WO2015/192117 A1    12/2015

OTHER PUBLICATIONS

International Search Report & The Written Opinion of the International Searching Authority dated Jul. 22, 2022, International Application No. PCT/US2022/019226.
(Continued)

*Primary Examiner* — Ryan M Gray
(74) *Attorney, Agent, or Firm* — Pearl Cohen Zedek Latzer Baratz LLP

(57) ABSTRACT

Augmented reality systems provide graphics over views from a mobile device for both in-venue and remote viewing of a sporting or other event. A server system can provide a transformation between the coordinate system of a mobile device (mobile phone, tablet computer, head mounted display) and a real world coordinate system. Requested graphics for the event are displayed over a view of an event. In a tabletop presentation, video of the event can be displayed with augmented reality graphics overlays at a remote location.

20 Claims, 35 Drawing Sheets

Related U.S. Application Data a continuation-in-part of application No. 17/242,265, filed on Apr. 27, 2021, now Pat. No. 12,003,806, and a continuation-in-part of application No. 17/242,270, filed on Apr. 27, 2021, now Pat. No. 11,527,047, and a continuation-in-part of application No. 17/242,267, filed on Apr. 27, 2021, now Pat. No. 11,657,578.

(60) Provisional application No. 63/159,870, filed on Mar. 11, 2021.

(51) Int. Cl.
*G06V 10/20* (2022.01)
*G06V 20/40* (2022.01)
*H04N 13/344* (2018.01)

(56) References Cited

U.S. PATENT DOCUMENTS

| | | |
|---|---|---|
| 5,862,517 A | 1/1999 | Honey et al. |
| 5,912,700 A | 6/1999 | Honey et al. |
| 8,016,653 B2 | 9/2011 | Pendleton et al. |
| 8,036,678 B2 | 10/2011 | Goldenberg et al. |
| 8,077,981 B2 | 12/2011 | Elangovan et al. |
| 8,253,799 B2 | 8/2012 | Elangovan et al. |
| 8,451,265 B2 | 5/2013 | Gloudemans et al. |
| 8,499,038 B1 | 7/2013 | Vucurevich |
| 8,956,227 B2 | 2/2015 | Suzuki et al. |
| 9,215,383 B2 | 12/2015 | Milnes et al. |
| 9,285,871 B2 | 3/2016 | Geisner et al. |
| 9,286,711 B2 | 3/2016 | Geisner et al. |
| 9,323,325 B2 | 4/2016 | Perez et al. |
| 9,619,943 B2 | 4/2017 | Perez et al. |
| 9,696,547 B2 | 7/2017 | Kinnebrew et al. |
| 9,928,652 B2 | 3/2018 | Nicholas et al. |
| 10,102,654 B1 | 10/2018 | Philips et al. |
| 10,142,777 B1 | 11/2018 | Wulff |
| 10,169,917 B2 | 1/2019 | Chen et al. |
| 10,356,393 B1 | 7/2019 | Binns |
| 10,380,410 B2 | 8/2019 | Gold et al. |
| 10,419,716 B1 | 9/2019 | Tanumihardja et al. |
| 10,430,994 B1 | 10/2019 | Baker |
| 10,478,717 B2 | 11/2019 | Robbins et al. |
| 10,573,018 B2 | 2/2020 | Kutliroff et al. |
| 10,834,305 B2 | 11/2020 | Linderoth et al. |
| 10,839,557 B1 | 11/2020 | Arora et al. |
| 10,979,773 B2 | 4/2021 | Mun |
| 11,049,277 B1 * | 6/2021 | Price .............. H04N 13/128 |
| 11,087,479 B1 | 8/2021 | Geraghty et al. |
| 11,090,569 B1 | 8/2021 | Wu et al. |
| 11,164,289 B1 | 11/2021 | Yang et al. |
| 11,224,804 B2 | 1/2022 | Pavlov |
| 11,228,790 B2 | 1/2022 | Shin |
| 11,252,329 B1 | 2/2022 | Cier et al. |
| 11,282,279 B2 | 3/2022 | Kurabayashi |
| 11,282,287 B2 | 3/2022 | Gausebeck |
| 11,283,983 B2 | 3/2022 | Linderoth et al. |
| 11,463,738 B2 | 10/2022 | Makinen et al. |
| 2007/0110338 A1 | 5/2007 | Snavely et al. |
| 2008/0178232 A1 | 7/2008 | Velusamy |
| 2009/0010507 A1 | 1/2009 | Geng |
| 2010/0245387 A1 | 9/2010 | Bachelder et al. |
| 2010/0257252 A1 | 10/2010 | Dougherty et al. |
| 2011/0157223 A1 | 6/2011 | John et al. |
| 2012/0033077 A1 | 2/2012 | Kitaura et al. |
| 2012/0098925 A1 | 4/2012 | Dasher et al. |
| 2012/0249831 A1 | 10/2012 | Porter |
| 2013/0083173 A1 | 4/2013 | Geisner et al. |
| 2013/0148861 A1 | 6/2013 | Ferlatte et al. |
| 2014/0058801 A1 | 2/2014 | Deodhar et al. |
| 2014/0247279 A1 | 9/2014 | Nicholas et al. |
| 2014/0267234 A1 | 9/2014 | Hook et al. |
| 2015/0062123 A1 | 3/2015 | Yuen |
| 2015/0264258 A1 | 9/2015 | Bervoets et al. |
| 2015/0317821 A1 | 11/2015 | Ding et al. |
| 2015/0356787 A1 | 12/2015 | Abe et al. |
| 2015/0356788 A1 | 12/2015 | Abe et al. |
| 2016/0012643 A1 | 1/2016 | Kezele et al. |
| 2016/0026253 A1 | 1/2016 | Bradski et al. |
| 2016/0093058 A1 | 3/2016 | Moteki et al. |
| 2016/0148433 A1 | 5/2016 | Petrovskaya et al. |
| 2016/0210783 A1 | 7/2016 | Tomlin et al. |
| 2016/0320951 A1 | 11/2016 | Ernst et al. |
| 2016/0358382 A1 | 12/2016 | Lee et al. |
| 2017/0193693 A1 | 7/2017 | Robert et al. |
| 2017/0243403 A1 | 8/2017 | Daniels et al. |
| 2017/0358141 A1 | 12/2017 | Stafford et al. |
| 2017/0358175 A1 | 12/2017 | Zimmerman |
| 2017/0365102 A1 * | 12/2017 | Huston ............... A63F 13/65 |
| 2018/0054659 A1 | 2/2018 | Goswami |
| 2018/0108172 A1 | 4/2018 | Huston et al. |
| 2018/0300916 A1 | 10/2018 | Barnett et al. |
| 2018/0343442 A1 | 11/2018 | Yoshikawa et al. |
| 2019/0026922 A1 | 1/2019 | Kellogg et al. |
| 2019/0026958 A1 | 1/2019 | Gausebeck et al. |
| 2019/0051051 A1 | 2/2019 | Kaufman et al. |
| 2019/0088004 A1 | 3/2019 | Lucas et al. |
| 2019/0099678 A1 | 4/2019 | Khan et al. |
| 2019/0114832 A1 | 4/2019 | Park et al. |
| 2019/0128670 A1 | 5/2019 | Chen et al. |
| 2019/0180499 A1 | 6/2019 | Caulfield |
| 2019/0197789 A1 | 6/2019 | Macauley et al. |
| 2019/0311471 A1 | 10/2019 | Kurabayashi |
| 2019/0371030 A1 | 12/2019 | Roesler et al. |
| 2019/0373293 A1 | 12/2019 | Bortman et al. |
| 2020/0013222 A1 | 1/2020 | Fergie et al. |
| 2020/0034989 A1 | 1/2020 | Koyama et al. |
| 2020/0126257 A1 | 4/2020 | Tauber |
| 2020/0147489 A1 | 5/2020 | Mahlmeister et al. |
| 2020/0159313 A1 | 5/2020 | Gibby et al. |
| 2020/0177928 A1 | 6/2020 | Shin |
| 2020/0193708 A1 | 6/2020 | Maggiore et al. |
| 2020/0236406 A1 | 7/2020 | Bastian et al. |
| 2020/0302510 A1 | 9/2020 | Chachek et al. |
| 2020/0310630 A1 | 10/2020 | Ernst et al. |
| 2020/0320794 A1 | 10/2020 | Huang et al. |
| 2020/0321099 A1 | 10/2020 | Holladay et al. |
| 2020/0349350 A1 | 11/2020 | Toh et al. |
| 2020/0372672 A1 | 11/2020 | Schonberger et al. |
| 2020/0380779 A1 | 12/2020 | Khazov et al. |
| 2020/0404218 A1 | 12/2020 | Yerli |
| 2021/0006766 A1 | 1/2021 | Yea et al. |
| 2021/0006840 A1 | 1/2021 | Vosoughi et al. |
| 2021/0027524 A1 | 1/2021 | Moss et al. |
| 2021/0104102 A1 | 4/2021 | Cavallo et al. |
| 2021/0112238 A1 | 4/2021 | Bylicka et al. |
| 2021/0133929 A1 | 5/2021 | Ackerson et al. |
| 2021/0142508 A1 | 5/2021 | Azimi et al. |
| 2021/0150755 A1 | 5/2021 | Gao et al. |
| 2021/0158552 A1 | 5/2021 | Berger et al. |
| 2021/0160549 A1 | 5/2021 | Makinen et al. |
| 2021/0201437 A1 | 7/2021 | Yerli et al. |
| 2021/0209777 A1 | 7/2021 | Zhao |
| 2021/0225017 A1 | 7/2021 | Holzer et al. |
| 2021/0241534 A1 | 8/2021 | Avisar et al. |
| 2021/0248814 A1 | 8/2021 | Tao |
| 2021/0264664 A1 | 8/2021 | Saracchini et al. |
| 2021/0272359 A1 | 9/2021 | Michielin et al. |
| 2021/0279950 A1 | 9/2021 | Phalak |
| 2021/0279953 A1 | 9/2021 | Bouhnik et al. |
| 2021/0279967 A1 | 9/2021 | Gernoth et al. |
| 2021/0304490 A1 | 9/2021 | Kaplan et al. |
| 2021/0385423 A1 | 12/2021 | Oh et al. |
| 2022/0051431 A1 | 2/2022 | Jagadeesan et al. |
| 2022/0092802 A1 | 3/2022 | Jang et al. |
| 2022/0107977 A1 | 4/2022 | Marthouse et al. |
| 2022/0108481 A1 | 4/2022 | Lopes De Queiroz et al. |
| 2022/0122326 A1 | 4/2022 | Reitmayr et al. |
| 2022/0124143 A1 * | 4/2022 | Rafkind ............... H04L 65/403 |
| 2022/0130145 A1 | 4/2022 | Connary et al. |
| 2022/0156426 A1 | 5/2022 | Hampali et al. |
| 2022/0157014 A1 | 5/2022 | Sevastopolskiy et al. |
| 2022/0164988 A1 | 5/2022 | Dotsenko et al. |
| 2022/0172429 A1 | 6/2022 | Tong et al. |

(56) References Cited

U.S. PATENT DOCUMENTS

| | | | |
|---|---|---|---|
| 2022/0036118 | A1 | 7/2022 | Gupta et al. |
| 2022/0239945 | A1 | 7/2022 | Oh et al. |
| 2022/0262142 | A1 | 8/2022 | Li et al. |
| 2022/0270323 | A1 | 8/2022 | Melendez et al. |
| 2022/0272133 | A1 | 8/2022 | Jeon |
| 2022/0277516 | A1 | 9/2022 | Matsunobu et al. |
| 2024/0245571 | A1* | 7/2024 | Yam .................... G06T 7/20 |

OTHER PUBLICATIONS

Non-final Office Action dated Jul. 20, 2022, U.S. Appl. No. 17/242,270, filed Apr. 27, 2021.
Notice of Allowance dated Jan. 10, 2023, U.S. Appl. No. 17/242,267, filed Apr. 27, 2021.
Notice of Allowance dated Jan. 11, 2023, U.S. Appl. No. 17/242,275, filed Apr. 27, 2021.
Response to Office Action dated Jan. 17, 2023, U.S. Appl. No. 17/242,265, filed Apr. 27, 2021.
HOLE19 Golf, "Hole19's Brand-New Augmented Reality (AR) Feature Brings the Golf Course to Life," [https://www.prnewswire.com/news-releases/hole19s-brand-new-augmented-reality-ar-feature-brings-the-golf-course-to-life-300754810.html], Nov. 23, 2018, 2 pages.
"Tutorial," COLMAP 3.7 documentation, [https://colmap.github.io/tutorial.html], downloaded on Feb. 14, 2021, 14 pages.
Takacs, Gabriel, et al., "Outdoors Augmented Reality on Mobile Phone using Loxel-Based Visual Feature Organization," MIR '08, Oct. 30-31, 2008, 8 pages.
Stanley, Adam, "PGA Tour announces innovative new AR app," PGA Tour, [https://www.pgatour.com/news/2018/03/12/pga-tour-innovative-augmented-reality-app.html], Mar. 12, 2018, 9 pages.
Altstadter, Jeff, "USGA, Deloitte Launch 2020 U.S. Open Augmented Reality App," [https://www.usopen.com/2020/articles/usga-deloitte-launch-2020-u-s-open-augmented reality-app.html], Sep. 10, 2020, 4 pages.
Umeyama, Shinji, "Least-squares Estimation of Transformation Parameters Between Two Point Patterns," IEEE Transactions on Pattern Analysis and Machine Intelligence, vol. 12, No. 4, Apr. 1991, 5 pages.
U.S. Appl. No. 17/242,265, filed Apr. 27, 2021.
U.S. Appl. No. 17/242,267, filed Apr. 27, 2021.
U.S. Appl. No. 17/242,270, filed Apr. 27, 2021.
U.S. Appl. No. 17/242,275, filed Apr. 27, 2021.
Non-final Office Action dated Sep. 16, 2021, U.S. Appl. No. 17/242,275, filed Apr. 27, 2021.
U.S. Appl. No. 17/519,128, filed Nov. 4, 2021.
U.S. Appl. No. 17/519,133, filed Nov. 4, 2021.
International Search Report & The Written Opinion of the International Searching Authority dated Jul. 7, 2022, International Application No. PCT/US2022/018661.
Response to Office Action dated Jun. 21, 2022, U.S. Appl. No. 17/242,275, filed Apr. 27, 2021.
Response to Office Action dated Jun. 29, 2022, U.S. Appl. No. 17/242,265, filed Apr. 27, 2021.
Response to Office Action dated Jun. 16, 2022, U.S. Appl. No. 17/242,267, filed Apr. 27, 2021.
International Search Report & The Written Opinion of the International Searching Authority dated Jul. 15, 2022, International Application No. PCT/US2022/018665.
International Search Report & The Written Opinion of the International Searching Authority dated Jul. 13, 2022, International Application No. PCT/US2022/018668.
International Search Report & The Written Opinion of the International Searching Authority dated Jul. 13, 2022, International Application No. PCT/US2022/018674.
Response to Office Action dated Aug. 25, 2022, U.S. Appl. No. 17/242,270, filed Apr. 27, 2021.
Non-final Office Action dated Aug. 31, 2022, U.S. Appl. No. 17/242,275, filed Apr. 27, 2021.
Notice of Allowance dated Sep. 21, 2022, U.S. Appl. No. 17/242,270, filed Apr. 27, 2021.
Final Office Action dated Aug. 8, 2022, U.S. Appl. No. 17/242,267, filed Apr. 27, 2021.
Final Office Action dated Oct. 14, 2022, U.S. Appl. No. 17/242,265, filed Apr. 27, 2021.
Notice of Allowance dated Oct. 13, 2022, U.S. Appl. No. 17/242,270, filed Apr. 27, 2021.
U.S. Appl. No. 17/976,494, filed Oct. 28, 2022.
Response to Office Action dated Nov. 7, 2022, U.S. Appl. No. 17/242,267, filed Apr. 27, 2021.
Advisory Action dated Nov. 22, 2022, U.S. Appl. No. 17/242,267, filed Apr. 27, 2021.
Response to Office Action dated Nov. 29, 2022, U.S. Appl. No. 17/242,275, filed Apr. 27, 2021.
Response to Office Action dated Dec. 6, 2022, U.S. Appl. No. 17/242,267, filed Apr. 27, 2021.
Response to Office Action dated Dec. 14, 2021, U.S. Appl. No. 17/242,275, filed Apr. 27, 2021.
Final Office Action dated Mar. 18, 2022, U.S. Appl. No. 17/242,275, filed Apr. 27, 2021.
Non-final Office Action dated Mar. 18, 2022, U.S. Appl. No. 17/242,267, filed Apr. 27, 2021.
Non-final Office Action dated Mar. 31, 2022, U.S. Appl. No. 17/242,265, filed Apr. 27, 2021.

\* cited by examiner

AUGMENTED REALITY SYSTEM FOR REMOTE PRESENTATION FOR VIEWING AN EVENT

PRIORITY

This application claims priority to U.S. Provisional Patent Application No. 63/159,870, entitled "Augmented Reality System for Viewing an Event" and filed Mar. 11, 2021, by Jayaram et al., and is a Continuation-in-Part U.S. patent application Ser. No. 17/242,265, entitled "Augmented Reality System for Viewing an Event With Multiple Coordinate Systems and Automatically Generated Model", issued as U.S. Pat. No. 12,003,806 on Jun. 4, 2024; Ser. No. 17/242,267, entitled "Registration for Augmented Reality System for Viewing an Event"; issued as U.S. Pat. No. 11,657,578 on May 23, 2023; Ser. No. 17/242,270, entitled "Augmented Reality System for Viewing an Event with Distributed Computing", issued as U.S. Pat. No. 11,527,047 on Dec. 13, 2022; and Ser. No. 17/242,275, entitled "Augmented Reality System for Viewing an Event with Mode Based on Crowd Sourced Images", issued as U.S. Pat. No. 11,645,819 on May 9, 2023, all filed Apr. 27, 2021, by Jayaram, et al. It is also related to a pair of concurrently filed applications by Jayaram, et al. entitled "Remote Presentation with Augmented Reality Content Synchronized with Separately Displayed Video Content" and "Augmented Reality System with Remote Presentation Including 3D Graphics Extending Beyond Frame." All of these applications are hereby incorporated by reference in their entireties.

BACKGROUND

The present technology relates to the use of augmented reality (AR).

When viewing a sporting event or other activity/event, whether at the actual venue or remotely (such as on television), the activity may be difficult to follow or even see without the addition of additional graphics or alternate views. Although broadcasters sometimes insert graphics into broadcast images or provide alternate views designed to optimize the viewing experience for the viewer, these are selected by the broadcaster and may not correspond to what individual viewers would like to see. Additionally, when a viewer is watching an event at the venue, such added content may not be available to that viewer at the venue and, even when it is, would not correspond to different viewpoints of different individuals at the event.

DETAILED DESCRIPTION

Figure 1:
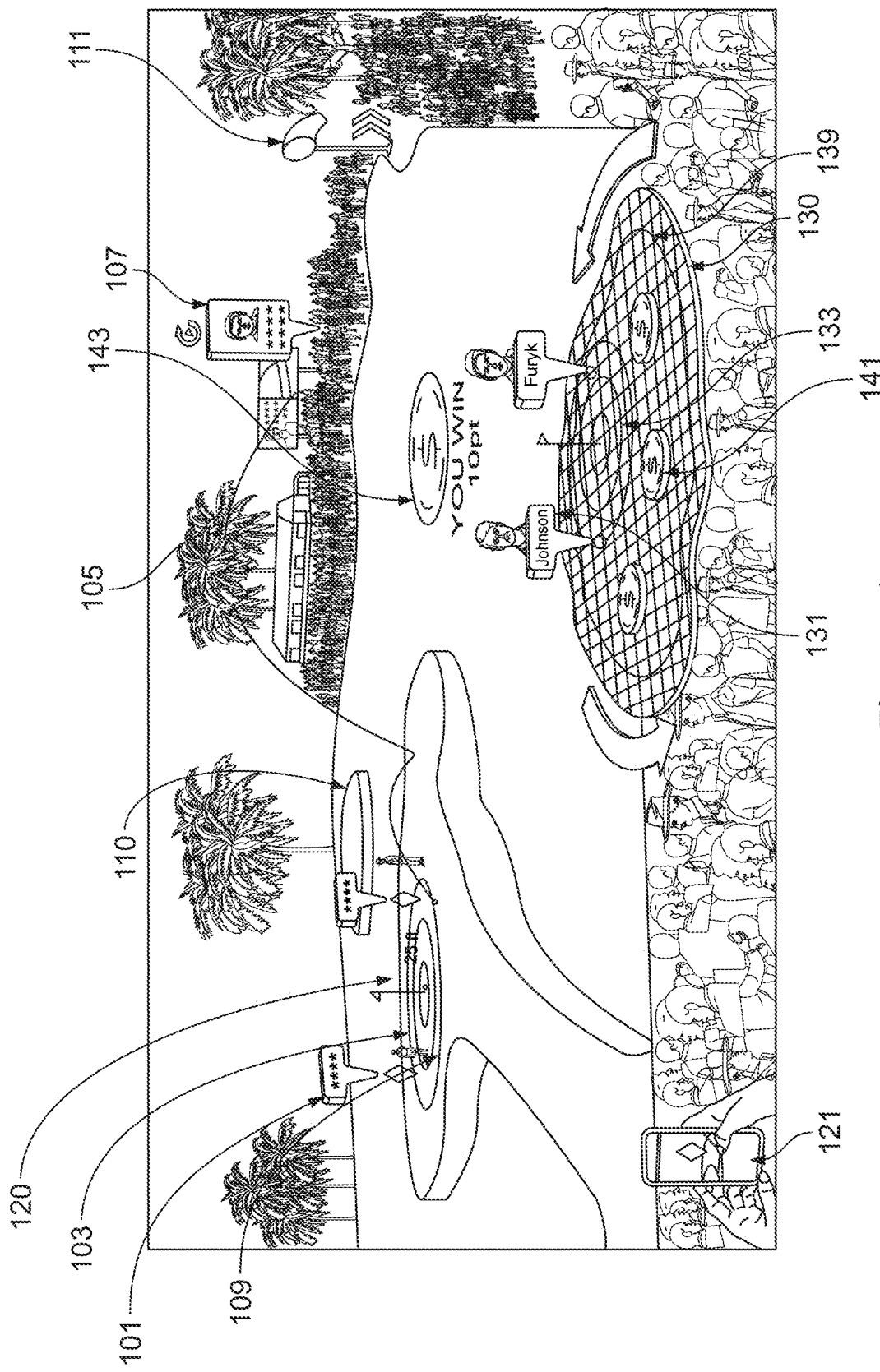
FIGS. 1 and 2 illustrate examples of the presentation of AR graphics, video and other added content at an outdoor venue and an indoor venue.

The following presents techniques for enhancing and extending the overall event day experience for live sports and other events for fans who attend these events at the venue or to augment their watching experience remote from the venue using augmented reality (AR) with mobile telephones, headsets, glasses, smart televisions, or other devices. At an event's venue, making essential AR elements, tightly connected to the venue, available to fans can enhance their live viewing experience, such as by providing individual viewers an accurate real time connection with the playing surface and other venue areas from long distance, and over time and viewer movement, that allows live dynamically updating event data visualization to be synchronized to the playing surface as well as to the entire venue so the venue becomes an essential experiential canvas that provides a fully enhanced event day experience comprehensive with live action amplification as well as away from the action experiences including but not limited to wayfinding and location based experiences. At home or other remote viewing locations (such as a sports bar), live tabletop AR streaming can provide a unique video viewing experience combined with dynamic event data visualization synchronized to tabletop streaming and live dynamic event data visualization that can be synchronized to live TV. The techniques can also provide gamification, whether through institutional gaming, friend-to-friend wagering, or similar free to play for fun.

To be able to provide AR content to users that corresponds to their individual points of view, the users' individual positions and orientations have to be precisely determined relative to the real world. For example, if the user is at a venue and is viewing the event on a mobile phone, the position and orientation of the mobile phone and its camera's images will have an internal set of coordinates that need to be correlated with the real world coordinates so that content based on real world coordinates can be accurately displayed on the camera's images. Similarly, when viewing an event on a television, the camera supplying an image will have its coordinate system correlated with the real world coordinate system.

One way to track a moving camera is through use of simple optical flow techniques to latch onto simple multiple distinctive features in an image and track them frame-to-frame; however, to relate this to the real world, there needs to be a separate process that identifies unique features in the image that have been surveyed and their real world locations used to accurately locate to the viewer. A traditional computer vision approach detects visual features in a reference image, creates a numeric descriptor for that feature, and saves the numeric descriptor in a database, along with the real world location determined by a surveying technique. For a new image, features are then detected in the image, their descriptors computed and found in the database, and the corresponding spatial information in the database is used to determine a viewer's position and orientation. This approach has a number of limitations. In many sports venues, for example, fields of view are made up of organic, non-2-D shapes (for example, trees along a fairway of a golf course) that vary widely with viewing direction and are difficult to uniquely identify. Additionally, the images will often have large areas of features that should be ignored, like moving crowds, changing scoreboards, and moving shadows, for example. Other difficulties include changing lighting conditions that change the appearance of features and many detectable features that are not distinctive enough to be uniquely identified (such as tree trunks or repeating fence posts).

The following discussion presents a number of novel techniques. By detecting specific kinds of features in an image (e.g., the ridge line and edges of a tent, trunks of trees, location of the peaks of the trees) that can be surveyed, the same details can be identified in an image, and, using starting estimates of view position and orientation (such as from mobile phone's GPS, compass, and gravitometer), a correspondence can be established between what a user can see and what has been surveyed in a database, such that from given real world 3D locations of a small subset of the feature points of a transformation between the model's coordinate system and the real world coordinate system can be constructed. The system can optimize the match between a 2D image of expected features based on the database and position estimates versus the mobile phone's 2D camera image. More specifically, rather than use every example of a visual feature, only certain examples of features are used, via iterative refinement applied to accurately identify those features by their 3D spatial location, even though each feature is not distinctive in itself. Employing multiple feature types together can provide a robust, flexible solution, so that rather than develop an ad-hoc solution for every different viewing environment, the system can create a framework to support detecting different specific features and using them all to solve location problems and add new kinds of features to support different environments.

Examples of different kinds of features that might be used include straight-line edges of man-made structures and the corners at which they meet, where these might have specific constraints such as one side of the edge is white and a certain number of pixels widths. For outdoor venues, an example can include tree trunks, where these might comprise the 3D points of the bottom and top of a clearly identifiable segment, plus its diameter. In a golf course example, an outline of a hole's green against the rough, the outline of a sand trap, or a cart path against grass can provide a curving line of points in 3D space. The outline of a tree, or tops of individual trees, against the sky can be a useful reference if it can provide a clean outline and the tree is far away. For any of the features, repeatability of detections regardless of light changes and moving shadows is an important set of characteristics. To survey the features, the 3D location of features can be measured using multiple views from different positions with instrumented cameras (e.g., cameras with sensors that measure location and/or orientation).

As used here, surveying a venue is the process of building a collection of features, represented by their logical description along with their 3D position information, in a spatially-organized database. For example, the locations of points could be measured directly, by using a total station (theodolite) survey device, which can accurately measure azimuth, elevation, and distance to a point from a surveyed location and direction. These typically use laser range finding, but might also use multiple view paths, like a stadimeter. On a golf course, for example, sprinkler head locations are useful reference points with accurately surveyed locations. The surveying process may use cameras to collect video or still imagery from multiple locations for the venue. In some embodiments, these survey images can include crowd sourced images. These images are then registered to a real world coordinate system, typically by one or both of accurately measuring the location of the camera using GPS, or compass and inertial measurement unit (IMU). This may require special techniques like establishing a reference GPS base station to get sufficient accuracy. Fiducials (visual reference objects) can be placed in well-surveyed positions such that there can be several in the field of view of any image. The fiducials can also be used to infer the location of other distinctive points within the images. Based on the fiducials and the located distinctive points, the process can register other images that may not contain enough fiducials. In some embodiments, a path of images can be digitized, with features being registered from one image to the next without surveying fiducials and then use post-processing to optimize estimates of the position of those points to match surveyed reference points: For example, a fiducial in the first and last frame of a sequence of images may be enough to accurately position corresponding points across the sequence of images, or these may be determined by structure from motion techniques.

As used here, registration is the process of establishing a correspondence between the visual frames of reference. For example, registration may include establishing a correspondence between the visual frames of reference that the mobile viewing device establishes on the fly (the coordinates of the mobile device's frame of reference) and a coordinate system of a real world frame of reference. In many situations, an accurate orientation registration may be more important than position registration. Accuracy is determined by how much pixel error there is in, for example, placing a virtual graphic (e.g., image) at a specific location in a real world scene, where reprojection error can be used to quantify the accuracy of a solved camera pose by measuring the difference between the known pixel location of an object in an image and the pixel location of the corresponding 3D object projected into the scene. In one set of embodiments, based on the internal coordinates for a frame of reference of a view-tracking app on a user's device (e.g., ARKit on an iPhone) for a particular image, this can provide information on how 3D rays to several points in the image from the user's mobile device can be used to establish a transformation between the user's mobile device and its real world location so that virtual objects can be accurately drawn atop the video of the scene every frame. Depending on the embodiment, registration for a mobile device can be performed periodically and/or by relying on the mobile device's frame-by-frame tracking ability once a registration is in place. How much of the registration process is performed on the individual user's mobile device versus how much is performed on a remote server can vary with the embodiment and depend on factors such as the nature and complexity of detection of features, database lookup, and solution calibration.

Figure 2:
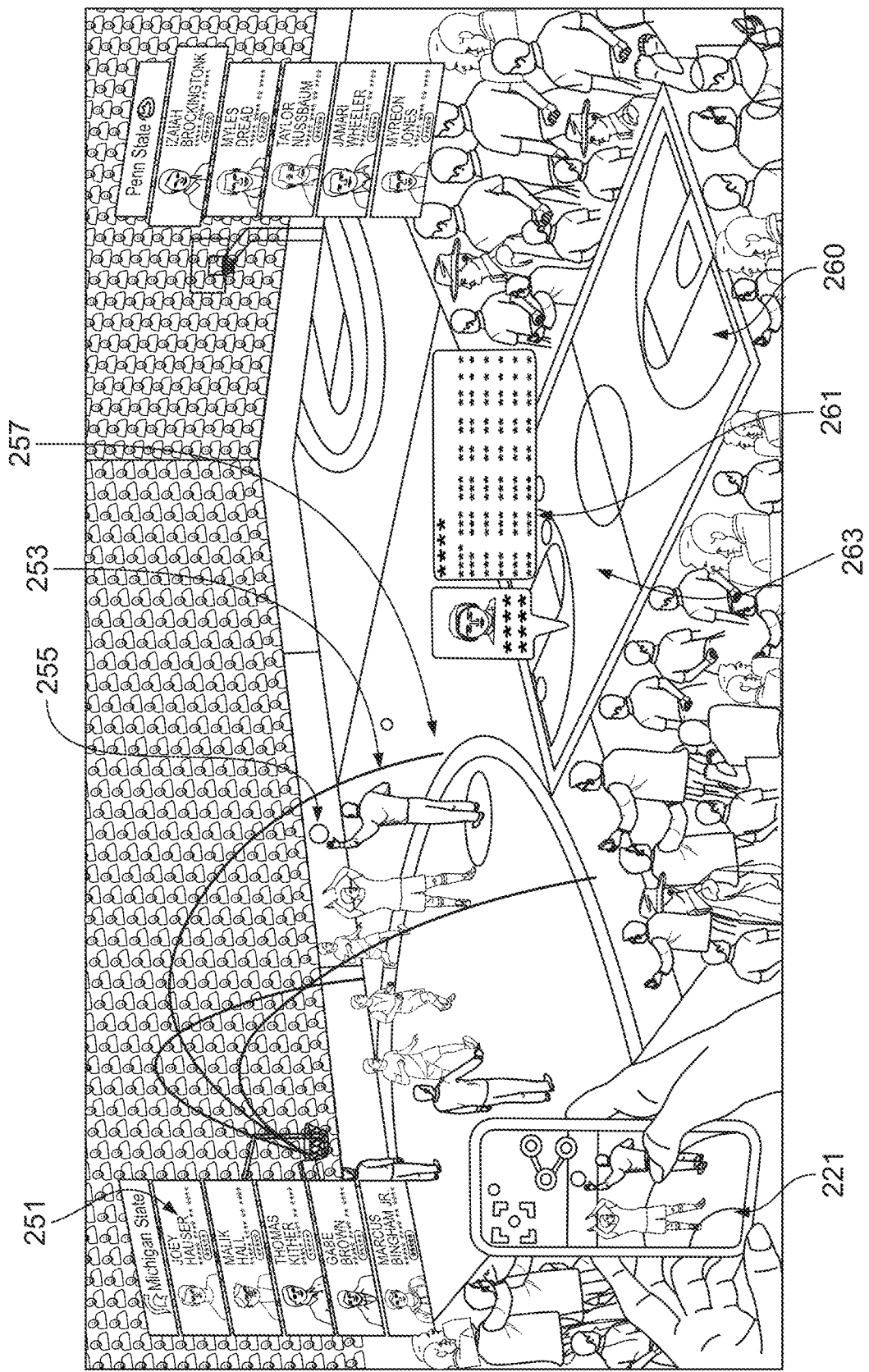

FIGS. 1 and 2 illustrate some of the examples of the presentation of AR graphics and added AR content at an outdoor venue and an indoor venue, respectively. FIG. 1 illustrates a golf course venue during an event, where the green 120 (extending out from an isthmus into a lake) and an island 110 are marked out for later reference. FIG. 1 shows the venue during play with spectators present and a user viewing the scene with enhanced content such as 3D AR graphics on the display of a mobile device 121, where the depicted mobile device is mobile phone but could also be an AR headset, tablet, or other mobile device.

Some examples of the graphs that can be displayed on a viewer's mobile device are also represented on the main image. These include graphics such as player information and ball location 101 for a player on the green 120, concentric circles indicating distances 103 to the hole, ball trajectories 105 with player information 107 on the tee location, and a grid 109 indicating contours and elevation for the surface of the green. Examples of data related to course conditions include the wind indication graphic 111.

The graphics can be overlaid on the image as generated by the mobile device. The user can make selections based on a touchscreen or by indicating within the image as captured by the mobile device, such as pointing in front of the device in its camera's field of view to indicate a position within the image. For example, the viewer could have a zoomed view 130 displayed on the mobile device. The zoomed view 130 can again display graphics such as player info and ball location 131, concentric distances to the holes 133, and a contour grid 139. The viewer could also rotate the zoom view, such as indicated by the arrows. Also indicated in relation to the zoom image are wager markers 141 as could be done by different viewers on mobile devices on a player-to-player basis, along with an indicator of betting result information 143.

FIG. 2 illustrates the indoor venue example of a basketball game, with a viewer with a mobile device 221 providing 3D AR graphics over the image of the mobile device 221. On the image of the game are shown some example AR graphics, such as player information 251, ball trajectories 253, current ball location 255, and player position and path 257. Other examples of content include a venue model 260, player statistics 261, and a player path 263 in the court.

Figure 3:
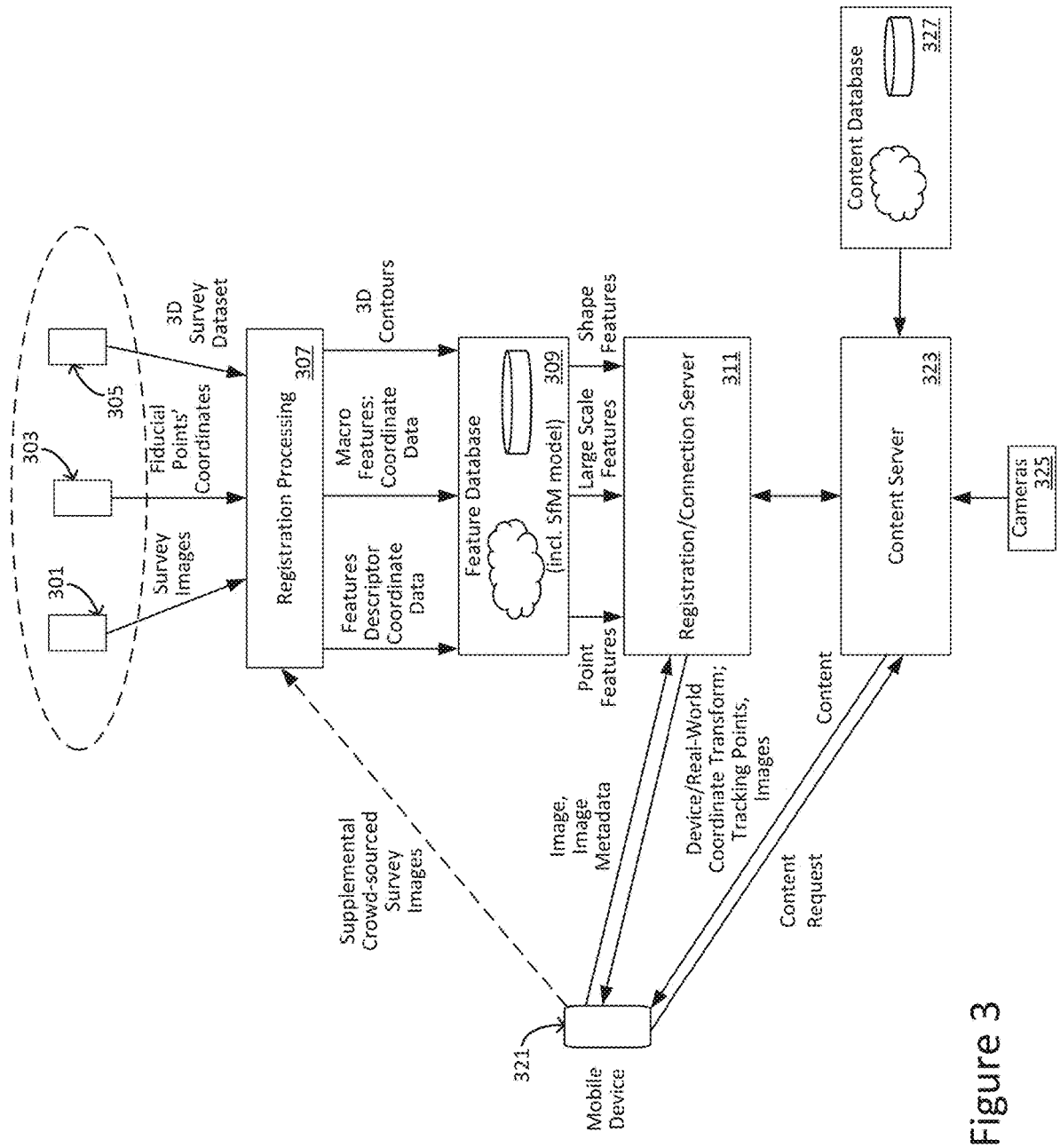
FIG. 3 is a block diagram of elements for an embodiment of a system to register/connect a user's mobile device to the physical real world environment from long distances and provide augmented reality content layered onto the physical real world environment and seen through the user's mobile device.

FIG. 3 is a block diagram of one embodiment of a system to register a user's mobile device and provide AR content to the user's mobile device. FIG. 3 only illustrates a single mobile device 321, but, as discussed in more detail below, there can be many (e.g., thousands) such devices operating with the system concurrently. In an example where the user is at a venue, the mobile device 321 could be a cell phone, tablet, glasses, or a head mounted display, for example, and, in the case of multiple users, their respective mobile devices can be of different types. Note that in some embodiments, some of the components of FIG. 3 can be combined.

AR content to display on the mobile device 321, such as on the 2D camera image of a mobile phone as illustrated in the examples of FIGS. 1 and 2, can be provided by a content server 323, where the content can be retrieved from a content database 327 or from a live source, such as in-venue cameras 325. Content database 327 can be one or both of a local database or a cloud database. Examples of content stored in the database can include things such as 3D terrain contours (i.e., elevations of a green for a golf course) or other venue data that can be acquired prior to the event or provided by venue. The content can also include live data about the event, such as scoring, performance related statistics, environmental data (e.g., weather) and other information. Other content can include live image data from cameras 325 that can supplement a user's point of view, such as through a "binocular view" to give a closer point of view or to fill in a user's occlusions, or other live material, such as ball trajectories. The content can be provided from the content server 323 automatically, such as based on previous setting, or directly in response to a request from the mobile device. For example, the user could indicate requested information by touching the display or manually indicating a position such as by placing a finger with the mobile device's field of view. As the content from the content server 323 is referenced to a real world coordinate system, the mobile device 321 will need a transformation between the real world coordinate system and the mobile device's coordinate system.

The transformation between the mobile device's coordinate system and the real world coordinate system is provided to the mobile device 321 by registration/connection server 311. From the mobile device 321, the registration/connection server 311 receives images and corresponding image metadata. For example, the image metadata can include information associated with the image such as camera pose data (i.e., position and orientation), GPS data, compass information, inertial measurement unit (IMU) data, or some combination of these and other metadata. In some embodiments, this metadata can be generated by an app on the mobile device, such as ARKit running on an iPhone (or other mobile device). Using this data from the mobile device 321 and data in a registration feature database 309, the registration/connection server 311 determines a transform between the coordinate system of the mobile device 321 and a real world coordinate system. In one set of embodiments, the device to real world coordinate transform can be a set of matrices (e.g., transformation matrices) to specify a rotation, translation, and scale dilation between the real world coordinate system and that of the mobile device. Once that mobile device 321 receives the transformation matrices (or other equivalent data), as the mobile device moves or is oriented differently (a change of pose), the mobile device 321 can track the changes so that the transformation between the mobile device's coordinate system and the real world coordinate system stays current, rather than needing to regularly receive an updated transformation between the mobile device's coordinate system and the real world coordinate system from the registration/connection server 311. The mobile device 321 can monitor the accuracy of its tracking and, if needed, request an updated transformation between the mobile device's coordinate system and the real world coordinate system.

Registration/connection server 311 is connected to a feature database 309, which can be one or a combination of local databases and cloud databases, that receives content from registration processing 307, which can be a computer system of one or more processors, that receives input from a number of data sources. The inputs for registration processing 307 includes survey images of multiple views from different positions from one or more survey image sources 301, such as one or more instrumented cameras. Embodiments can also include coordinates for fiducial points as inputs for the registration processing 307, where the fiducial points are points with the fields of view of the survey images and that have their coordinates values in the real word coordinate system by use of fiducial coordinate source devices 303, such as GPS or other device that can provide highly accurate real world coordinate values. In some embodiments, a 3D survey data set can also be used as an input for registration processing 307, where the 3D survey data can be generated by 3D surveying device 305 and, for many venues, will have previously been generated and can be provided by the venue or other source.

To be able to draw 3D graphics accurately over mobile device's 2D picture of the real world, the registration/connection server 311 needs to know the viewer's/mobile device 231 position, the view direction (its pose orientation), and internal camera parameters such as the field of view, focal distance, optical center, and lens distortion effects. A process for accurately locating the mobile device and generating accurately aligned camera or other mobile device imagery can be broken down into three steps: First, prior to the event, photogrammetry techniques are used to construct a 3D model of the venue that contains associated image features that cover the range of possible viewing locations; second, when a viewer initially starts using the app, the location of the viewer's mobile device is determined, and a set of visual features in the mobile device's field of view is established so that the system can accurately register the graphics as presented on the mobile device to the real world; and third, as the viewer continues to use the app, the mobile device is re-oriented to look at different parts of a scene, tracking features in field of view (such as on a frame-by-frame basis) to maintain an accurate lock between the real world and the augmented reality graphics.

To build the registration feature database 309, survey data is collected for the venue and assembled into a single reference map to serve as a model for the venue. Within the reference map, viewing areas can be identified and planning can be made for the location of temporary structures such as viewing stands, tents, or signage. Reference markers for use as fiducials are also identified. Note that the reference map may not be a literal map, but a collection of data representing the relevant set of features (as described herein).

At the venue, prior to event, photos are taken along the line of viewing areas, such as at every 10 feet or 3 meters (or other intervals or distances), and corresponding metadata, such as camera location and orientation, is obtained for use in pruning the search space images. Multiple cameras can be used, such as three cameras with one looking horizontally in the viewing direction, one camera 45° to the left, and one camera 45° to the right. The photos are taken with high resolution (e.g., 8 megapixel each) and can be saved with high quality JPEG compression, with the imagery and metadata transferred to a central server (e.g., registration processing 307, registration/connection server 311 or another computing device). The cameras can be connected to a very accurate GPS receiver, compass, inclinometer, and gyroscope, so that the camera locations can be known to within a few inches and their orientation to within a few hundredth of a degree. For improved accuracy, the focal length and distortion for each camera can be pre-measured on an optical bench. To move the camera rig more easily 301 around a venue it could be mounted on a golf cart or a drone, for example.

Figure 7A:
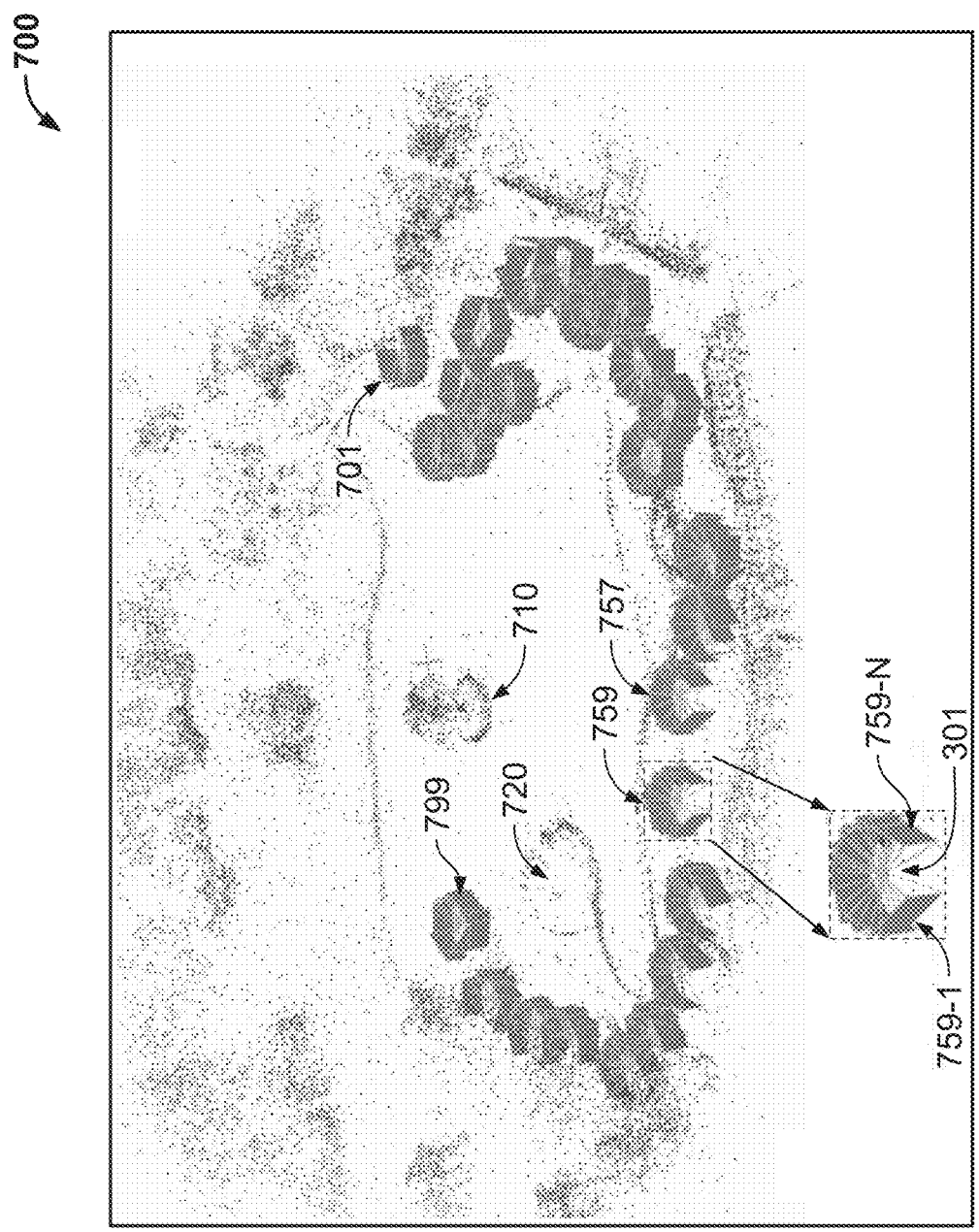
FIG. 7A illustrates the collection of survey images by a survey camera at a venue.
Figure 8:
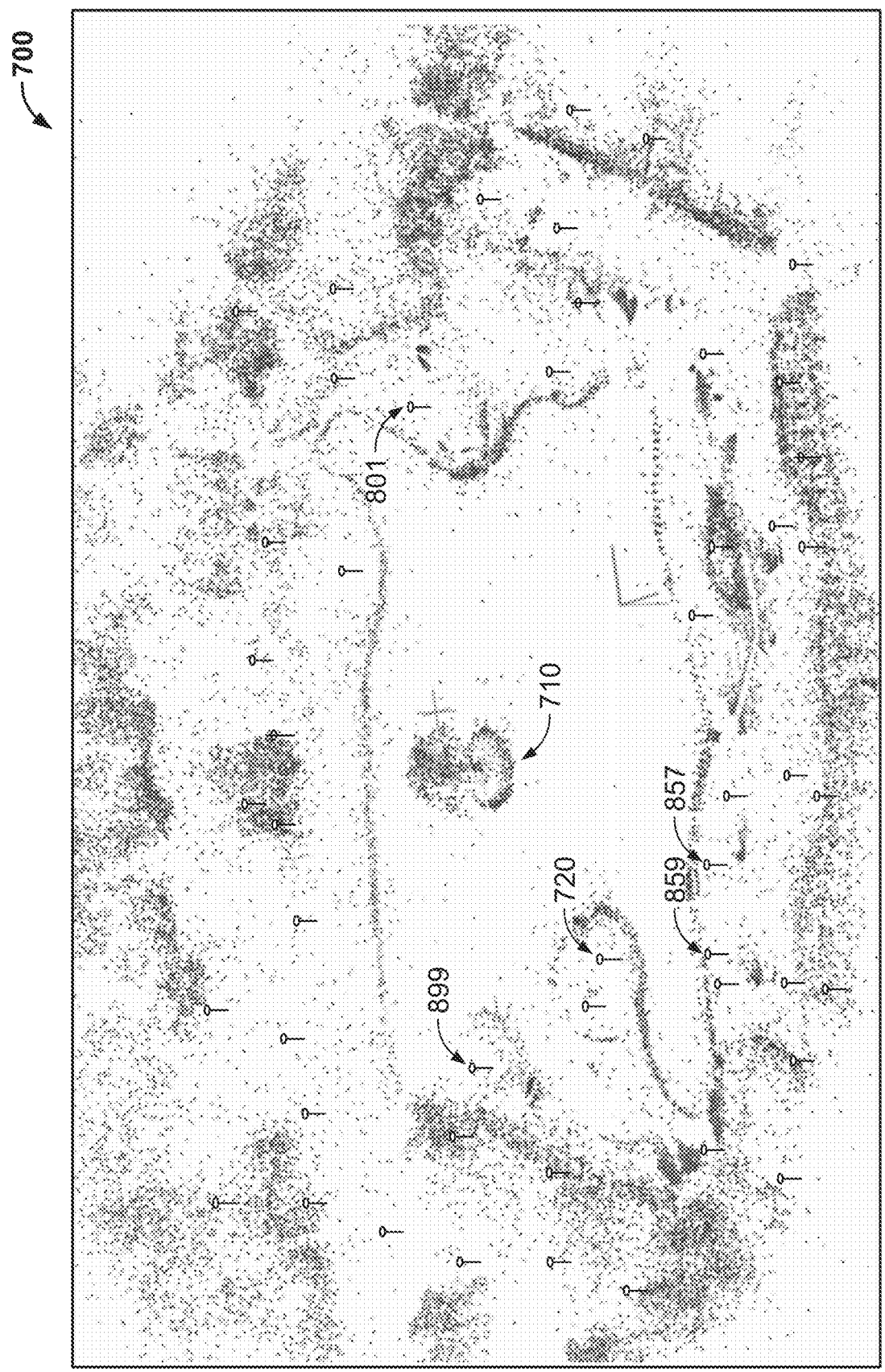
FIG. 8 illustrates the collection of fiducials at a venue.

Once the survey images and their metadata are gathered, they are stored on a computer (e.g., registration processing 307, registration/connection server 311 or another computing device). Surveyed reference points, such as sprinkler locations or visible fiducials placed on reference points, are located prior to taking the photos. The pixel location of fiducial markers can be identified in a subset of the survey images and their 3D coordinates determined via triangulation using the camera parameters, such as discovered from a Structure from Motion (SfM) process to generate an SfM model that can be stored in the database 309. In the processing, these fiducial points are used to refine the measured camera positions and orientations, so that the coordinate system of the photos can be aligned to the real world coordinate system. As described in more detail in the following discussion, given the real world coordinates of the fiducial markers and the SfM coordinates, a transformation is found that maps between the coordinate system of the individual mobile devices and the real world coordinate system. FIGS. 7A and 8 respectively illustrate the collection of camera fustrums and the use of fiducials, and FIGS. 9 and 10 respectively present flowcharts for survey preparation and image collection.

Figure 4:
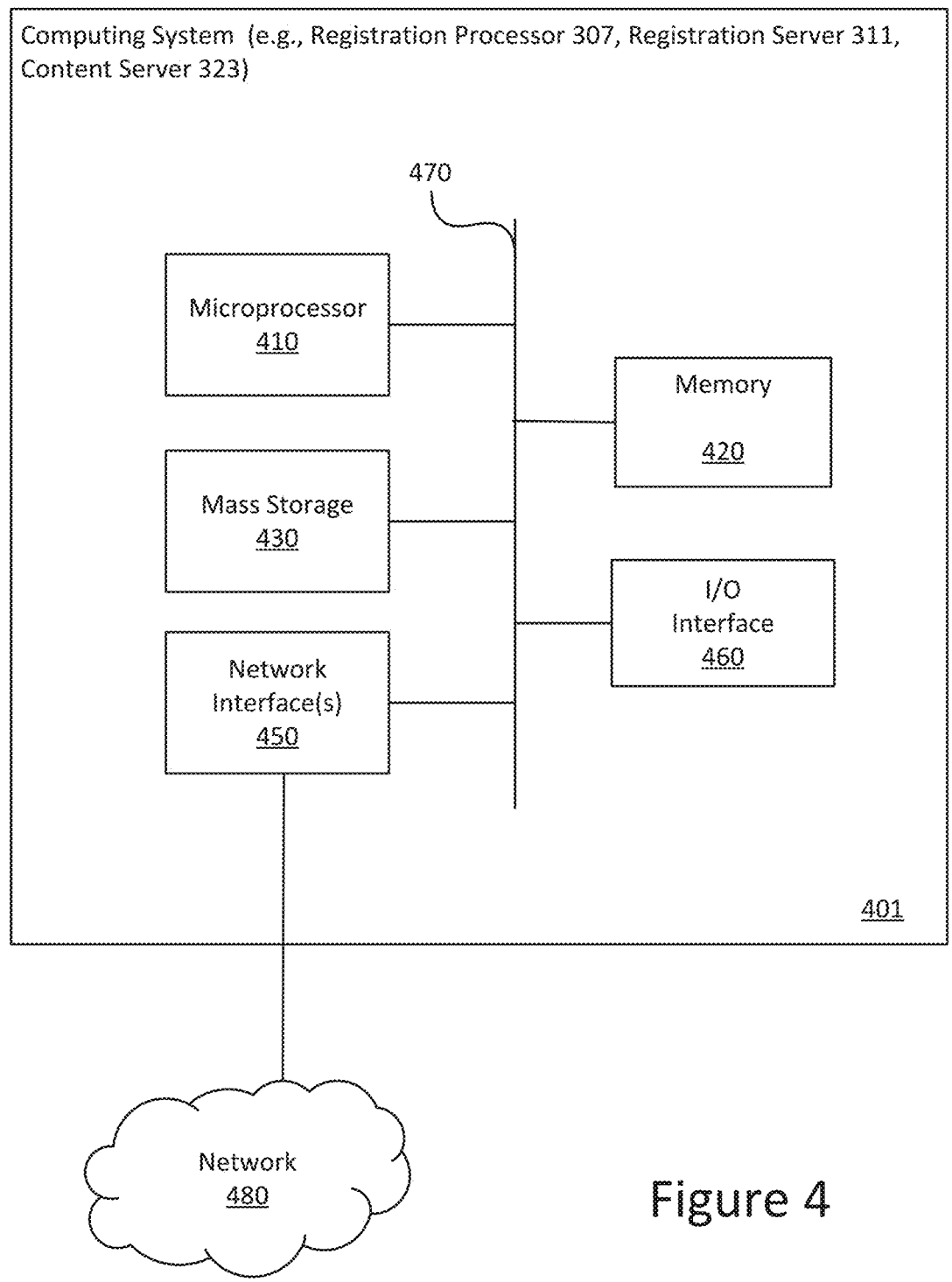
FIG. 4 is a high-level block diagram of one embodiment of a general computing system that can be used to implement various embodiments of the registration/connection processor, registration/connection server and/or content server.

FIG. 4 is a high-level block diagram of one embodiment of a more general computing system 401 that can be used to implement various embodiments of the registration processing 307, registration/connection server 311 and/or content server 323. Specific devices may utilize all of the components shown, or only a subset of the components, and levels of integration may vary from device to device. Furthermore, a device may contain multiple instances of a component, such as multiple processing units, processors, memories, transmitters, receivers, etc.

In FIG. 3, the registration/connection server 311 and the content server 323 are represented as separate blocks based on their different uses, but it will be understood that these functions can be implemented within the same server and that each of these blocks can be implemented by multiple servers. Consequently, depending on the embodiment, the registration/connection server 311 and the content server 323 can implemented as a single server or as a system of multiple servers. The components depicted in FIG. 4 includes those typically found in servers suitable for use with the technology described herein, and are intended to represent a broad category of such servers that are well known in the art.

The computing system 401 may be equipped with one or more input/output devices, such as network interfaces, storage interfaces, and the like. The computing system 401 may include one or more microprocessors such as a central processing unit (CPU) 410, a graphic processing unit (GPU), or other microprocessor, a memory 420, a mass storage d430, and an I/O interface 460 connected to a bus 470. The computing system 401 is configured to connect to various input and output devices (keyboards, displays, etc.) through the I/O interface 460. The bus 470 may be one or more of any type of several bus architectures including a memory bus or memory controller, a peripheral bus or the like. The microprocessor 410 may comprise any type of electronic data processor. The microprocessor 410 may be configured to implement registration processing using any one or combination of elements described in the embodiments. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs.

The mass storage 430 may comprise any type of storage device configured to store data, programs, and other information and to make the data, programs, and other information accessible via the bus 470. The mass storage 430 may comprise, for example, one or more of a solid-state drive, hard disk drive, a magnetic disk drive, an optical disk drive, or the like.

The computing system 401 also includes one or more network interfaces 450, which may comprise wired links, such as an Ethernet cable or the like, and/or wireless links to access nodes or one or more networks 480. The network interface 450 allows the computing system 401 to communicate with remote units via the network 480. For example, the network interface 450 may provide wireless communication via one or more transmitters/transmit antennas and one or more receivers/receive antennas. In an embodiment, the computing system 401 is coupled to a local-area network or a wide-area network for data processing and communications with remote devices, such as other processing units, the Internet, remote storage facilities, or the like. In one embodiment, the network interface 450 may be used to receive and/or transmit interest packets and/or data packets in an ICN. Herein, the term "network interface" will be understood to include a port.

The components depicted in the computing system of FIG. 4 are those typically found in computing systems suitable for use with the technology described herein, and are intended to represent a broad category of such computer components that are well known in the art. Many different bus configurations, network platforms, and operating systems can be used.

Figure 5:
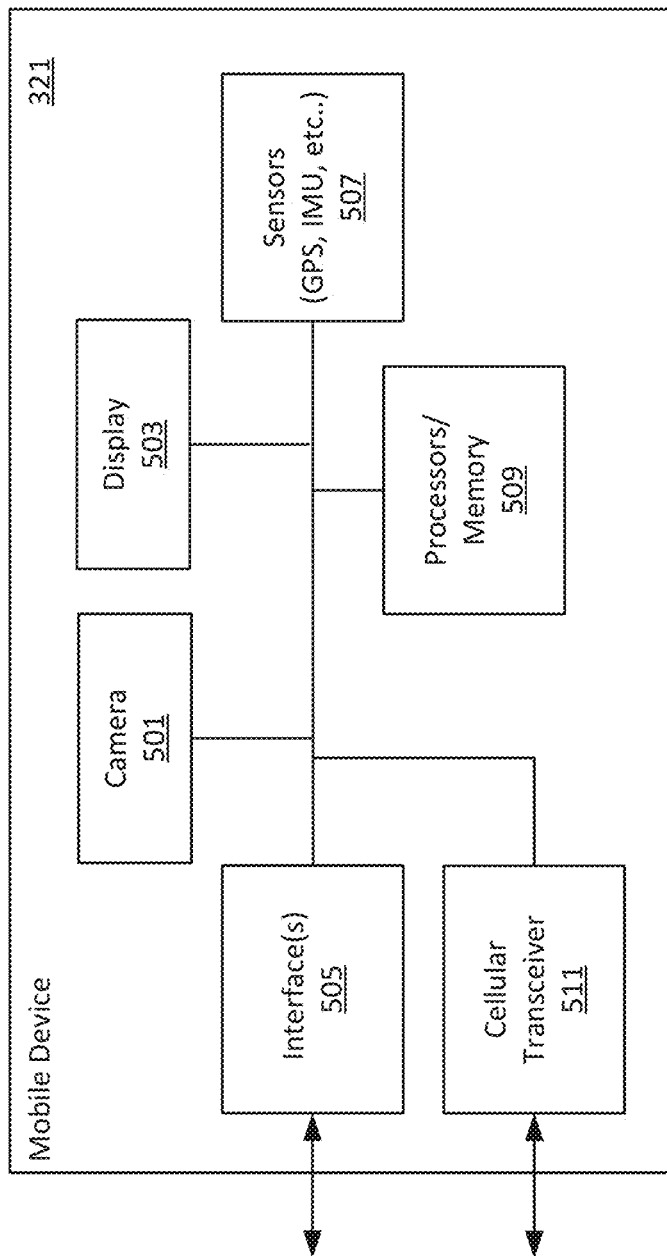
FIG. 5 is a block diagram of a mobile device that can be used for displaying graphics of a view at a venue.

FIG. 5 is a high-level block diagram of an embodiment of a mobile device 321 that can be used for displaying graphics of a view at a venue, such as described above. Embodiments of the mobile device can include a mobile phone, tablet computer, laptop computer, or other device in which the view of the venue is presented on a display 503, such as a screen with the graphics content also represented on the display. Other embodiments can include head mounted displays, such as AR headsets or AR glasses, that display the graphics over the view of the venue as watched through the head mounted display. The multiple mobile devices that can be used concurrently with the systems presented here can be various combinations of these different varieties of mobile devices. FIG. 5 explicitly includes elements of the mobile device 321 relevant to the discussion presented here, but will typically also include additional elements, but that do not enter into the current discussion and are not shown.

The embodiment of FIG. 5 includes a camera 501 and one or more sensors 507 that respectively provide image data and metadata for the image data that can be used in the registration process described above. Mobile devices 321 such as mobile phones typically include a camera 501, such as based on charge coupled devices or other technology, that can provide the image data and also the image of the venue on the mobile device's display screen, while for a head mounted display, the camera 501 would provide the image data, although it may not be displayed directly to the viewer. The sensors 507 can include devices such as GPS receivers, a compass, and an inertial measurement unit (e.g., accelerometer). The metadata from the sensors 507 can provide information on the pose (location and orientation) of the camera 501 when capturing the image data, but will be within the mobile device's internal coordinate system that may only loosely be aligned with the real world coordinate system.

The mobile device 321 also includes one or more interfaces 505 through which the mobile device 321 can communicate with the registration/connection server 311 and content server 323. The interface 505 can use various standards and protocols (Bluetooth, Wi-Fi, etc.) for communicating with the servers, including communicating with the registration/connection server 311 for the registration process and with the content server 323 to request and receive graphics and other content. The cellular transceiver 511 can also be used to communicate with the registration/connection server 311 and content server 323, as well as for telephony.

A mobile device 321 also includes one or more processors 509, with associated memory, that are configured to convert the graphics from the content server 323 into the mobile device's coordinate system based on the transformation between the mobile device's coordinate system and the real world coordinate system as received from the registration/connection server 311. The processor(s) 509 can be implemented as ASICs, for example, and be implemented through various combinations of hardware, software, and firmware. The processor or processors 509 can also implement the other functionalities of the mobile device not related to the operations describe here, as well as other more relevant functions, such as monitoring latencies in communications with the servers and adapting the amount of processing for the registration and display of graphics done on the mobile device 321, relative to the servers, based on such latencies.

The display 503 is configured to present the graphics over the view of the venue. In the case of device where the display 503 is a screen (such as a mobile phone or tablet), the view of the venue can be generated by the camera 501, with the graphics also displayed on the screen. In this case, user input (such as related to gamification or requesting specific graphics) can be input by a viewer using the display and/or, in some embodiments, by indicating within the view of the venue from the camera 501, such as by finding the user's fingertip within the image and projecting a ray to this location to, for example, touch where a ball will land or to touch an object to place a bet. In a head mounted display 503, such as AR goggles or glasses, the graphics or other content can be presented over the view of the venue through the mobile device 321, where the user can make indications within the view.

Figure 6:
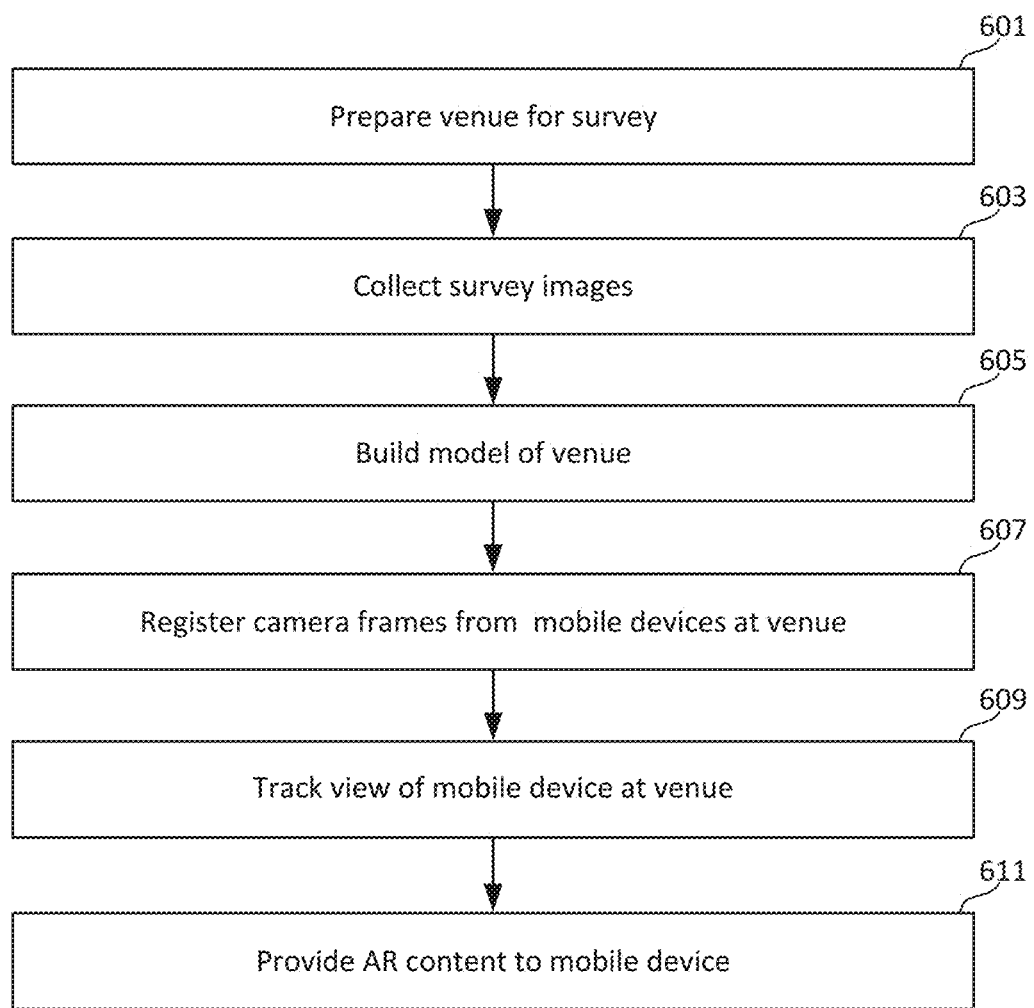
FIG. 6 is a flowchart of one embodiment of a process for operation of an AR system to provide content to viewers at a venue.

FIG. 6 is a flowchart describing one embodiment for the operation of an AR system for providing viewers with AR graphics over views of an event. Beginning at step 601, the venue is prepared for a survey to collect image and fiducial points' coordinates that are supplied to the registration processing 307. Step 601 is discussed in more detail with respect to FIG. 9. The survey images are then collected in step 603, which is described in more detail with respect to FIG. 10. From the data collected is steps 601 and 603, the registration processing 307 builds am SfM model of the venue, as described further with respect to FIG. 11. Steps 601, 603, and 605 are typically performed before the event, although data can also be collected during an event, such as through crowd sourced image data, to refine the model.

Before the event, camera images from the mobile devices 321 are registered with a server system including a registration/connection server 311 at step 607. This is done by each mobile device 321 sending the registration/connection server 311 image data and metadata, that will be in the coordinate system of the mobile device, to the registration/connection server. For each mobile device 321, the registration/connection server can then build a transformation for converting positions/locations between the mobile device's coordinate system to a real world coordinate system. The registration/connection server 311 also sends each mobile device 321 template images with a set of tracking points within each of the template images at step 609. The template images with tracking points allow for each of the mobile devices 321 to maintain an accurate transformation between the mobile device's coordinate system and the real world coordinate system as the mobile device changes its pose (i.e., location and orientation). Registration and tracking is described in more detail with respect to FIGS. 13A and 13B. At step 611 a registered mobile device 321 can then request and receive AR content, such as graphics to display of views of an event at a venue, from the content server 323. More details about step 611 are provided below with respect to FIG. 17.

FIG. 7A illustrates the collection of survey images by a survey camera at a venue. In this example, the venue is the same as illustrated in FIG. 1, but shown as a point cloud 700 generated from features within the venue prior to the event and without spectators. For comparison to FIG. 1, the island 710 and green 720 are given reference numbers corresponding to reference numbers 110 and 120 in FIG. 1. The individual points of the point cloud 700 correspond to features for use in the registration process as described below. One of the data inputs to the process is the survey data as generated by a survey camera rig 301.

Figure 9:
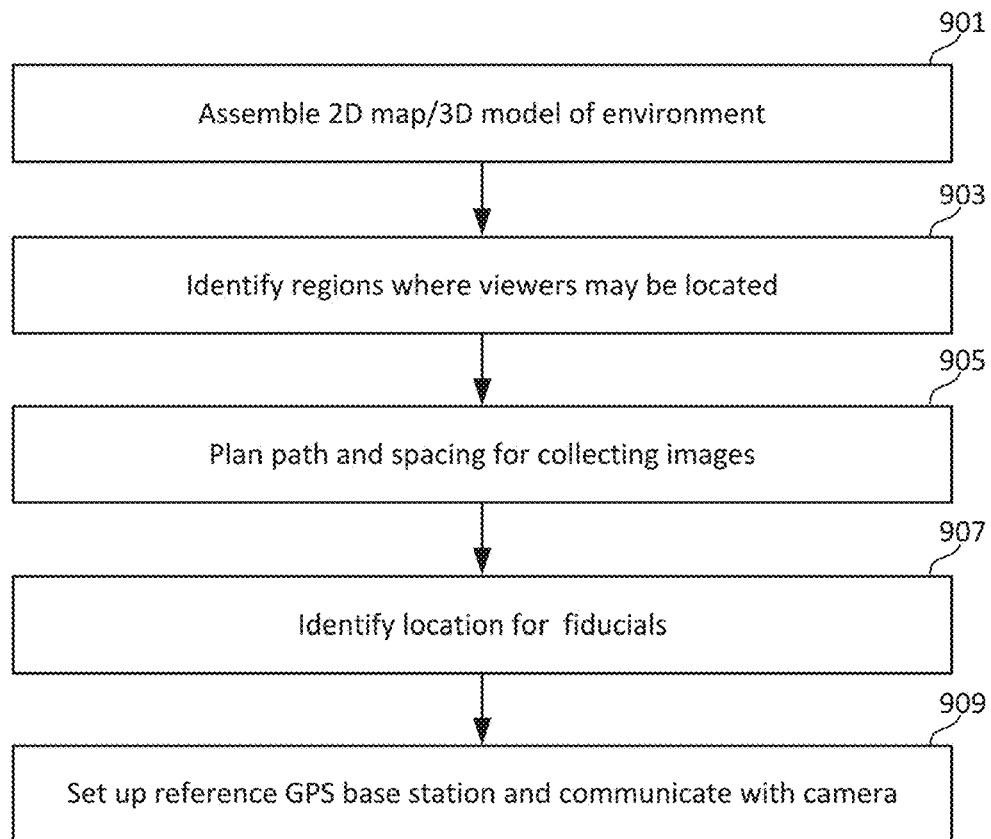
FIG. 9 is a flowchart of one embodiment of a process for preparing a venue for a survey.
Figure 10:
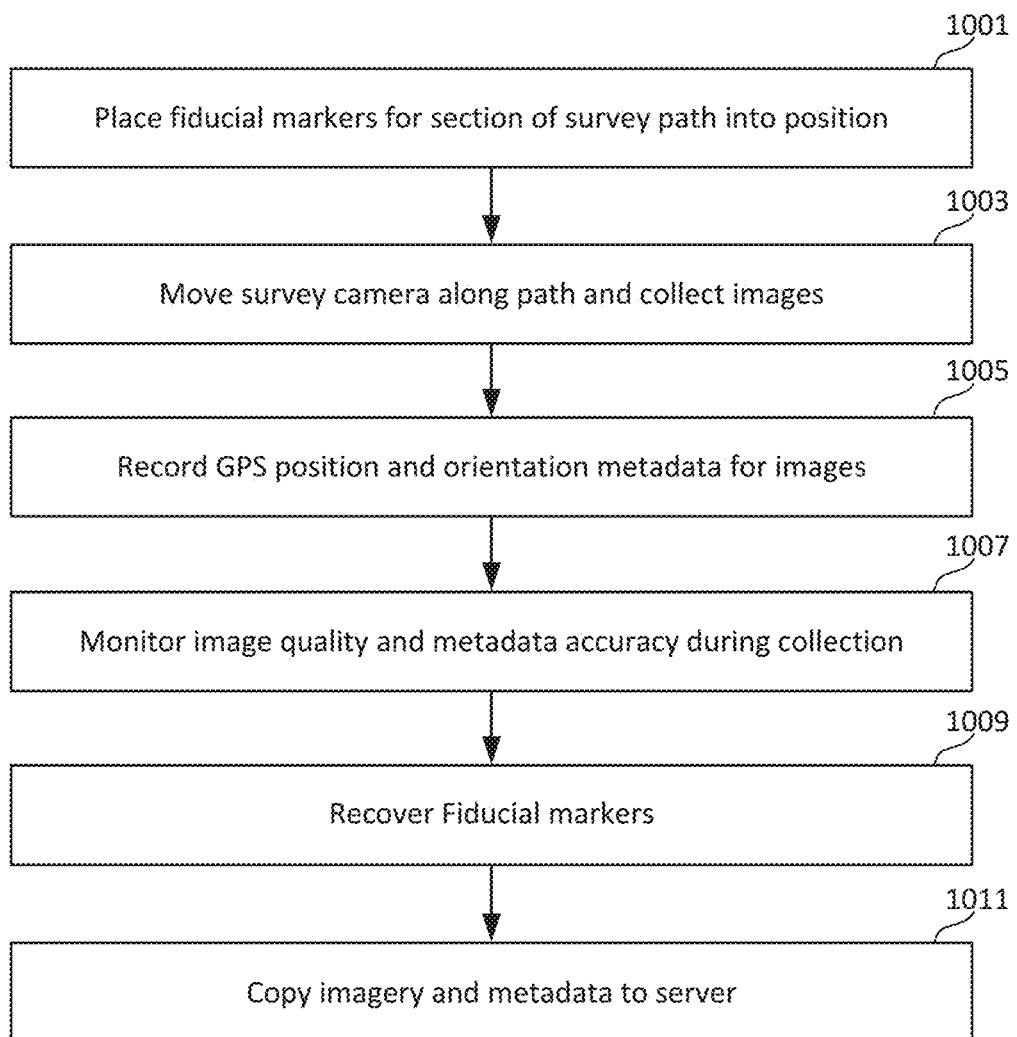
FIG. 10 is a flowchart of one embodiment of a process for collecting survey images.

FIG. 7A illustrates the collection of multiple images from multiple locations at the venue, where FIGS. 9 and 10 describes an embodiment for the process to collect these survey images. In FIG. 7A, several dozen sets of images collected at specific points, where several of these image collections (701, 757, 759, 799) at some of these locations are explicitly numbered. The actual process can include additional collections of images, such as in the upper portions of the image, but these are not included in FIG. 7A to avoid the Figure becoming overly complicated. The number of such locations and the number of photos taken will vary based on the specifics of the venue and the event, but as described below, these will typically be collected at positions where viewers are likely to be located and with sufficient density be able to perform an accurate registration process.

In the lower portion of FIG. 7A is an expanded view of the collection of images 759 to illustrate the collection more clearly. At the center is the location of the survey camera rig 301 used to collect a set of images, where the survey camera rig 301 can include a single camera or multiple cameras along with equipment to determine the camera location and orientation. The images are represented by a set of N frustums (e.g., truncated pyramids), where a first frustum 759-1 and an Nth frustum 759-N are labeled. The wider base of a frustum (the darker, labelled rectangles) correspond to the 2D image as seen by the camera from its pose when the image is taken and narrow base of a frustum corresponds to the 2D plane of the image collection surface for the camera. The images taken at a given position are taken to overlap and to cover the directions of likely fields of view for users of the mobile devices during the event.

Figure 7B:
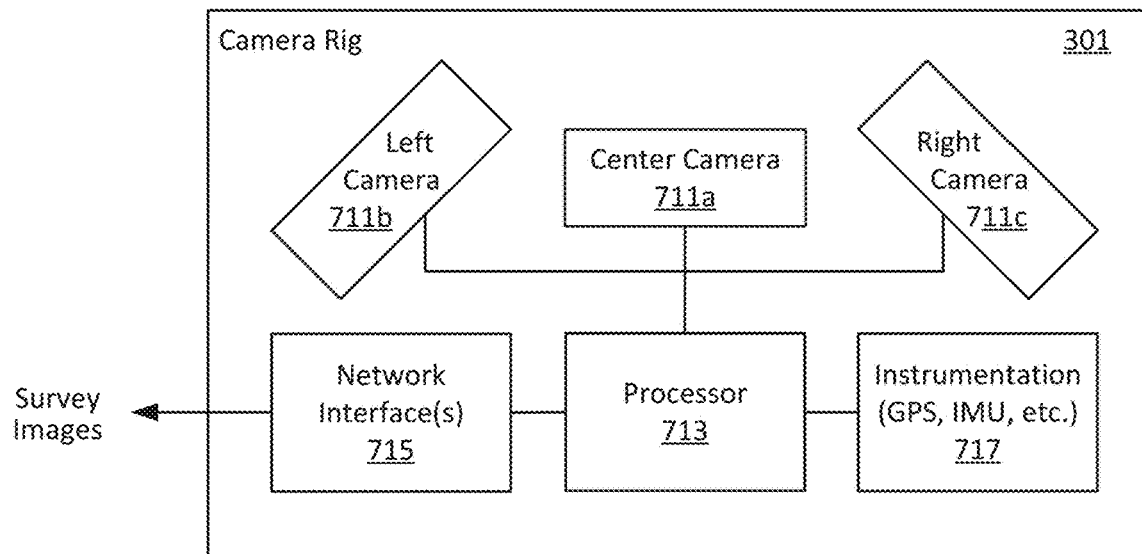
FIG. 7B is a block diagram of an embodiment of a camera rig that can be used for taking the survey images.

FIG. 7B is a block diagram of an embodiment of a multi-camera survey camera rig 301 that can be used for taking the survey images. In one embodiment, three cameras with a center camera (711a) looking horizontally in the viewing direction, one camera (711b) angled 45° to the left, and one camera (711c) angled 45° to the right. The cameras can have high resolution (e.g., 8 megapixel each) and can use high quality JPEG compression, with the imagery and metadata transferred over interface 715 to a central server. Depending on the embodiment, the images can be processed on the individual cameras (711a, 711b, 711c) or by a separate processing/memory section 713 incorporated into the survey camera rig 301. The survey camera rig 301 can also include instrumentation 717 to determine the metadata for the orientation and location of the cameras' images. The instrumentation can include a GPS receiver, compass, IMU, and gyroscope, for example, so that the camera locations can be known to within a few inches and their orientation to within a few hundredth of a degree.

FIG. 8 illustrates the collection of fiducials at a venue. The venue of FIG. 8 is the same as for FIGS. 1 and 7A and again shows the same point cloud 700 and reference features of the island 710 and green 720, but with the image collections (e.g., 701, 757, 759, 799) not shown. The fiducials will be placed prior to, and included in, the collection of survey images, but the image collections are not shown in FIG. 8 for purposes of explanation. The placement and collection of fiducials are described in more detail with respect FIGS. 9 and 10.

FIG. 8 shows a number of fiducials within the point cloud 700, where several examples of the fiducials (801, 857, 859, 899) are explicitly labelled. As described below, the number and placement of the fiducial will depend on the venue, type of event, and where the survey images are to be collected. The position of the fiducials are determined so that their points' coordinates in the real world coordinate system is well known. This can be done by placing the fiduciaries at locations with well-known coordinates, such as is often the case for features in the venue (e.g., sprinkler locations of a golf course), by accurately measuring the locations of fiduciaries by a GPS or other positioning device, or a combination of these.

FIG. 9 is a flowchart of one embodiment of a process for preparing a venue for a survey, providing more detail for step 601 of FIG. 6. To organize the collection of survey data, a preliminary model is assembled for the environment of the venue at step 901, where this can be a 2D or 3D model and can often be based on information available from the venue or bases on a rough survey. Based on this model, regions where viewers will be located during event are identified at step 903. For example, if the venue is a golf course, viewing arrays are typically around the tee, around the green, and along portions of the fairway. In an indoor venue, such as for a basketball game, the viewing arrays correspond to locations in the stands. At step 905, the identified viewer locations can be used to plan a path and spacing for points at which to collect the survey images.

In step 907, locations that will be within the images are identified as location for fiducials, where these can be objects in known locations that will be visible in the survey images and which can be used to infer the location and orientation of the survey camera location with high accuracy (i.e., down to fractions of inches and degrees). In the example of a golf course, for example, one choice of fiducial locations can be sprinkler head locations within the target AR coordinate system if these are needed, as these are plentiful, easy to find, and their locations are often carefully surveyed by the venue. To make fiducials easier to locate within the survey image, these can be marked by, for example a white or yellow sphere a few inches in diameter mounted on a stand that lets it be located as a specified height (e.g., an inch above a sprinkler head). In some cases, to improve accuracy, a reference GPS base station in communication with the survey camera rig can be set up at step 909.

FIG. 10 is a flow of one embodiment of a process to collect survey images following the preparation of Described with respect to FIG. 9 and provides more detail for step 603 of FIG. 6. Starting at step 1001, any wanted fiducial marker are placed for a section of the survey path. Depending on the implementation, this can be all of the fiducial markers for the entire survey or for a section of the survey, with the marked moved from views already photographed to subsequent views as the survey camera rig 301 is moved along the survey path. As discussed above, the survey camera rig 301 can be part of rig of multiple cameras along equipment to determine corresponding metadata for the images. The survey camera rig 301 is moved along the path, such as the planned path from step 905, collecting images in step 1003. For effective triangulation it is important to not take photos from the same position (e.g., conventional panorama by rotating camera). Instead, each photo is taken from a different vantage point. Small camera movements allow for the triangulate of near features, whereas large movements provide the necessary parallax for triangulating distant objects. In the case of a fixed rig of several cameras, at each location the rig can collect a set of images looking in several directions and at different focal lengths, which can be fixed.

In terms of instrumentation, the survey camera rig 301 can include an accurate GPS receiver, where this can be referenced to a base station in some embodiments. The GPS receiver can also be integrated with an inertial measurement unit, or IMU, with linear and rotational rate sensors, and additionally be integrated with a magnetic compass. Step 1005 records the GPS position and orientation metadata for each of the images. As the images and their metadata are accumulated, the image quality and metadata accuracy can be monitored at step 1007. Once the images are collected, the fiducial markers can be recovered at step 1009 and the survey imagery and corresponding metadata copied to a server at step 1011.

In some embodiments, the survey images can be augmented by or based on crowd crowd-sourced survey images from viewers' mobile devices 321. For example, users could be instructed to provide images of a venue before or even during an event, taking photos with several orientations from their viewing positions. This can be particularly useful when an event is not held in a relatively compact venue, such as a bicycle race in which the course may extend a great distance, making a formal survey difficult, but where the course is lined with many spectators who could supply survey image data. In some instances, as viewers provide crowd-sourced survey images, the registration process can be updated during an event. For embodiments where crowd-sourced survey images are provided prior to the event, these crowd sourced images can be used along with, and in the same manner as, the survey images collected prior to the event by the camera rig 301. When the crowd-sourced survey images are provided during the event, they can be combined with the initial survey data to refine the registration process. For example, based on the pre-event survey images, an initial model of the venue can be built, but as supplemental crowd-sourced survey images are received during an event, the feature database 309 and registration process can be made more accurate through use of the augmented set of survey images and the model of the venue refined. This sort of refinement can be useful if the views of a venue change over the course of the event so that previously used survey images or fiducial points become unreliable.

In some embodiments, for venues or portions of venues where survey images and fiducials are sparse or absent (e.g., a cycling race), the crowd-sourced survey images and their metadata can be used without the survey images from a camera rig 301 or fiducial point data. The crowd-sourced survey images and their corresponding metadata alone can be used in the same manner as described for the survey images generated by a camera rig 301 and the lack of fiducials from a survey can be replaced by extracting some degree of fiducial point data from the crowd-sourced survey images and their metadata. The model can be generated using crowd sourced images in combination with survey images, using survey images only, or using crowd sourced images only. The images are crowd sourced images as they are provided from the public at large (e.g., those at the venue) and function to divide work between participants to achieve a cumulative result (e.g., generate the model). In some embodiments, the identify and/or number of the plurality of mobile devices used to provide the crowd sourced images are not known in advance prior to the event at the venue.

To have accurately generated real world coordinate data for the fiducials, as part of the survey process these locations can be determined by a GPS receiver or other fiducial coordinate source device 303. In some cases, the venue may already have quite accurate location data for some or all of the fiducial points so that these previously determined values can be used if of sufficient accuracy.

In some embodiments, 3D survey data and similar data can also be used as a source data. For example, this can be established through use of survey equipment such as by a total station or other survey device 305. Many venues will already have such data that they can supply. For example, a golf course will often have contour maps and other survey type data that can be used for both the registration process and also to generate content such as 3D graphics like contour lines.

Once the source data is generated, this can be used by the registration processing 307 to generate the feature database 309. The processing finds detectable visual features in the images, for those that can be detected automatically. The better features are kept for each image (such as, for example, the best N features for some value N), while keeping a good distribution across the frame of an image. For each image, a descriptor is extracted and entered into a database of features and per-image feature location. Post-processing can merge features with closely matching descriptors from multiple images of the same region, using image metadata to infer 3D locations of a feature and then enter it into the feature database 309. By spatially organizing the database, it can be known what is expected to be seen from a position and direction. Although one feature provides some information about position and orientation, the more features that are available, the more accurate the result will be. When a venue is a constructed environment, such as a football stadium or a baseball park, there will typically be enough known fiducials to determine position and orientation. In more open venues, such as golf course fairway with primarily organic shapes such as trees and paths, additional reference points may need to be collected.

Non-distinctive features in the images, such as a tree trunk, edge of a cart path, or the silhouette of trees against the sky, can be correlated across adjacent views to solve for 3D locations and then entered into the feature database 309. Such features can typically be detected, but often not identified uniquely. However, if where the image is looking is roughly known, it is also roughly known where to expect the features to be located. This allows for their arrangement in space to be used to accurately identify them and to accurately determine a location, orientation, and camera details. The process can also collect distinctive information extracted from the features, such as width of a tree trunk or size of a rock, to help identify the objects and include these in the database.

Once the images have been registered, they can be used in conjunction with a 2D venue map to identify spectator areas as 3D volumes. The tracking and registration process can ignore these volumes and not attempt to use features within them as they will likely be obscured. Other problem areas (large waving flags, changing displays, vehicle traffic areas) can similarly be ignored. In some cases, it can be useful to perform a supplemental survey shortly before an event to include added temporary structures that may be useful for registration and also reacquire any imagery that can be used to correct problems found in building the initial feature database 309. The feature database 309 can also be pruned to keep the better features that provide the best descriptor correlation, are found in a high number of images, and that provide a good distribution across fields of view.

Figure 11:
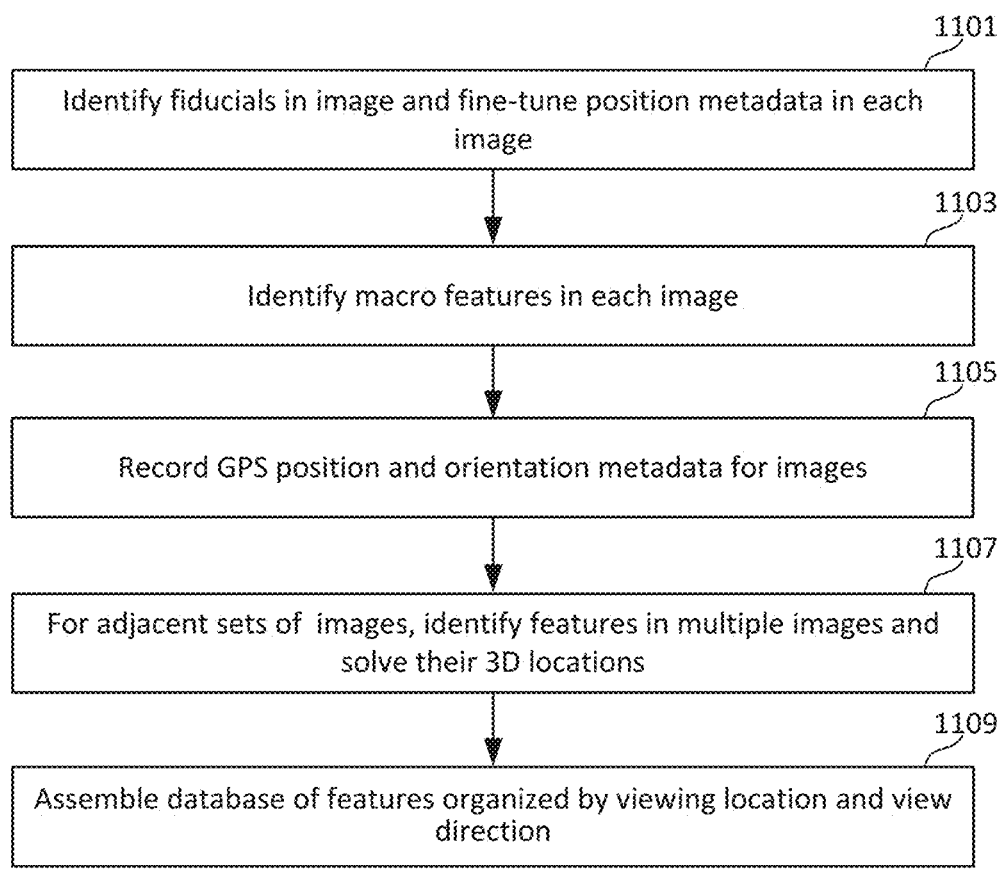
FIG. 11 is a high level flowchart of one embodiment of a process for processing imagery.

FIG. 11 is a flow chart describing one embodiment for processing the imagery in registration processing 307 to generate the data for the feature database 309 from the survey images, fiducial points' coordinates, and 3D survey data. The process of FIG. 11 is an example implementation of step 605 of FIG. 6. The processing can be done offline, with manual operations performed by several people in parallel, and with a mix of automated and manual effort. For the individual collected images, at step 1101 fiducials within the image are identified and the position metadata fine-tuned. Also, within the individual images, at step 1103 various types of macro features (i.e., large scale features identifiable visually be a person) that can be used for registration are identified. At step 1105 the GPS position and orientation metadata for the images are recorded, where the positions can be stored in cartesian coordinates as appropriate for the venue, for example. In addition to camera position and orientation, the metadata can also include camera intrinsic parameters such as focal distance, optical center, and lens distortion properties. Step 1107 looks at adjacent sets of images and identifies features present in multiple images and solves for their 3D location. The feature database 309 is assembled at step 1109, where this can be organized by viewing location and view direction, so that the registration/connection server 311 can easily retrieve features that should be visible from an arbitrary location and view direction.

Figure 12:
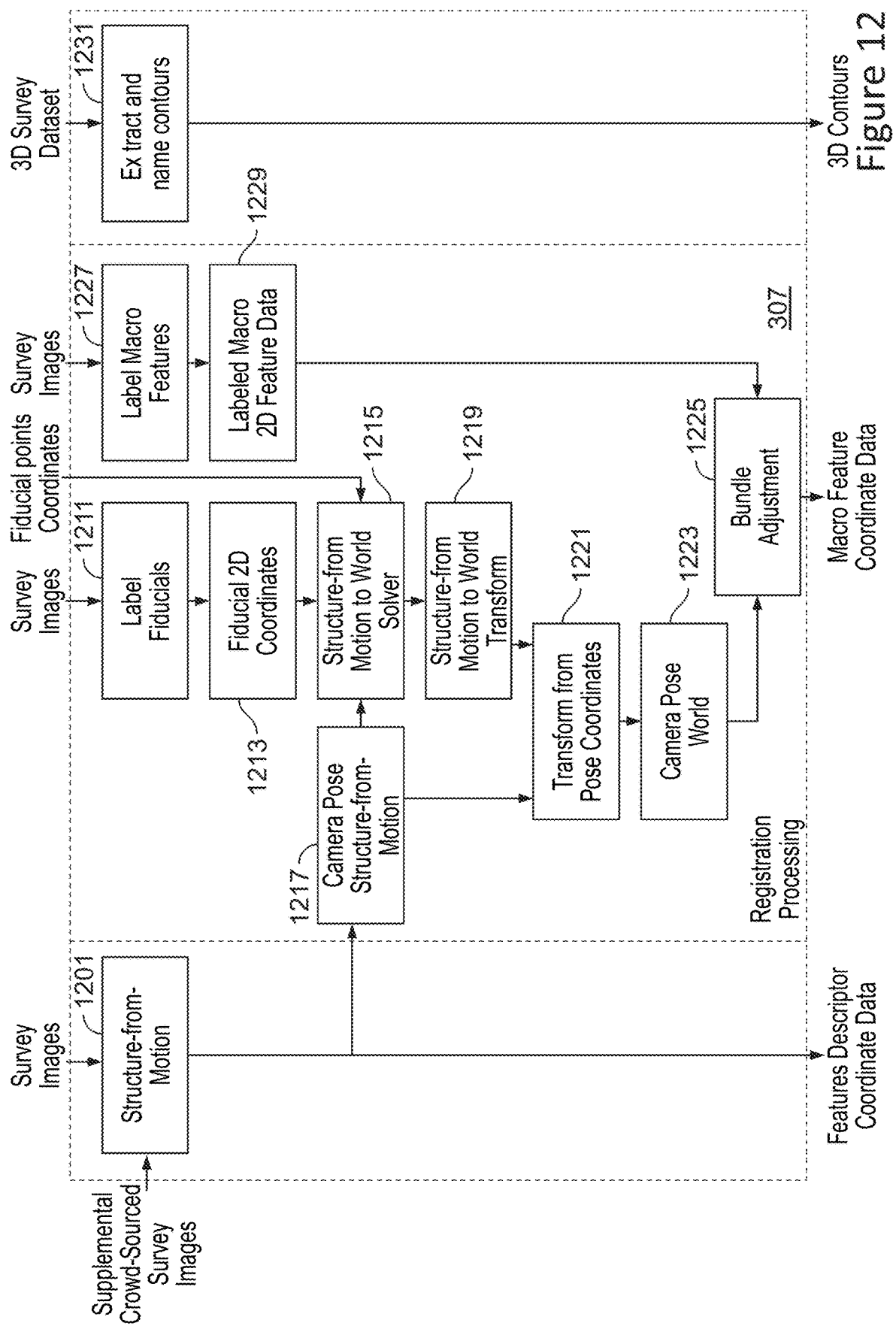
FIG. 12 illustrates embodiments for registration processing based on a three columned architecture.

FIG. 12 is a more detailed flowchart of the process for an embodiment for operation of the registration processing 307 based on a three columned architecture and illustrating how the steps of FIG. 11 fit into this architecture. Other embodiments may not include all of the columns, such as by not using the third column. In FIG. 12, the left most column uses the survey images, possibly including supplemental crowd-sourced survey images to generate descriptors and coordinate data for features. The middle column uses a combination of survey images and fiducial points' coordinates to generate macro feature coordinate data. The right column uses 3D survey data to generate 3D contours.

In terms the elements of FIG. 4, the inputs (the survey images, fiducial points coordinates, 3D survey dataset) can be received through the network interfaces 450 and the outputs (feature descriptor coordinate data, macro coordinate data, 3D contours) transmitted to the feature database or databases 309 by the network interfaces 450. The processing steps of FIG. 12 (e.g., 1201, 1215, 1221, 1225) can be performed by the microprocessor 410, with the resultant data (e.g., 1213, 1217, 1219, 1223, 1229) stored in the memory 420 or mass storage 430, depending on how the microprocessor stores it for subsequent access. For process operations that may require some degree of manual operation, such 1211, 1227, or 1231, these can also be performed by microprocessor 410 with manual input by way of the I/O interface 460.

Considering the left most column, the survey images can be acquired as described above with respect to the flows of FIGS. 9 and 10 and also, in some embodiments, incorporate crowd-sourced images. In some embodiments, Structure-from-Motion (SfM) techniques can be applied to process the images in block 1201, where SfM is a photogrammetric range imaging technique that can estimate 3D structures from a sequence of images. For example, the COLMAP SfM pipeline or SfM techniques can be used. In the COLMAP case, image keypoints, feature descriptors, and feature matching information can be stored in a database (which can be thought of as model agnostic), whereas the actual 3D geometry which includes point clouds and camera poses (which is the result of the SfM reconstruction) is stored in the SfM model. The mapping of the feature database 309 to a model can be one-to-many.

The resultant output is a set of descriptors and coordinate data for the extracted features. For example, this can be in the form of scale-invariant feature transform (SIFT) descriptors that can be stored in the feature database 309. The SIFT descriptors can be, for example, in the form of a vector of 128 floating points values that allows for features to be tracked and matched by descriptors that are robust under varying viewing conditions and are not dependent on the features illumination or scale. The output of the structure-from-motion can also include a 3D point cloud of triangulated feature points and camera pose data from the images for use in the second column of FIG. 12.

The second column of FIG. 12 includes inputs of the same survey images as the left column, both directly and through the camera pose data (i.e., position and orientation) 1217, and of the fiducial points' coordinates. The fiducials within the survey images are labelled in block 1211, where this can include both automated and manual labelling as described above. The result of the labelling are the fiducial 2D coordinates within the images at block 1213.

The camera pose data obtained from structure-from-motion 1217 will be referenced to a coordinate system, but this is a local coordinate system with normalized values optimized for the structure-from-motion process and not that of the real world (i.e., the 3D coordinate system of the AR geometry). As the 3D graphics and other content that will be provided to the mobile device 321 needs to be in the same coordinate system as the images, the coordinate system of the camera pose data of structure-from-motion 1217 needs to be reconciled with a real world coordinate system. This is performed in the processing of structure-from-motion to real world solver 1215. The data inputs to the structure-from-motion to real world solver 1215 are the camera pose data of structure-from-motion 1217, the fiducial 2D coordinates data 1213, and the fiducial points' coordinates. The resultant output generated by the structure-from-motion to real world solver is a structure to real world transform 1219. In some embodiments, operations corresponding to some or all of the additional elements of the middle column of FIG. 12 can be moved to the registration/connection server 311. For example, the elements 1221, 1223, and 1225 or their equivalents could be performed on the registration/connection server 311, in which case the structure-from-motion transformation between the mobile device's coordinate system and the real world coordinate system would be stored in the feature database 309. As represented in FIG. 12, the additional elements of 1221, 1223, and 1225 are performed prior to the storage of data in the feature database 309.

Considering the structure-from-motion to real world transform 1219 in more detail, structure-from-motion is performed in a normalized coordinate system appropriate for numeric purposes and the camera extrinsic data is expressed in this coordinate system. The transform 1219 is a similarity transformation that maps points from the SfM coordinate system into the target, real world coordinate system. The cameras' coordinate system can be converted to a real world coordinate system using a transformation matrix composed of a uniform scale, rotation, and translation.

As shown in the embodiment of FIG. 12, the registration processing 307 continues on to a transform pose process 1221 to transform the camera poses (their locations and orientations) used during the survey process to the real world coordinate system based on the camera pose from the structure-from-motion 1217 and the structure-from-motion to world transform 1219. The resultant data output is the camera pose to real world coordinate transformation 1223, allowing the camera pose in the camera's coordinate system to be changed into the camera's pose in the real world coordinate system.

The system also performs bundle adjustment 1225, where global bundle adjustment is part of the SfM process that can adjust parameters of the entire model with the goal of numerically reducing the reprojection error. The labeled macro 2D feature data 1229 is generated by a label macro features process 1227 to assign labels to the large scale macro features, where this can be a manual process, an automated process, or a combination of these, where this is often based on the types of features. Bundle adjustment is a process of, given a set of images depicting a number of 3D points from different viewpoints, simultaneously refining the 3D coordinates describing the scene geometry, the parameters of the relative motion, and the optical characteristics of the cameras employed to acquire the images. The bundle adjustment 1225 can be an optimization process for minimizing the amount of error between differing projections of the images, resulting in the output data of the macro features' coordinate data for storage in the feature database 309.

In embodiments including the third column of FIG. 12, a set of 3D contour data is generated from the 3D survey dataset by extracting and name contours process 1231. This can be a manual process, an automated process, or a combination of these. As noted above, the 3D survey dataset can include existing data provided by the event venue as well as data newly generated for the registration process.

As described above with respect to FIG. 3, the data from registration processing 307 are features' descriptor and coordinate data, macro-feature coordinate data, and 3D contour data. This data is stored in the feature database 309, from which the registration/connection server 311 can retrieve these as point feature data, large scale feature data, and shape feature data for use in the registration process.

To register a viewer's mobile device 321, the registration/connection server 311 receives the camera frame and the associated camera intrinsic parameters, which can include focal length and optical center. Extra metadata (e.g.; GPS position, compass orientation) such as from an API on phone or other mobile device 321 are also bundled with the intrinsic data. Prior to sending this data, which serves as metadata for the image data from the mobile device 321, the GPS and compass on the mobile device will calibrate themselves, this may include prompting the user to get a clearer view of the sky or perhaps move the mobile device through a figure-eight pattern, for example. Typically, this can provide a position within about 5 meters, an orientation within about 10 degrees, and a field of view within about 5 degrees. The camera or other mobile device 321 can grab images, every 5 seconds for example, and perform basic validity checks, and send the image data and image metadata to the server.

Once the image data and metadata are at the registration/connection server 311, the registration/connection server 311 finds distinctive and non-distinctive features within the image and, using image metadata for position and orientation, compares this to expected features in the feature database 309. For example, the registration/connection server 311 can use distinctive features to refine the position and orientation values, then use this location to identify the non-distinctive features to further solve for the position, orientation, and field of view of the mobile device 321 within the real world coordinate system. On the registration/connection server 311, the solving problem identifies alignment errors for each feature, where these errors can be accumulated across multiple viewers and used to improve the 3D location estimation of the feature.

In some embodiments, the registration/connection server 311 can prompt the user to do a pan left-right for the mobile device 321. The images from the pan can be captured and used to build up a simple panorama on the registration/connection server 311. The registration/connection server 311 can then build a pyramid of panorama images at a range of resolution values, find likely tracking points and reference, or "template", images including the likely tracking points, and sends these to the mobile device 321. Based on the tracking points and template images, the mobile device 321 can locate, find, and match reference points in image frames quickly on a frame-by-frame basis to get an accurate orientation value for the mobile device 321.

Once the mobile device 321 is registered, it can track the images, maintaining a model (such as a Kalman-filtered model) of the mobile device's camera's orientation, where this can be driven by the IMU of the mobile device 321 and tracking results from previous frames. This can be used by the mobile device 321 to estimate the camera parameters for the current frame. The mobile device can access the current set of simple features at their predicted location with a current image, such as by a simple template matching, to refine the estimate. Typically, it is expected that a mobile device 321 may have its orientation changed frequently, but that its location will change to a lesser amount, so that the orientation of the mobile device 321 is the more important value for maintaining graphics and other content locked on the imagery with the real world coordinate system.

The active set of simple features can be updated so that the area of view is covered, with simple features being discarded or updated based upon which simple features can be readily found and factors such as lighting changes. In some embodiments, the features can be reacquired periodically and re-solved for location and orientation to account for a viewer moving or due to a drifting of fast tracking values, for example. This could be done on a periodic basis (e.g., every minute or so), in response to the mobile device's GPS or IMU indicating that the viewer has moved, or in response to the matching of local reference features starting to indicate difficulties for this process. If the mobile device is unable to locate template features within the current image, a more detailed match against the panorama images can be performed, where this can start with the lower resolution images, to reacquire an orientation for the mobile device 321 or determine that the view is obstructed. In response to being unable to locate template features within the current image, the AR graphics and other content may be hidden or, alternately, continued to be displayed using a best guess for the mobile device's orientation. In some embodiments, the mobile device 321 can provide the user with a visual indication of the level of accuracy for the tracking, so that the user can be trained to pan smoothly and with a consistent camera orientation (i.e., mostly upward), and maintain a view of the scene in which obstructions are minimized.

Figure 13A:
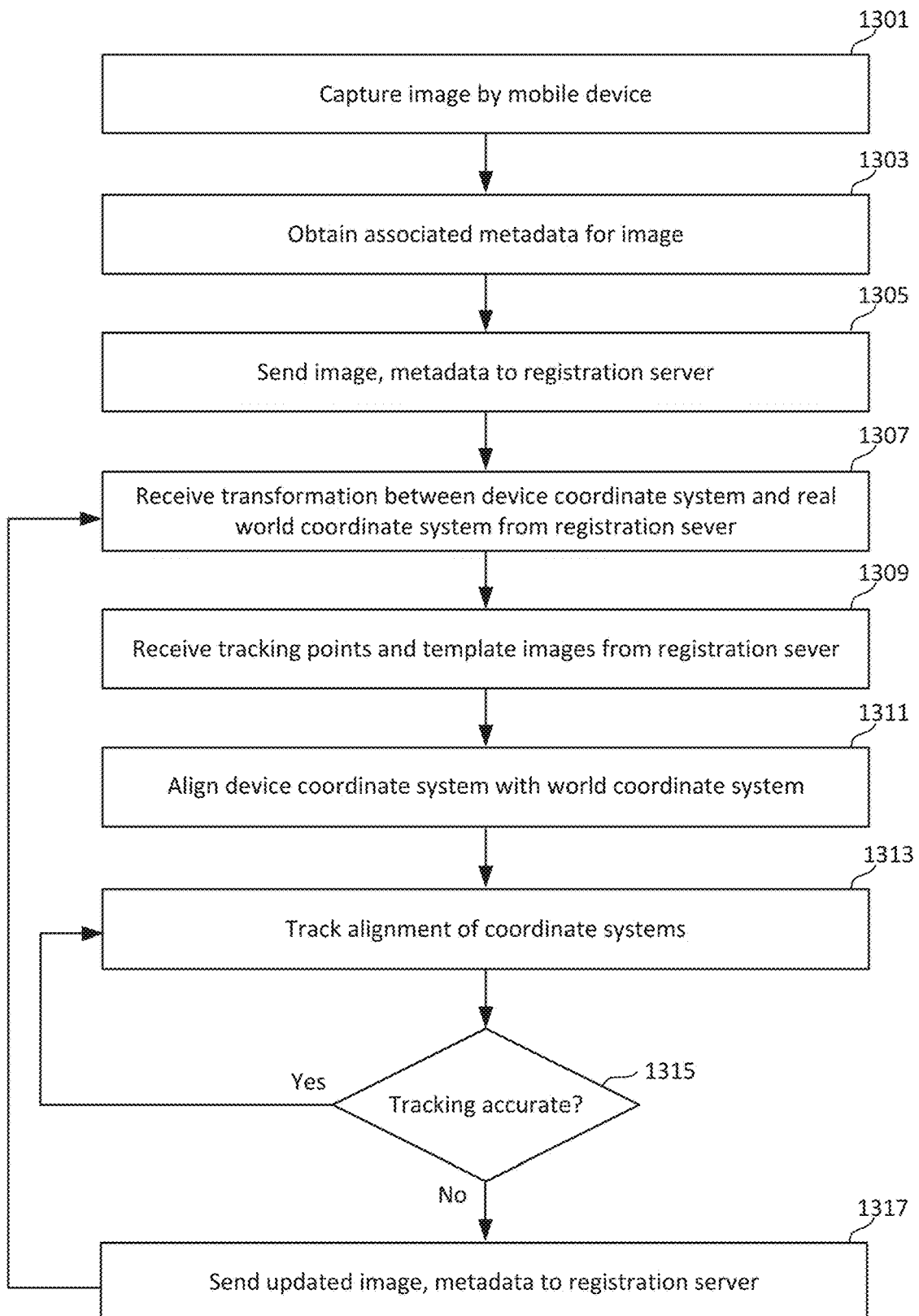
FIGS. 13A and 13B are flowcharts for embodiments of the registration and tracking process by the mobile device and of the registration process by the registration/connection server.
Figure 13B:
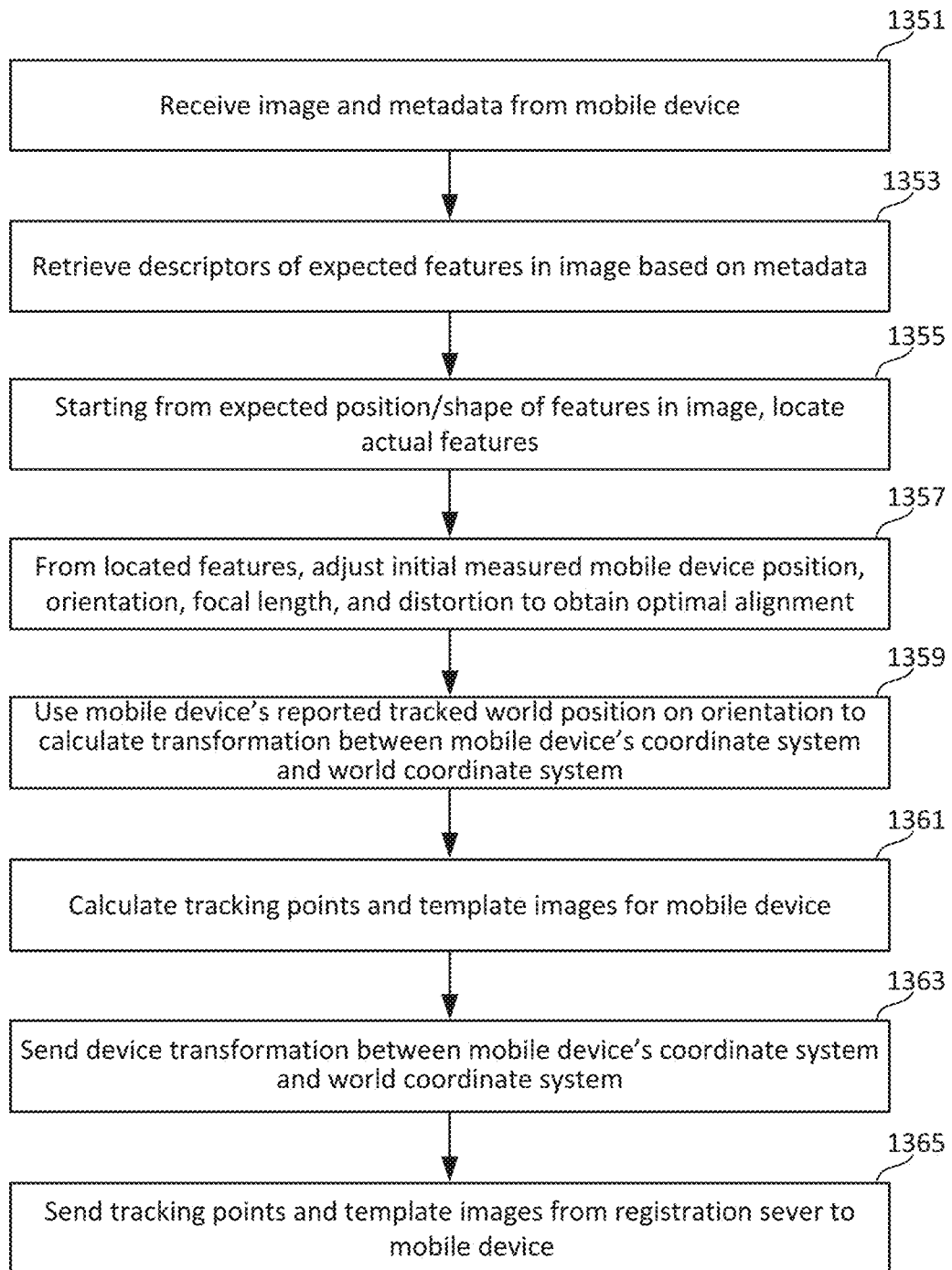

FIGS. 13A and 13B are flowcharts describing embodiments of the registration and tracking process of step 607 and 609 of FIG. 6. FIG. 13A describes the process performed by the mobile device 321 and FIG. 13B describes the registration process performed by the registration/connection server 311. Once a user is at the venue, the user's phone or other mobile device 321 obtains one or more frames of image data containing from camera 501 along with the image's corresponding camera position and orientation metadata from the sensors 507, as described in the preceding paragraphs. Step 1301 of FIG. 13A is the capturing of the one or more images by the mobile device and step 1303 includes the accumulation of the corresponding metadata at the mobile device. Once accumulated and stored in the processors/memory 509, the image and image metadata can then be sent from the mobile device 321 to the registration/connection server 311 at step 1305 over the interfaces 505 or cellular transceiver 511.

At steps 1307 and 1309, the mobile device 321 receives the transformation between the mobile device's coordinate system and the real world coordinate system and the tracking points and template images from the registration/connection server 311. Before going to steps 1307 in FIG. 13A, however, FIG. 13B is discussed as it describes how the received information at steps 1307 and 1309 is generated on the registration/connection server.

More specifically, FIG. 13B describes how the data sent from the mobile device 321 at step 1105 is used by the registration/connection server 311 to generate the data received back the mobile device in steps 1307 and 1309. Starting at step 1351, the registration/connection server 311 receives the image and image metadata from the mobile device 321 over the network interfaces 450. Based on the images' metadata, the registration/connection server 311 retrieves the descriptors of expected features at step 1353 from feature database 309 over the network interfaces 450, where this data can be stored in the memory 420 or mass storage 430. Starting from the expected positions and shapes of the features in the images, and given the corresponding camera intrinsic features, at step 1355 the registration/connection server 311 matches input image features in the database backed by stored 3D positions. From the located features, at step 1357 registration server can adjust the initial measurement of the image data and determine an optimal pose. The tracked real world position and orientation of the mobile device 321 are then used by the microprocessor 410 of the registration/connection server 311 to calculate the transformation between the mobile device's coordinate system and the real world coordinate system at step 1359. The registration server also calculates tracking points and template images for the individual mobile devices 321 at step 1361, where, as described in more detail below, the tracking points and template images are used by the mobile device to update its transformation between the mobile device's coordinate system and the real world coordinate system as the mobile device 321 changes pose. The transformation between the mobile device's coordinate system and the real world coordinate system can be in the form of a set of matrices for a combination of a rotation, translation, and scale dilation to transform between the coordinate system of the mobile device 321 and the real world coordinates. The calculated transformation between the mobile device's coordinate system and the real world coordinate system and tracking points/template images are respectively sent from the registration/connection server 311 over the network interfaces 450 to the mobile device 321 at steps 1363 and 1365.

Returning now to FIG. 13A and the flow as seen by the mobile device, the mobile device 321 receives the transformation between the mobile device's coordinate system and the real world coordinate system (step 1307) and the tracking points and template images (step 1309). Once the registration is complete and the information of steps 1307 and 1309 received, by using this data by the processors/memory 509 the mobile device 321 can operate largely autonomously without further interaction from the registration server as long the tracking is sufficiently accurate, with the internal tracking of the mobile device 321 continuing to operate and generate tracking data such as, for example, on a frame-by-frame basis.

At step 1311, the mobile device 321 aligns its coordinate system with the real world coordinate system based on the transformation between the mobile device's coordinate system and the real world coordinate system. This can include retrieving, for each frame of the images, tracking position and orientation, converting these to real world coordinates, and drawing 3D graphics content from the content server over the images. This correction can be implemented as an explicit transformation in the 3D graphics scene hierarchy, moving 3D shapes into the tracking frame of reference so that it appears in the correct location when composited with over the mobile devices images.

Using the tracking points and template images, the alignment of the device to real world coordinate systems is tracked at step 1313 and the accuracy of the tracking checked at step 1315. For example, every frame or every few frames, the basic features supplied by the registration process at step 1309 are detected in the mobile device's camera 501 and verified that they are in the expected location. If the tracking is accurate, the flow loops back to step 1313 to continue tracking. If the reference features cannot be found, or if they are not within a margin of their expected location, the registration process can be initiated again at step 1317 by sending updated image data and metadata to the registration/connection server 311. Additionally, the mobile device 321 can periodically report usage and accuracy statistics back to the registration/connection server 311.

Although FIG. 3 explicitly illustrates only a single mobile device 321, and the flows of FIGS. 13A and 13B are described in terms of only a single mobile device, in operation the system will typically include multiple (e.g., thousands) such mobile devices and the flows of FIGS. 13A and 13B can be performed in parallel for each such mobile device. Additionally, the distribution of the amount of processing performed the mobile device relative to the amount of processing performed on the servers can vary based on the embodiment and, within an embodiment, may vary with the situation, such as by the mobile devices or registration servers could monitor the communication speed in real time. For example, if a latency in communications between a mobile device and the servers exceed a threshold value, more processing may be shifted to the mobile devices, while if transmission rates are high additional processing could be transferred to servers to make use of their greater processing power.

Figure 14A:
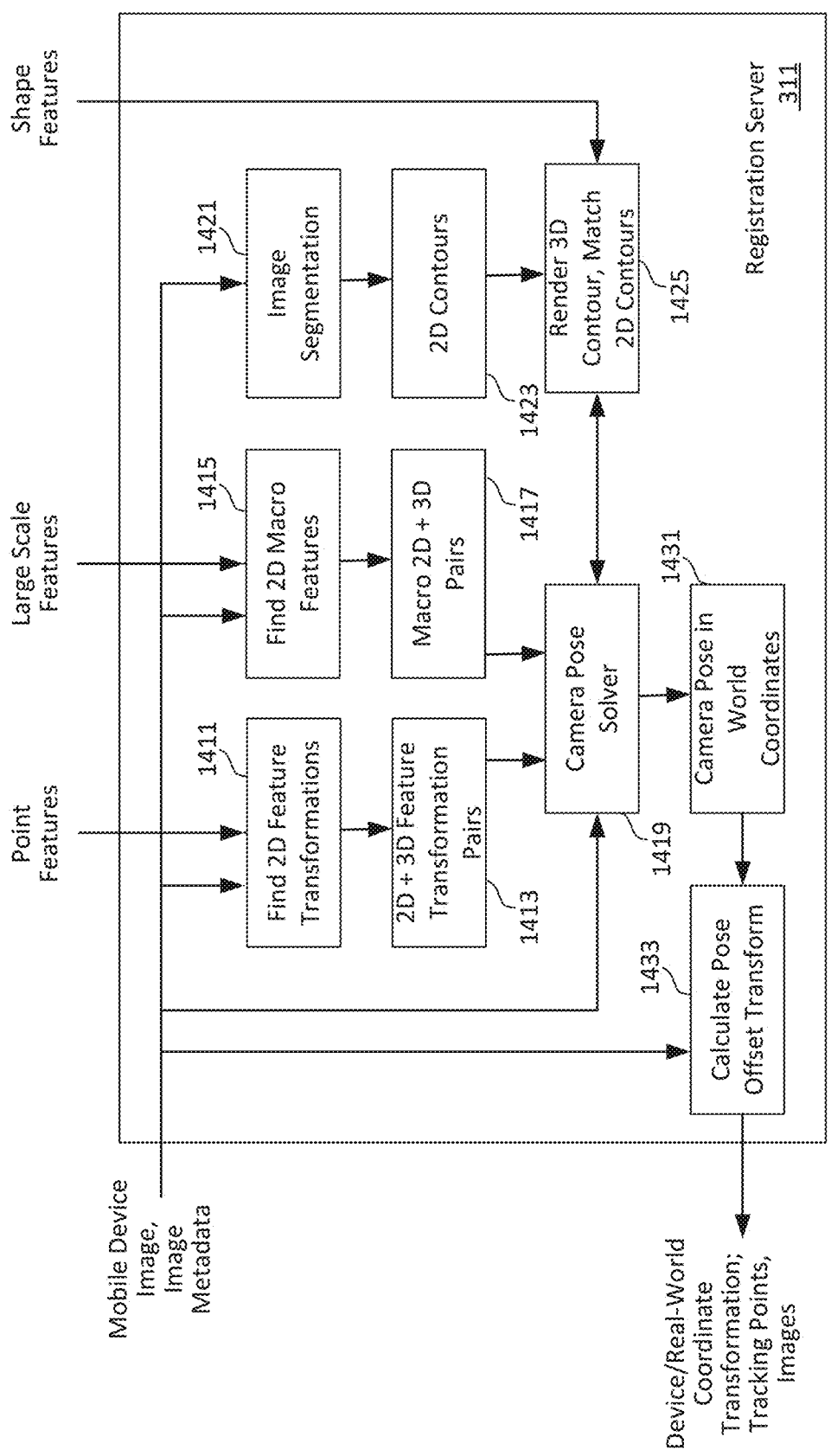
FIG. 14A is a block diagram of an embodiment for the registration/connection and content server.

FIG. 14A is a more detailed flowchart of an embodiment for the operation of registration/connection server 311. The registration/connection server 311 retrieves the output of the three columns from registration processing 307 from the feature database 309 and combines these with the image data and metadata from a mobile device 321 to determine the transformation between the mobile device's coordinate system and the real world coordinate system. In terms of FIG. 4, the inputs (image data and image metadata from the mobile devices 321 and point features, large scale features, and shape features from the feature database 309) can be received through the network interfaces 450 and the outputs (the coordinate transformations and tracking points and template images) transmitted to the mobile device 321 by the network interfaces 450. The processing steps of FIG. 14A (e.g., 1411, 1415, 1419, 1421, 1425, 1433) can be performed by the microprocessor 410, with the resultant data (e.g., 1413, 1417, 1423, 1431) stored in the memory 420 or mass storage 430, depending on how the microprocessor stores it for subsequent access.

The point features from the database 309, such as in the form a descriptor and 3D real world coordinates in the form of scale invariant feature transformation (SIFT) features, for example, and the mobile device image data and image metadata are supplied to processing block 1411 to determine 2D feature transformations, with the resultant output data of 2D and 3D feature transformation pairs 1413, which can again be presented in a SIFT format. The processing of to find 2D macro features 1415 matches the mobile device's 2D image data to the 3D large scale features. To find the 2D macro features from the mobile device's image data, the inputs are the 2D image data and corresponding image metadata from the mobile device 321 and the large scale feature data (macro features and their 3D coordinate data) from the feature database 309. The processing to find 2D macro features 1415 from the mobile device's images can implemented as a convolutional neural network (CNN), for example, and generates matches as 2D plus 3D transformation pairs 1417 data for the large scale macro features of the venue.

For embodiments that use the 3D survey dataset, shape features extracted from the 3D survey data are combined with the image data and image metadata from the mobile device 321. The mobile device's image data and image metadata undergo image segmentation 1421 to generate 2D contours 1423 for the 2D images as output data. The image segmentation can be implemented on the registration/connection server 311 as a convolutional neural network, for example. The 2D contour data 1423 can then be combined with the 3D contour data from the feature database 309 in processing to render the 3D contours to match the 2D contours within the images from the mobile device 321.

A camera pose solver 1419 generates the camera pose for mobile device 321 in real world coordinates 1431 as output data. The camera pose solver 1419 input data are the image data and image data from the mobile device 321, the 2D plus 3D feature transformation pairs 1413 data, and the macro 2D plus 3D transformation pairs 1417 data. The camera pose solver 1419 can also interact with the rendering of 3D contours and matching with 2D contour processing 1425. Based on these inputs, the output data is the camera pose of mobile device 321 in the real world coordinates 1431, which are then used to determine the transform so that the mobile device 321 can align its coordinate system to real world. The processing to calculate the pose offset transform 1433 uses the camera pose in real world coordinates 1431 and the image data and image metadata from mobile device 321. The device to real world coordinate transform can be a matrix of parameters for a translation to align the origins of the two coordinate systems, a rotation to align the coordinate axes, and a dilation, or scale factor, as distances may be measured differently in the two coordinate systems (e.g., meters in the mobile device 321 whereas measurement for a venue are given in feet). The device to real world coordinate transform can then be sent from the registration/connection server 311 to the mobile device 321 along a set of tracking points and template images. Although described in terms of a single mobile device 321, this process can be performed concurrently for multiple mobile devices by the registration server.

Figure 14B:
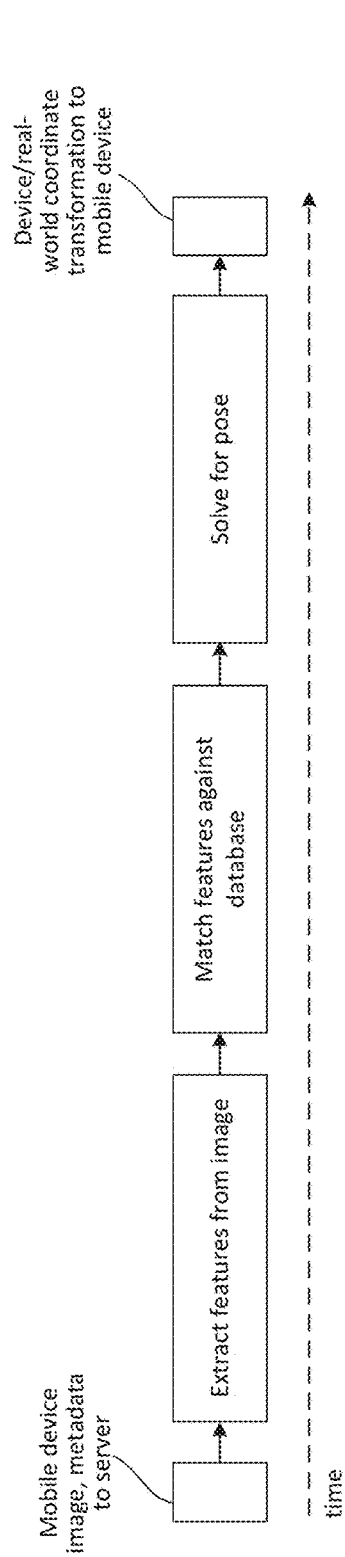
FIGS. 14B-14D illustrate embodiments for the timing of the different parts of the registration/connection process.
Figure 14C:
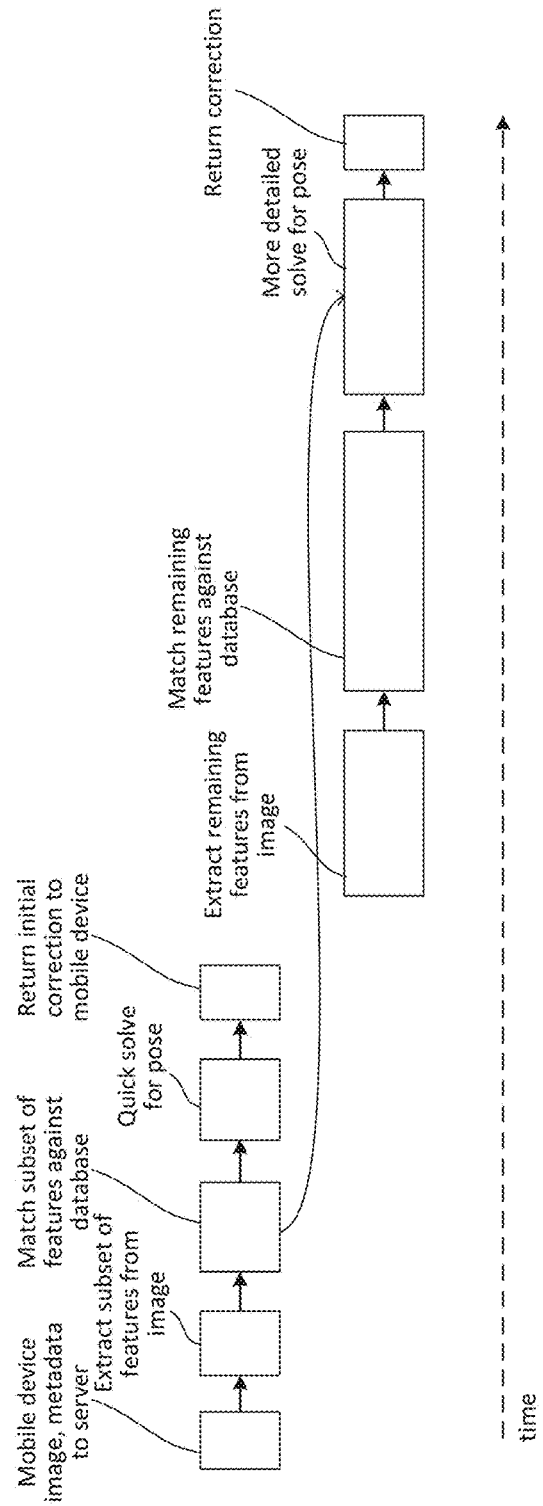
Figure 14D:
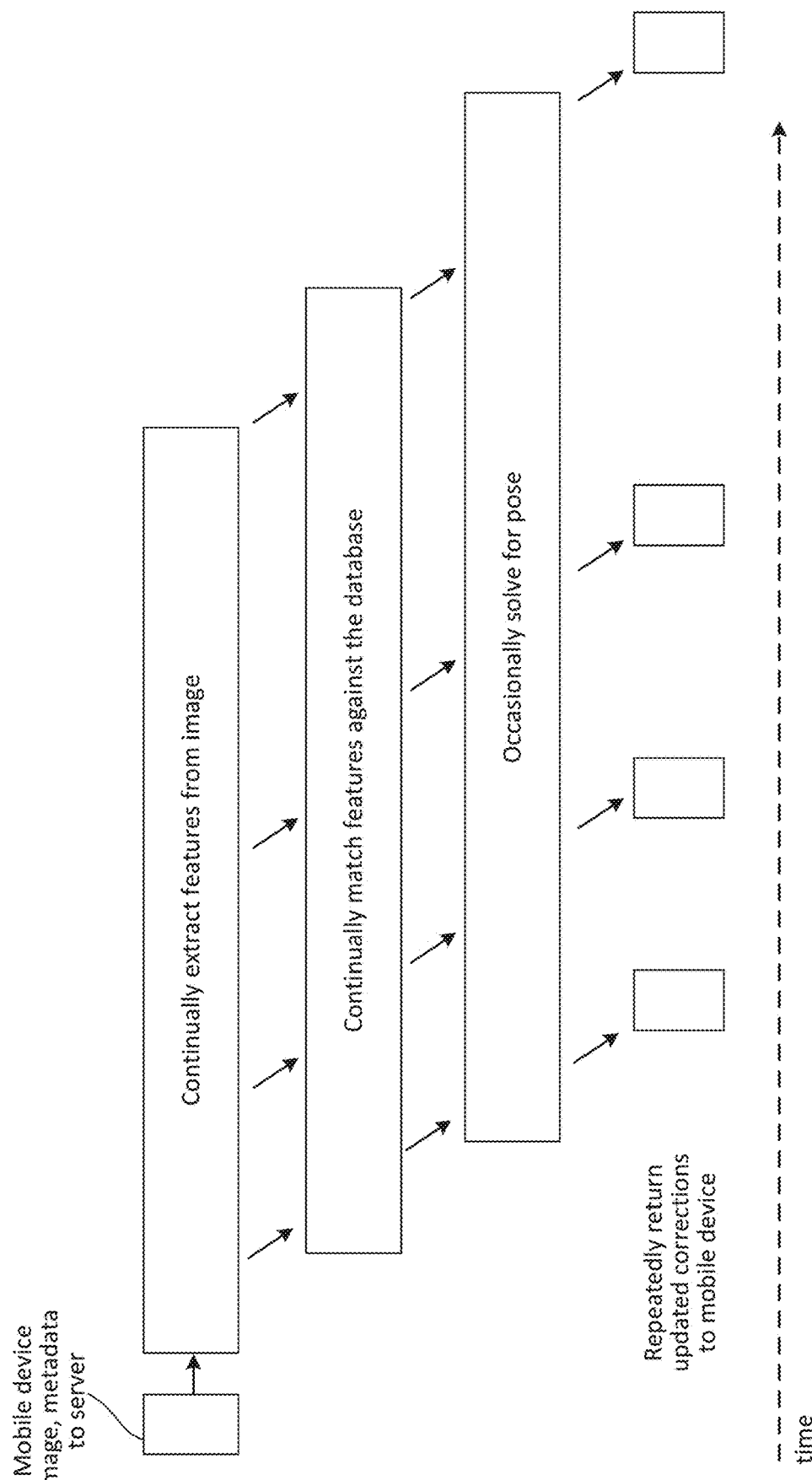

FIGS. 14B-14D illustrate implementations for the registration of a mobile augmented reality device 321 with a central registration/connection server or servers 311. In the embodiment of FIG. 14A, the implementation sequentially performs each of the elements the registration process where the mobile device 321 sends image data and image metadata to a central registration/connection server 311, extracts features from the images data, matches features against the feature database, solves for the pose of the mobile device 321, and sends a device/real world coordinate transformation (either for an initial transformation to align the coordinate systems or to correct/update the transformation) back to the device. As the speed of the response of the registration/connection server 311 can be a factor in a positive user experience, alternate implementations can be used to provide a quicker response time, such as the quick/detailed implementation of FIG. 14C or the pipelined approach of FIG. 14D. The presentation of FIGS. 14B-14D present the process in terms of three steps (extract features, match features, and solve for pose), it will be understood that alternate embodiments can use additional or different steps.

In the approach of FIG. 14C, an initial correction is returned to the mobile device 321 followed by a more detail solution for solving the mobile device's pose. As represented in FIG. 14C, the determination and return of an initial correction is shown in the upper sequence, with the more detailed solution in the lower sequence. The upper sequence is similar to FIG. 14B and begins with the mobile device 321 sending image data and image metadata to the registration/connection server 311, but now only a subset of features is extracted from the image data by the registration/connection server 311. As the number of extracted features is reduced, the determination of an initial correction can be performed more quickly than for the full process of FIG. 14B. After the subset of features are extracted, the subset is matched against the feature database 309 to determine a quick solve for the mobile device's pose, with this initial correction then sent from the registration/connection server 311 to the mobile device 321. The mobile device can then begin an initial alignment of coordinate systems based on the initial correction data. To provide a more detailed solve for the pose of the mobile device 321, the registration/connection server 311 extracts the remaining features from the image data, matches these against the feature database 309, and then can refine the quick solve to generate a more detailed solve for the pose of the mobile device 321. The more detailed correction can then be used by the mobile device 321 to refine the quick result. Although FIG. 14C illustrates the rough solution being determined and sent prior to starting the full registration process, in some embodiments these can overlap, such as beginning to extract the remaining features while the subset of features is being matched against the database.

FIG. 14D illustrates an extension of the process of FIG. 14C to a pipelined approach, incrementally returning better results as the registration/connection server 311 repeatedly extracts features from the image data, matches each set of extracted features against the feature database 309, repeatedly solves for the pose of the mobile device 321, and returns the updated corrections to the mobile device 321 from the registration/connection server 311. How many features that are found and matched by the registration/connection server 311 before solving and returning an initial solution to the mobile device 321 can be a tunable parameter, as can also be the solution accuracy requirements. For example, the system can adjust the thresholds for the number of features found, matched, and included in the pose solution before returning a solution based on the system's load to adapt to the number of devices undergoing the registration process. The approach of FIGS. 14C and 14D provide an early or partial result that may be of lower accuracy than that of FIG. 14, but still be sufficient to start operating without the user wait that would result in waiting for the full quality result of the arrangement of FIG. 14B.

Figure 15:
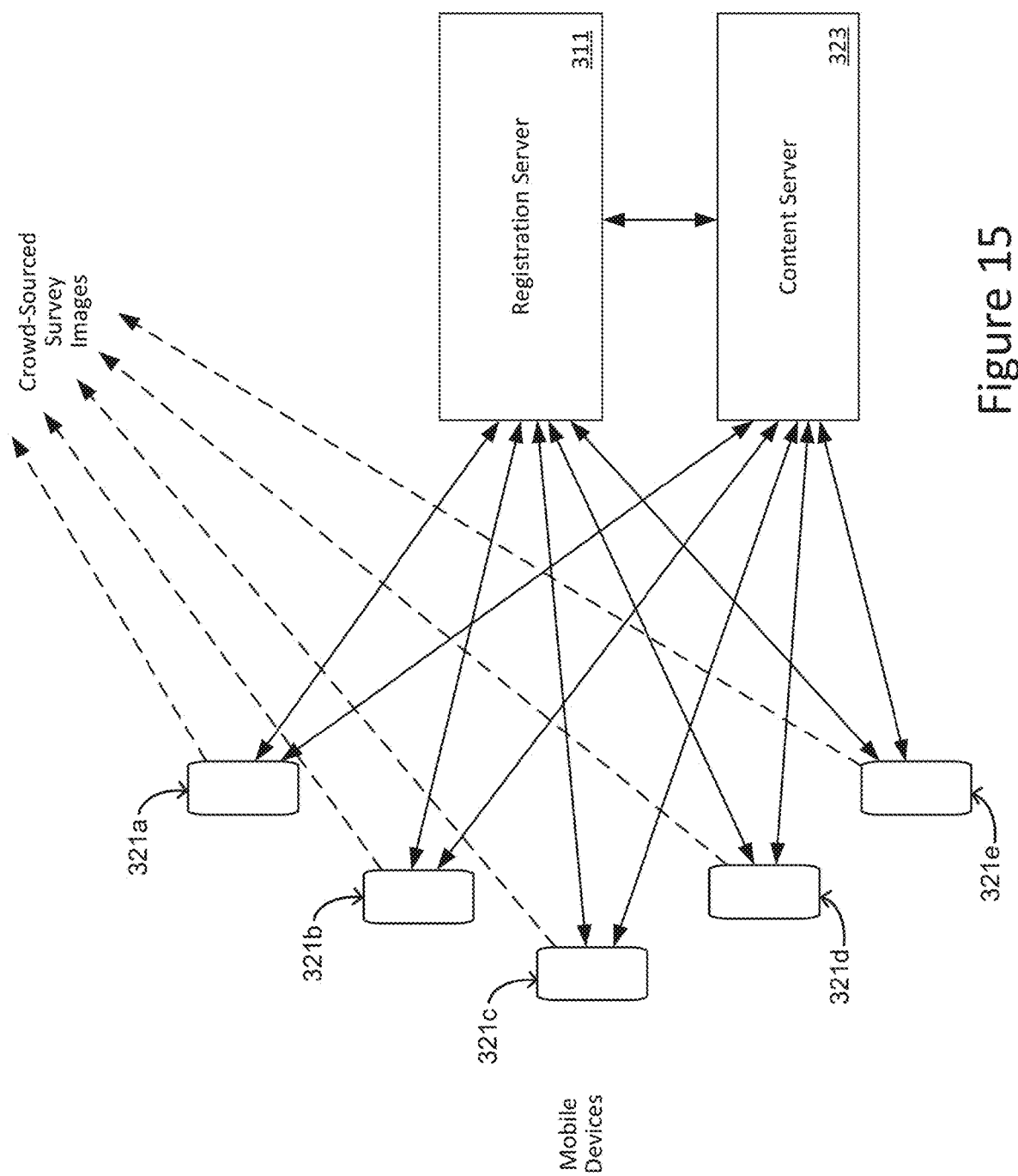
FIG. 15 illustrates the use of multiple mobile devices with the registration/connection server and content server.

FIG. 15 illustrates the use of multiple mobile devices 321a, 321b, 321c, 321d, and 321e with the registration/connection server 311 and content server 323 The example of FIG. 15 shows five mobile devices, but the number can range from a single device to large numbers of such devices used by viewers at an event venue. The mobile device can be of the same type or of different types (mobile phone, tablet, or AR headset, for example). Each of the mobile devices 321a, 321b, 321c, 321d, and 321e can independently supply the registration/connection server 311 with image data and image metadata as described above for a single mobile device 321. The registration/connection server 311 can concurrently and independently perform the registration process for each of the mobile devices, providing them with their corresponding transformation between the mobile device's coordinate system and the real world coordinate system and with their own set of tracking points and reference images. Each of the mobile devices 321a, 321b, 321c, 321d, and 321e can independently request and receive 3D graphics and other content from the content server 323. Although FIG. 15 represent the registration/connection server 311 and content server 323 as separate blocks, in an actual implementation each of these can correspond to one or more servers and parts or all of their functions can be combined within a single server.

In some embodiments some or all of the mobile devices 321a, 321b, 321c, 321d, and 321e can provide crowd-sourced survey images that can be used by registration processing 307 to supplement or, in some cases, replace the survey images from a survey camera rig 301. Depending on the embodiment, the crowd-sourced survey images can be one or both of the image data and image metadata supplied as part of the registration process or image data and image data generated in response to prompts from the system. The crowd-sourced survey images can be provided before or during an event. In some cases, such as extended outdoor venue (a golf course or route for a cycling race), there may be activity at the location of some viewers but not others, so that some of the crowd-sourced survey images could be used for assembling the feature database 309 relevant to a location prior to activity at the location, while other crowd-sourced survey images or other data would be relevant to locations of current activity.

Once a mobile device 321 has been registered, it can receive 3D graphics and other content for display on the mobile device. FIGS. 1 and 2 include some example of such content, with FIG. 16 presenting a block diagram of the distribution of content to user's mobile devices.

Figure 16:
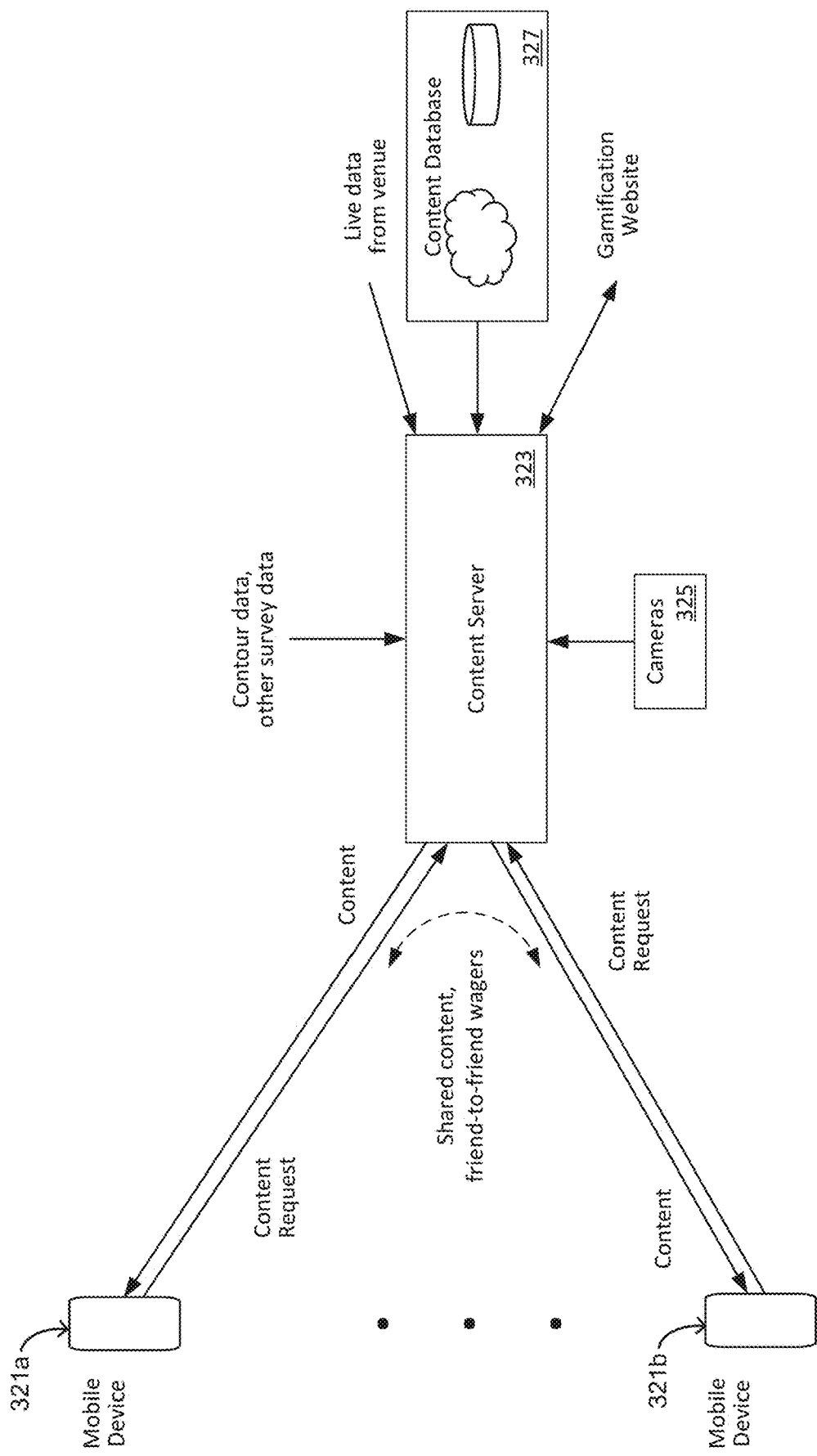
FIG. 16 is a block diagram of an embodiment for supplying content to one or more user's mobile devices.

FIG. 16 is a block diagram of an embodiment for supplying content to one or more user's mobile devices. FIG. 16 explicitly represents two such mobile devices, 321a and 321b, but at an actual event there could be large numbers of such mobile devices at a venue. The mobile devices 321a and 321b request and receive content from the content server 323. Although the specifics will vary depending on the venue and the type of event, FIG. 16 illustrates some examples of content sources, where some examples of content were described above with respect to FIGS. 1 and 2.

A content database 327 can be used to supply the content server 323 with information such as 3D graphics and other information that can be determined prior to an event, such as player information, elevation contours, physical distances, and other data that can be determined prior to event. Some of this content, such as 3D contours may also be provided from the registration server and the feature database 309.

The content server 323 may also receive live data from the venue to provide as viewer content on things such as player positions, ball positions and trajectories, current venue conditions (temperature, wind speed), and other current information on the event so that live, dynamic event data visualization can be synchronized to the playing surface live action. One or more video cameras 325 at the venue can also provide streamed video content to the mobile devices 321a and 321b: for example, in some embodiments if a user of a mobile device requests a zoomed view or has there is subject to occlusions, the cameras 325 can provide a zoomed view or fill in the blocked view.

For some embodiments, the different mobile devices 321a and 321b can also exchange content as mediated by the content server 323. For example, the viewers can capture and share content (amplified moments such as watermarked photos) or engage in friend-to-friend betting or other gamification. The viewer can also use the mobile device 321a or 321b to send gamification related requests (such as placing bets on various aspects of the event, success of a shot, final scores, and so on) and responses from the content server 323 to the internet, such as for institutional betting or play for fun applications.

Figure 17:
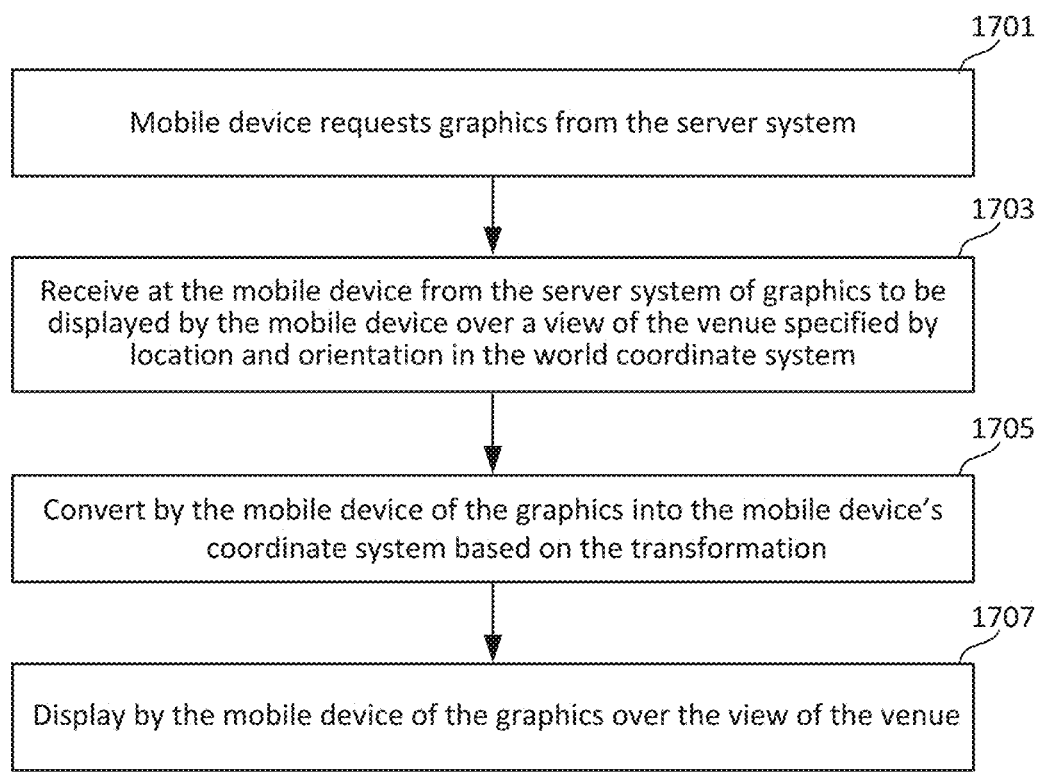
FIG. 17 is a flowchart for one embodiment of a process for requesting and receiving graphics by a registered/connected mobile device.

FIG. 17 is a flowchart describing one embodiment of a process for requesting and receiving graphics by a registered mobile device 321, providing more detail for step 611 of FIG. 6. At step 1701 the registered mobile devices 321a, 321b, 321c, 321d, 321e of FIG. 15 request graphics content from content server 323. (The mobile devices 321a, 321b, 321c, 321d, 321e will have already received the transformation between the mobile device's coordinate system and the real world coordinate system from the registration/connection server 311.) The requests for graphics at step 1701 can be based both on direct user input and on automatic requests by a mobile device 321. For example, as the mobile device has its field of view changed, new graphics can be requested based on the corresponding change in pose, in which case the mobile device can automatically issue a request for graphs appropriate to the new view of the venue. The graphics can also be used based on what is occurring in the view, such as when one set of players in a golf tournament finish a hole and a new set of players start the hole. User input to select graphics can be selected through the display of the mobile device 321, such as by the touch screen of a mobile phone or laptop computer, or by pointing within the field of view of the camera for the mobile device. For example, a viewer may indicate a player's position within the view to request graphics of information on the player.

In step 1703, mobile devices 321a, 321b, 321c, 321d, 321e receive from content server 323 their respective graphics to be displayed by the mobile devices 321a, 321b, 321c, 321d, 321e over a view of the venue, where the graphics are specified by location and orientation in the real world coordinate system. Each of the mobile devices 321a, 321b, 321c, 321d, 321e can then use processor(s) 509 to convert the graphics into the mobile device's coordinate system based on the transformation at step 1705. The transformed graphics are then presented over a view of the venue by display 503 at step 1707.

The discussion to this point has focused on embodiments of augmented reality systems using mobile devices, including augmented reality enabled viewing devices such as mobile phones, headsets, or glasses that are used to enhance a viewer's experience at an event's venue. The techniques can also be extended for use at remote locations, such as at home or a sport bar, for example, where the event is viewed on a television in conjunction with a smart television as part of "tabletop" embodiment.

Figure 18:
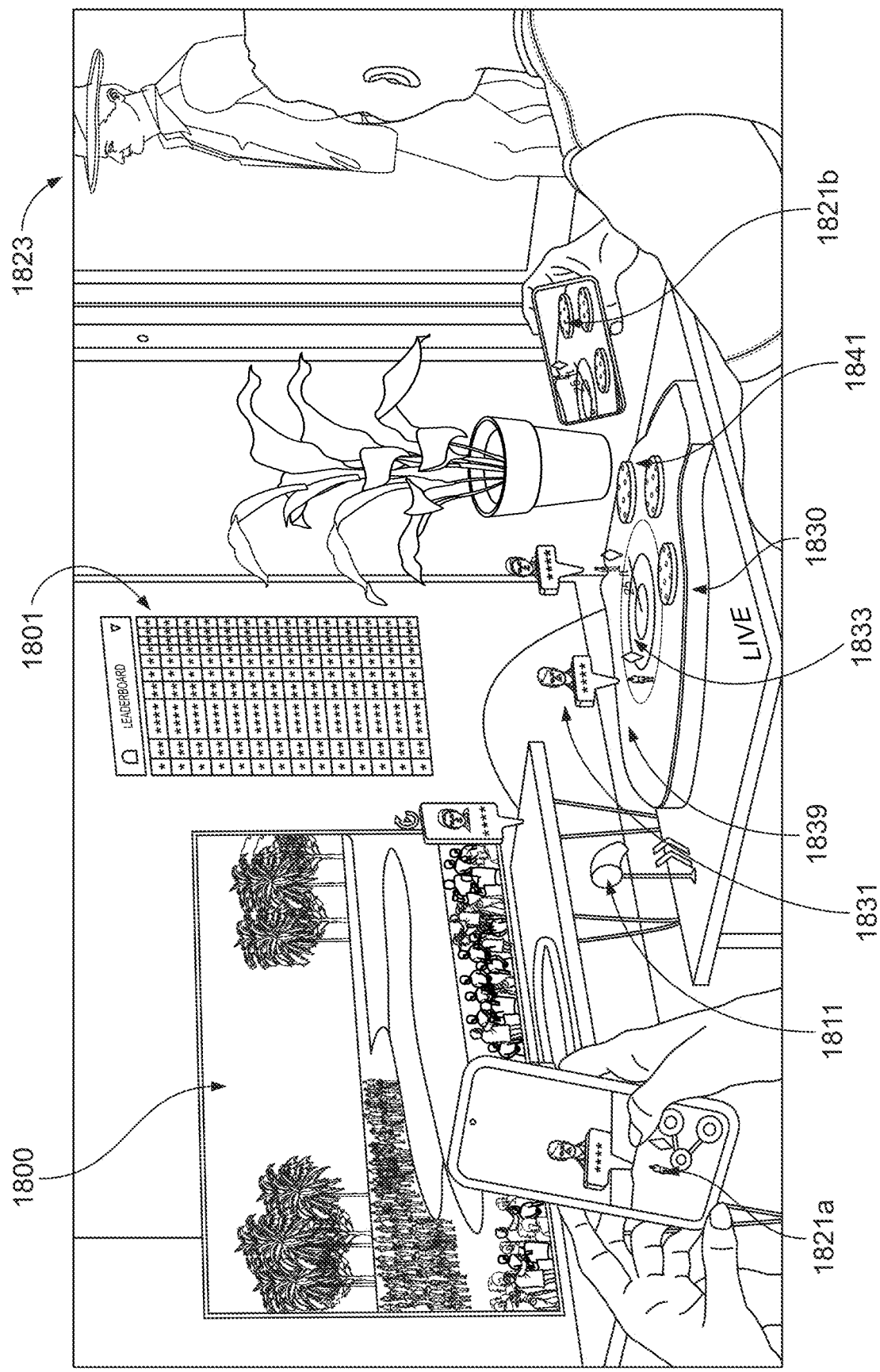
FIGS. 18 and 19 respectively illustrate examples of a tabletop embodiment for events at a golf course venue and a basketball venue, corresponding to the at-venue embodiments of FIGS. 1 and 2.
Figure 19:
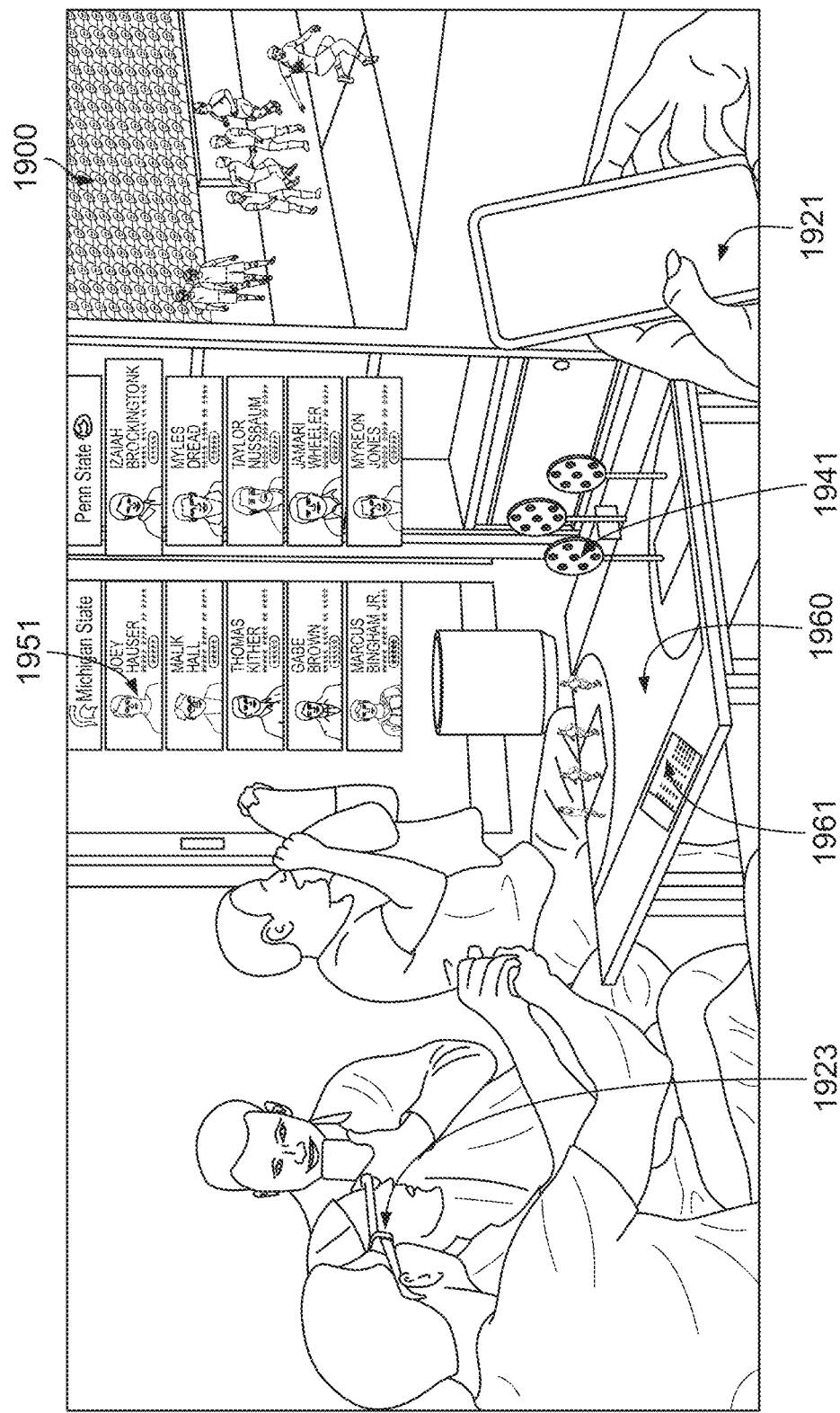

FIGS. 18 and 19 illustrate examples of a tabletop embodiment for respective events at a golf course venue and at a basketball venue, corresponding to the in-venue embodiments of FIGS. 1 and 2. In a tabletop embodiment, in addition to, or instead of, being able to view the event on a television, the viewers can also view the event on mobile devices, such as a mobile phone, with overlaid graphs and also to view graphics on a presentation of images of the event or a model of the venue through an AR viewing device such as a AR headset or AR glasses.

FIG. 18 illustrates the same event and venue as FIG. 1, but viewed at a remote location on a television 1800. The event can again be viewed on the display of a mobile device 1821a or 1821b with graphics and other AR content displayed along with the view of the event. A tabletop view 1830 can also be viewed by a head mounted AR display device 1823 such as an AR headset or AR glasses. The augmented view can also present graphics content, such as player statistics 1801 or course conditions such as the wind indication graphic 1811. Embodiments can include both 3D presentations, such as through use of stereoscopic video viewed by a head mounted AR display device 1823, and also monoscopic presentations as viewed on a mobile phone or other mobile device with a screen display, where the following discussion is primarily presented in the context of a 3D presentation.

The tabletop view 1830 can present video of the event remotely when viewed through a head mounted display 1823 and can include the graphics as described above for the in-venue view, both on the mobile device 121 and also in the zoomed view 130 of FIG. 1. Some examples include player info and ball location 1831, concentric distances to the holes 1833, and a contour grid 1839, as well as gamification graphics such as wager markers 1841. This can include 3D graphics that extend beyond the frame of the tabletop view 1830, such as the ball trajectory 1893 originating at 1891, as well as player information at 1895, for example.

As discussed in more detail below, the cameras generating the 3D video can be positioned so the camera angles match a user's expected viewing angle when viewed through a head mounted AR display device 1823 to provide a pseudo-volumetric experience. For purposes of AR immersion, the tabletop presentation can be generated using partial segmentation by masking out a geographic area of interest for each camera pair, segmenting out any objects of interest that extend outside the masked area, and compositing the two together to get the final segmented video for each camera. The tabletop presentation can be anchored at a user selected location and, in some embodiments, a virtual AR anchor location can be created for situations where an optimal viewing angle is not readily available, such as by creating a virtual table standing on a real floor and then using the virtual tabletop as the anchor surface for the AR video experience.

FIG. 19 illustrates the same event and venue as FIG. 2, but viewed at a remote venue on a television 1900. A viewer can again view the event with augmented reality graphics on a mobile device 1921 with a display screen, the same as those presented above for in-venue viewing, or as a tabletop view 1830 presentation when viewed with an augmented reality head mounted display 1923. In the tabletop view 1960, the augmented reality content can again include content such as player statistics 1951 and 1961 described above with respect to FIG. 2, along with gamification graphics 1941, and can again extend beyond the frame of the tabletop video. The broadcast event on the television 1900 can be synchronized with the tabletop view 1960 and mobile device views based on a perceptual hashing or other techniques, so that the tabletop experience (or any additional AR experience) is synchronized with the user's primary viewing device, such as the television 1900.

Figure 20:
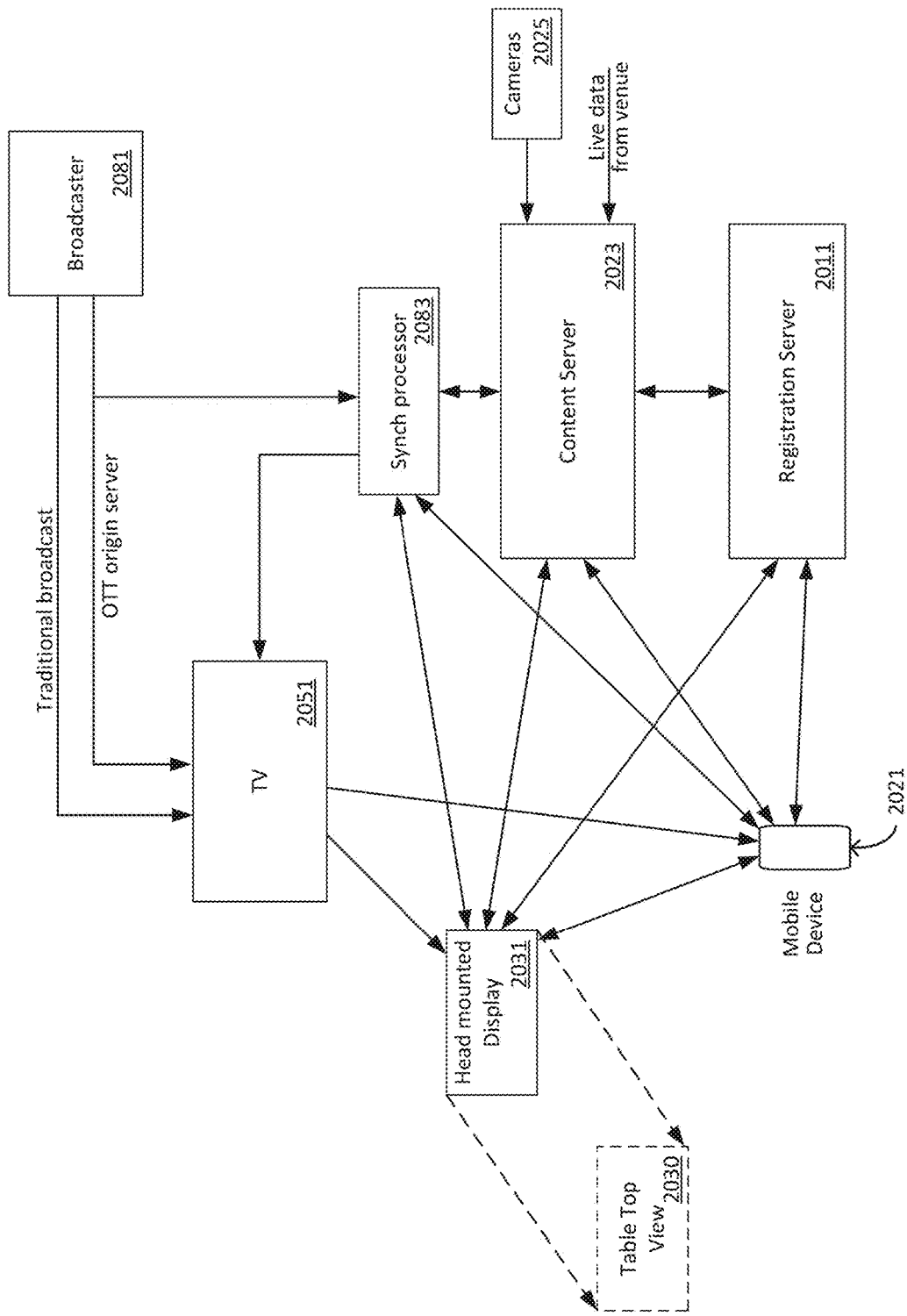
FIG. 20 is a block diagram for a tabletop embodiment.

FIG. 20 is a block diagram of some elements of a tabletop embodiment. Similar to FIG. 3, FIG. 20 again illustrates a registration server 2011 and a content server 2023, along with a mobile device 2021 such as a mobile phone or other mobile device with a screen display. These elements can operate much as described above for the corresponding elements of FIG. 3 and other figures above, but where the databases and other elements of FIG. 3 are not explicitly shown in FIG. 20. Although only a single mobile device 2021 and a single head mounted display 2031 or other augmented reality viewing device are shown, multiple such devices can be used concurrently in the remote viewing location.

FIG. 20 also includes a television 2051 for remote viewing of the event, where the television may be connected to receive content from a network or other broadcaster 2081 by one or both of a traditional broadcast mechanism (e.g., cable, satellite, over-the-air) and/or an over-the-top (OTT) server. As used here, the term television can also include smart TVs or other displays used to present broadcast video to viewers. Although not shown in FIG. 20 to simplify the figure, in some embodiments the television may also be connected to the registration server 2011, content server 2023, or other channels to receive content.

FIG. 20 further includes a head mounted display 2031 or other augmented reality viewing device, such as an AR headset or AR glasses that can provide the tabletop view 2030, along with overlaying AR graphics. The 3D tabletop view can be based on cameras 2025 and the 3D AR graphics can be both within the frame of the segmented video and extend beyond the frame. Although not represented in FIG. 20, in some embodiments the mobile device 2021, head mounted display 2031, and/or TV 2051 can exchange signals directly without going through the servers.

So that the content displayed on the mobile device or devices 2021 and the head mounted display or displays 2031 can be synchronized with the TV 2051, a synchronizing processor 2083 can exchange signals with these devices. As explained in more detail below, one or more head mounted display 2031 or mobile device can capture a segment of video as displayed on the TV 2051 and provide this to the synchronizing processor 2083, which can also receive the video content from the OTT origin server, determine synchronization data, and provide this back to the mobile device or devices 2021 and head mounted display 2031 so that they can synchronize their display in time and, in some embodiments, physically. In some embodiments, the synch processor 2083 can also provide synchronization data to the TV 2051 so it can introduce a delay into the presentation of the broadcast video for synchronization purposes. The synchronizing processor 2083 can also exchange content with the content server 2023 so that the content server 2023 can synchronize the content provided to the mobile devices 2021 and 2031 with the TV presentation. Although the contents server 2023, registration server 2011, and synchronizing processor 2083 are each represented as separate blocks, each of these can be one or more servers or processors and can overlap in function.

Figure 21:
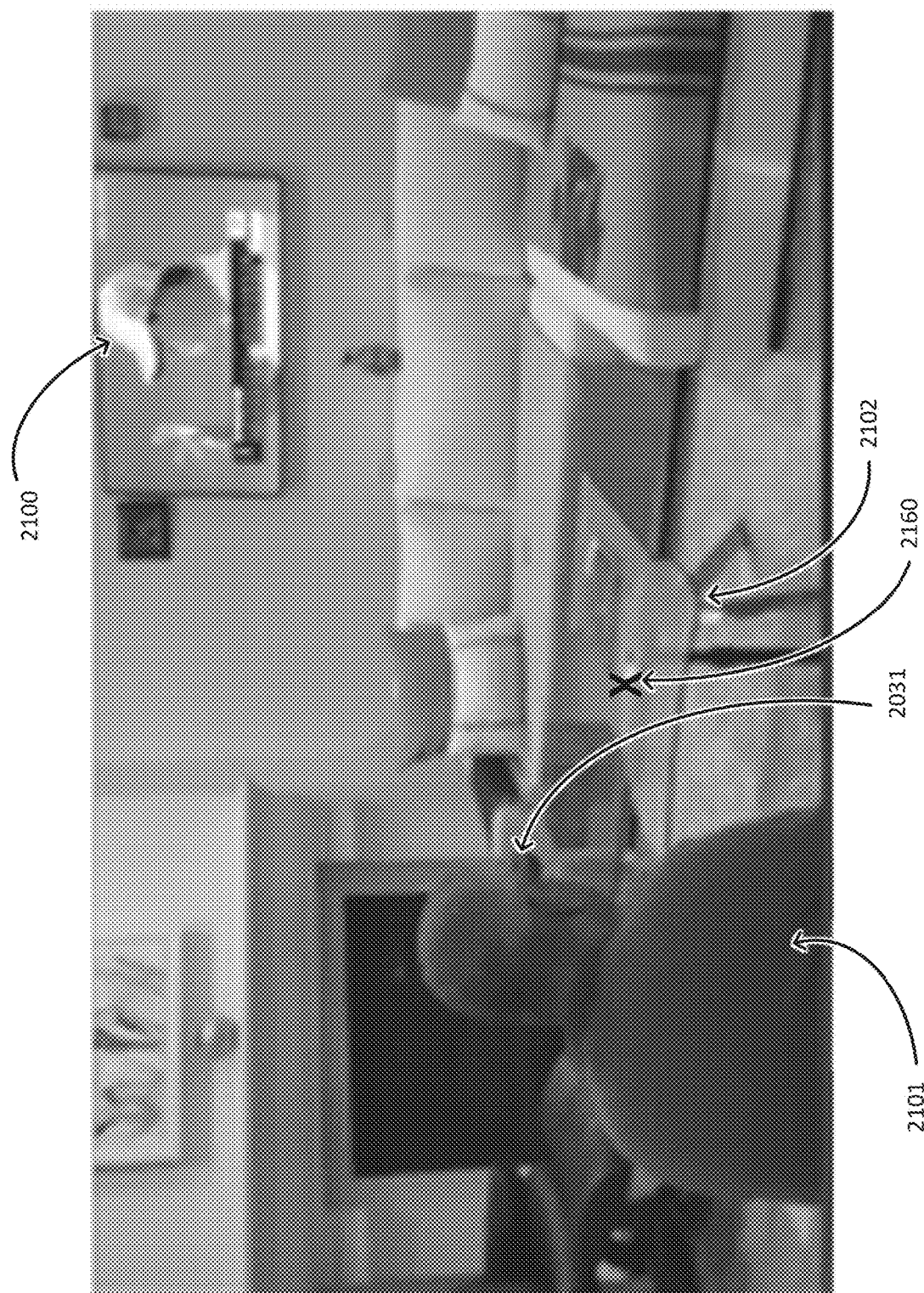
FIGS. 21 and 22 respectively illustrate examples of a user viewing a tabletop presentation of an event through an AR enabled mobile or head mounted device in a room showing the event on a television and the tabletop view as seen through the AR enabled mobile or head mounted device.
Figure 22:
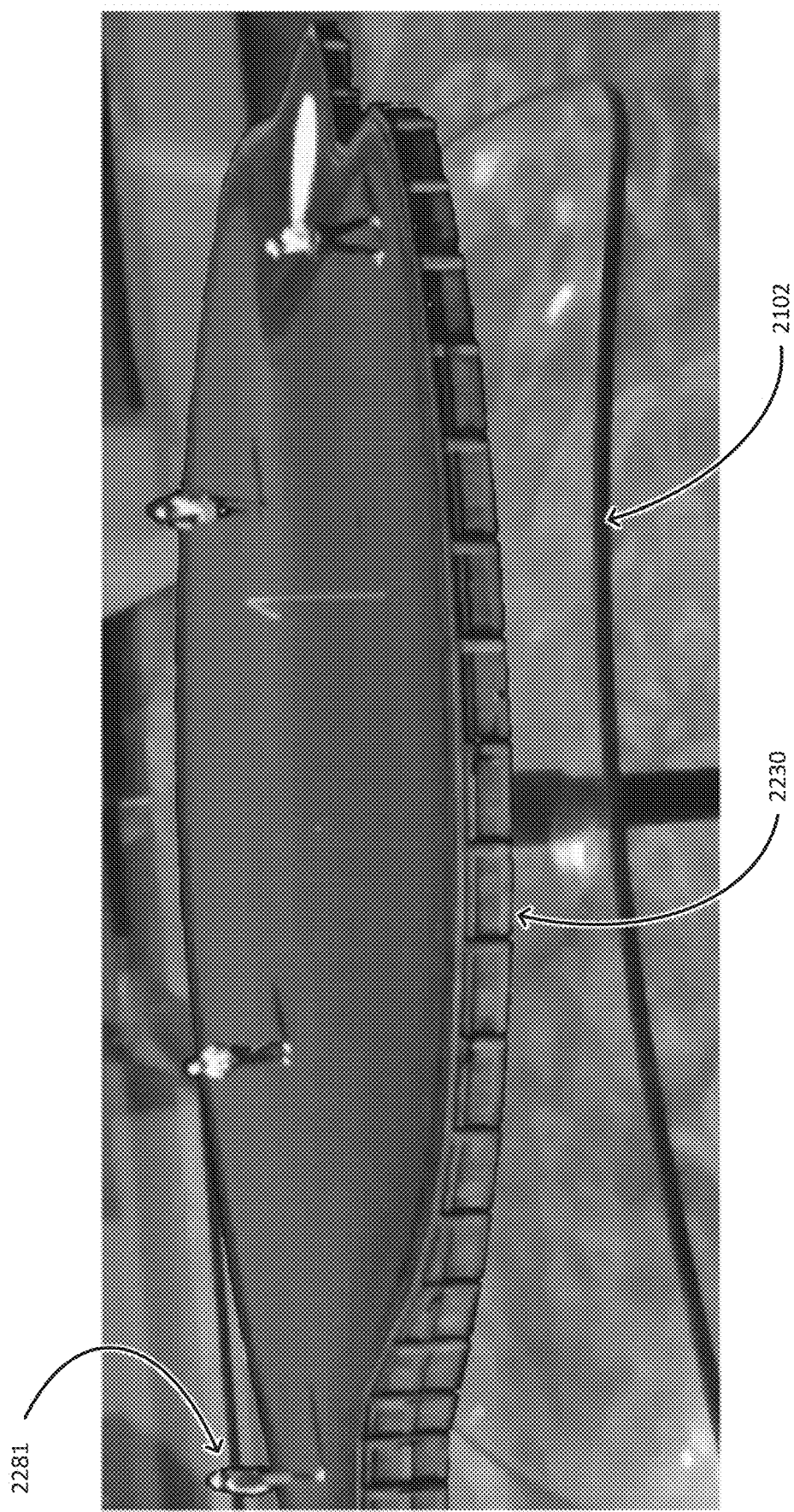

FIGS. 21 and 22 respectively illustrate examples of a user viewing a tabletop presentation of an event through an AR headset in a room showing the event on a television and the tabletop view as seen through the AR viewing device. In the room of FIG. 21, a single viewer 2101 is shown sitting on a sofa wearing an AR headset 2031. An event (a golf tournament, such as the same event shown in FIG. 18) is shown on the television 2100. The television broadcast can be seen by the viewer 2101 through the AR headset 2031 and would also be visible to others in the room in a normal viewing experience. In this example, a table 2102 in the room has been chosen as the location for the tabletop presentation an anchor point 2160 (as indicated by the X added to the image) when viewed through the AR headset 2031 in the coordinate system of the AR headset. For other viewers in the remote location not using an AR headset, the remote tabletop presentation will not be visible. Although the X at the anchor point 2160 is added just as an indication the point in the figure, in some implementations a reference object can be placed, at least initially, at the anchor for the registration process to establish the placement of the remote tabletop presentation in the coordinate system of the viewing device.

FIG. 22 shows an example of a tabletop presentation 2330 as it would appear to the viewer 2101 thought AR headset 2031, similar to the view 1830 of FIG. 18, although the AR graphics are not shown in FIG. 22. The tabletop presentation 2230 is located on the table 2102 at the anchor position and can appear to stay fixed in this position for viewer 2101 as the viewer looks around the room, such as looking at the television 2100 (where the tabletop view 2230 would appear in the lower portion of the field of vision through the AR headset 2031) or looking at the table 2102 (where the tabletop view 2230 would be in the center of the field of vision through the AR headset 2031). As discussed below, in some embodiments a virtual anchor, or "chained" anchors, may be used to maintain a viewing angle if the viewer 2101 moves or a well-positioned actual table location is not readily available. In the embodiment of FIG. 22, the tabletop view 2230 has undergone image segmentation to locate objects of interest and their boundaries, in this case a green of a golf tournament, and just present these regions, rather than a full frame of video images. As also discussed in more detail below, additional objects or regions of interest that extend outside of the primary viewing object can also be included, such as the player 2281 extending beyond the green that is the primary portion of the tabletop presentation of FIG. 22.

The tabletop presentation 2230 can be either be synthetically generated video based on a tabletop model of the venue built in much the same way as described with respect to step 605 of FIG. 6 or be video taken by cameras at the venue. By using one or more pairs of cameras, 3D video can be provided to viewers at remote locations; and by matching camera angles with the expected user's viewing angle, providing a pseudo-volumetric experience to a viewer by use of an AR headset. This can be illustrated with respect to FIGS. 23 and 24.

Figure 23:
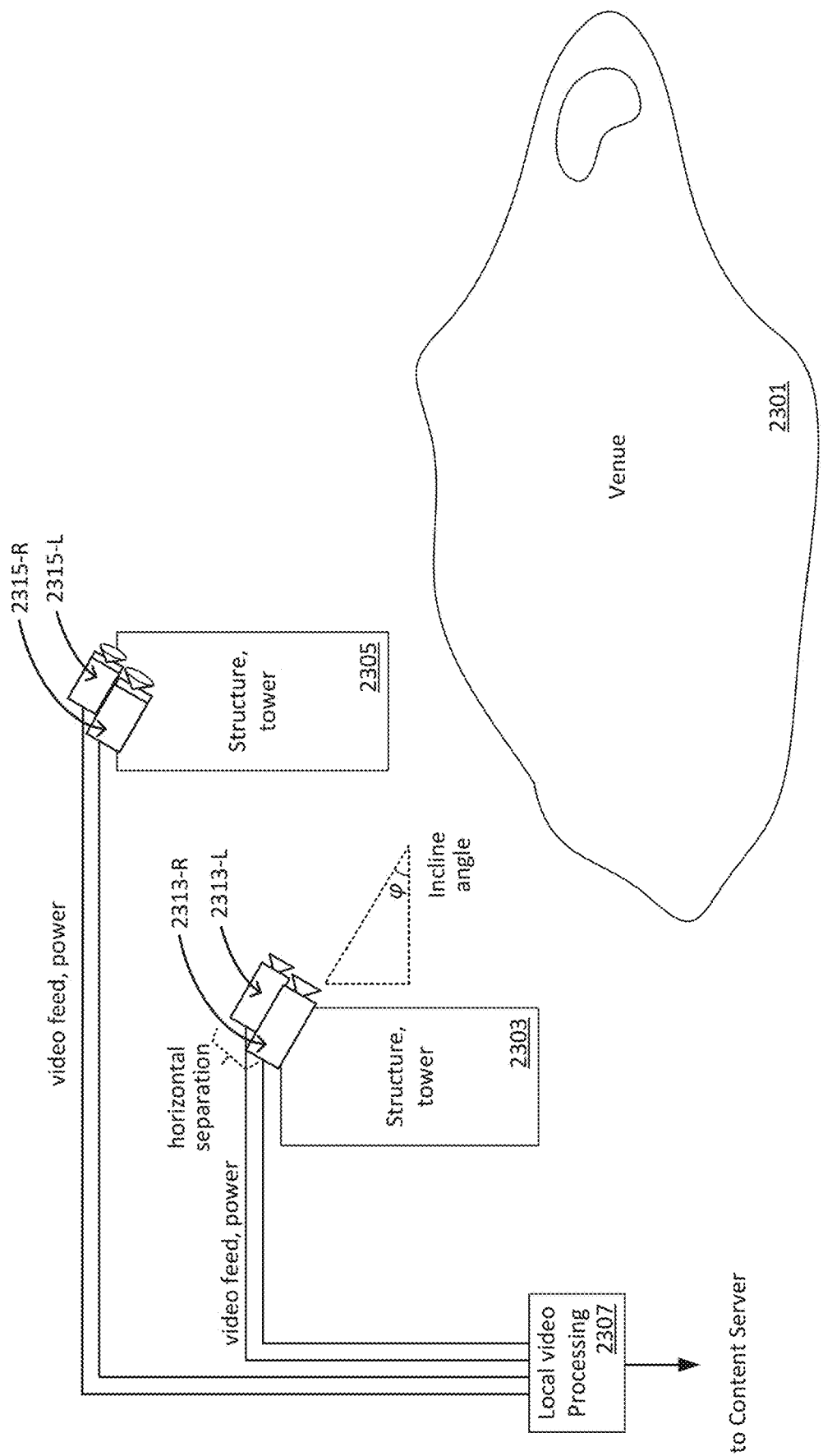
FIG. 23 is a schematic representation of the placement of cameras at a venue to provide video for a tabletop presentation.

FIG. 23 is a schematic representation of the placement of cameras at a venue to provide video for a tabletop presentation. The venue 2301 can be an outdoor venue, such as the golf course in the examples of FIGS. 18, 21, and 22, or an indoor venue, such as the example of a basketball arena in the example of FIG. 19. One or more camera pairs are located about the venue 2301, where two pairs 2313-R, 2313-L and 2315-R, 2313-L are shown. Although the discussion here is focused on the video, other embodiments can also include the capturing and streaming audio. The camera pairs can be placed to provide one or more views of one or more locations of the venue. For example, the pairs 2313-R, 2313-L and 2315-R, 2313-L can be aimed at the same physical location (e.g., a single green) to provide different views of the location. For example, the pair 2313-R, 2313-L and the pair 2315-R, 2313-L could be aimed at the same green of a golf course, but at right angles relative to each other, so that viewers sitting on a first sofa in the remote venue and a viewer on a chair or another sofa oriented at a right angle to the first sofa would see the appropriate view of the laptop presentation. In the golf example, each of the different regions of interest (e.g., different greens) can have one or more different camera pairs.

The camera 2313-R, 2313-L and 2315-R, 2313-L can be located on structures or towers 2303, 2305 at the venue 2301. The structures or towers 2303, 2305 can be specifically erected for the event or existing. The cameras are placed with an incline angle φ relative to horizontal chosen to mimic the position of the viewer at a remote venue viewing of a tabletop presentation through an AR headset, so that the height of a camera pair will depend upon the incline angle φ and the horizontal distance to the region of interest on which the camera pair is focused, where both cameras of a pair can be setup to have the same focal depth. The right and left cameras of the pairs 2313-R, 2313-L and 2315-R, 2313-L also have a horizontal separate selected to mimic the amount of parallax from the user's eyes when viewed through the AR headset.

The video from the camera pairs (2313-R, 2313-L; 2315-R, 2313-L; and other camera pairs in the venue) are connected to provide their video feeds to a local processing 2307 location, such as a mobile van or truck or a shed or other structure at the venue. The amount of processing done locally before sending the content on to another location can vary depending on the embodiment and the abilities available locally. The power for the cameras can, as represented in the figure, be provided from local video processing center 2307 or from other local power source, such as the structure, tower 2303, 2305 where it is mounted in the venue. The video feeds from the cameras can be fiber or other connections, where the feeds from the camera pairs can be individual or combined.

Figure 24:
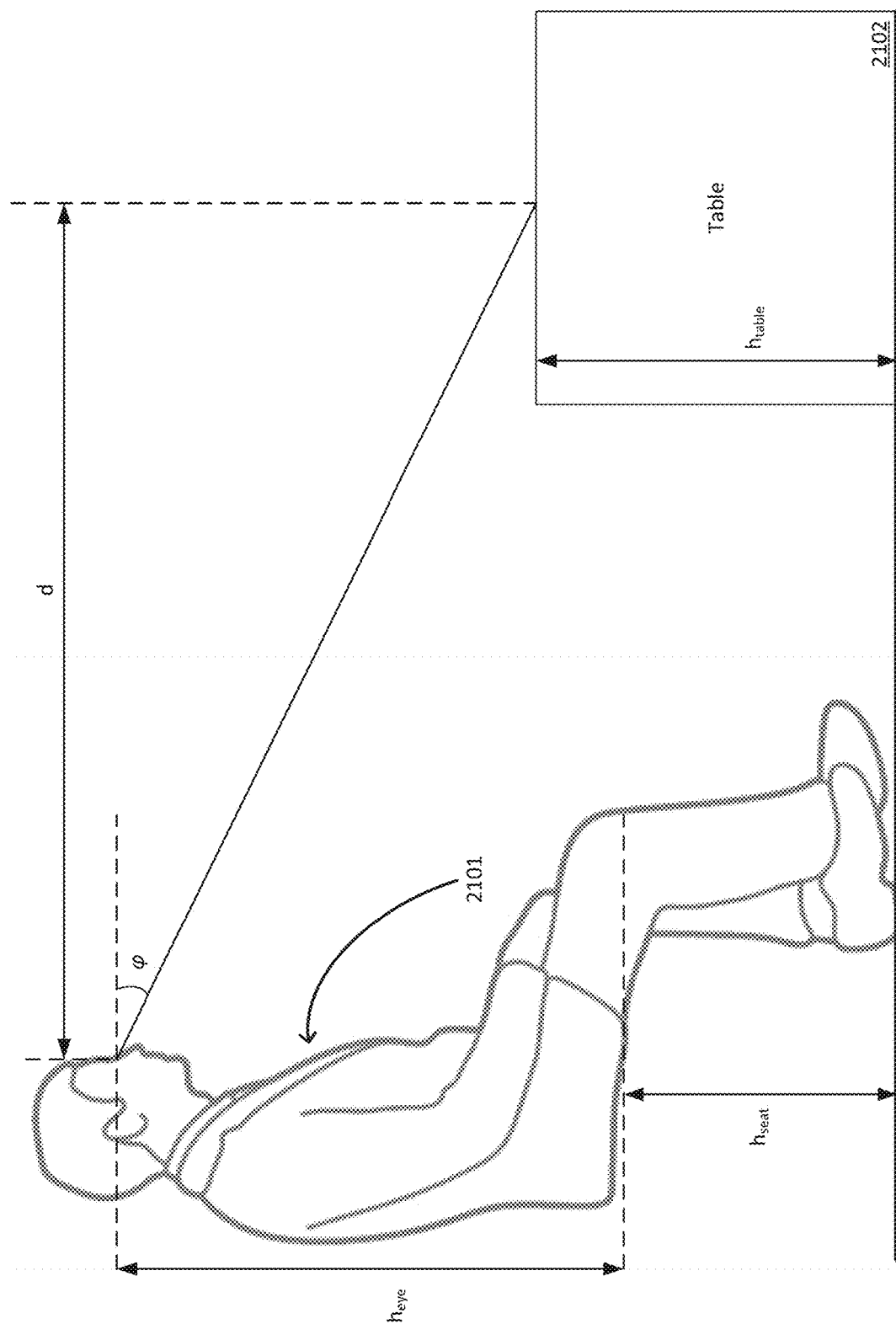
FIG. 24 illustrates some of the factors that can go into the determination of the camera pairs' angle of incline.

FIG. 24 illustrates some of the factors that can go into the determination of the camera pairs' angle of incline. The incline angle φ is the angle between the horizontal and a ray made between the eye of the viewer 2101 and the anchor location on table 2102. The purpose of an optimal angle or range of angles is to determine what is an optimal angle of the recording camera pairs, such that, when the resulting footage is displayed on a viewing medium (e.g., a mobile phone or AR headset), it appears to be anchored on the surface of the table 2102 from the viewpoint when the viewer 2101 is resting comfortably on a sofa. In terms of the diagram of FIG. 24, $$\varphi = \tan^{-1}(h_{eye} + h_{seat} - h_{table}/d),$$

where:
$h_{eye}$=vertical distance between the seat and the viewer's eye;
$h_{seat}$=vertical distance between the floor and the top of the seat;
$h_{table}$=vertical height of the table; and
d=horizontal distance between the viewer's eye and the center of the table.

To determine a value of incline angle φ, values for these parameters are needed for viewers.

Data for eye height $h_{eye}$ can found from anthropometric data tables, providing average, maximum, and minimum values for men and woman. These values can be scaled to account for some "slouchiness" that can be assumed for a viewer 2101 to arrive at an average and range of values for an expected $h_{eye}$. Average values and a range $h_{seat}$ values can also be determined, where the measured values can be scaled to account deformation of a seat when the viewer 2101 is in place. Values for $h_{table}$ can also be measured or estimated, along with values for d. Typical values suggest a value of about φ=30°, with variations for maximum and minimum viewers values of around ±10°.

Figure 25:
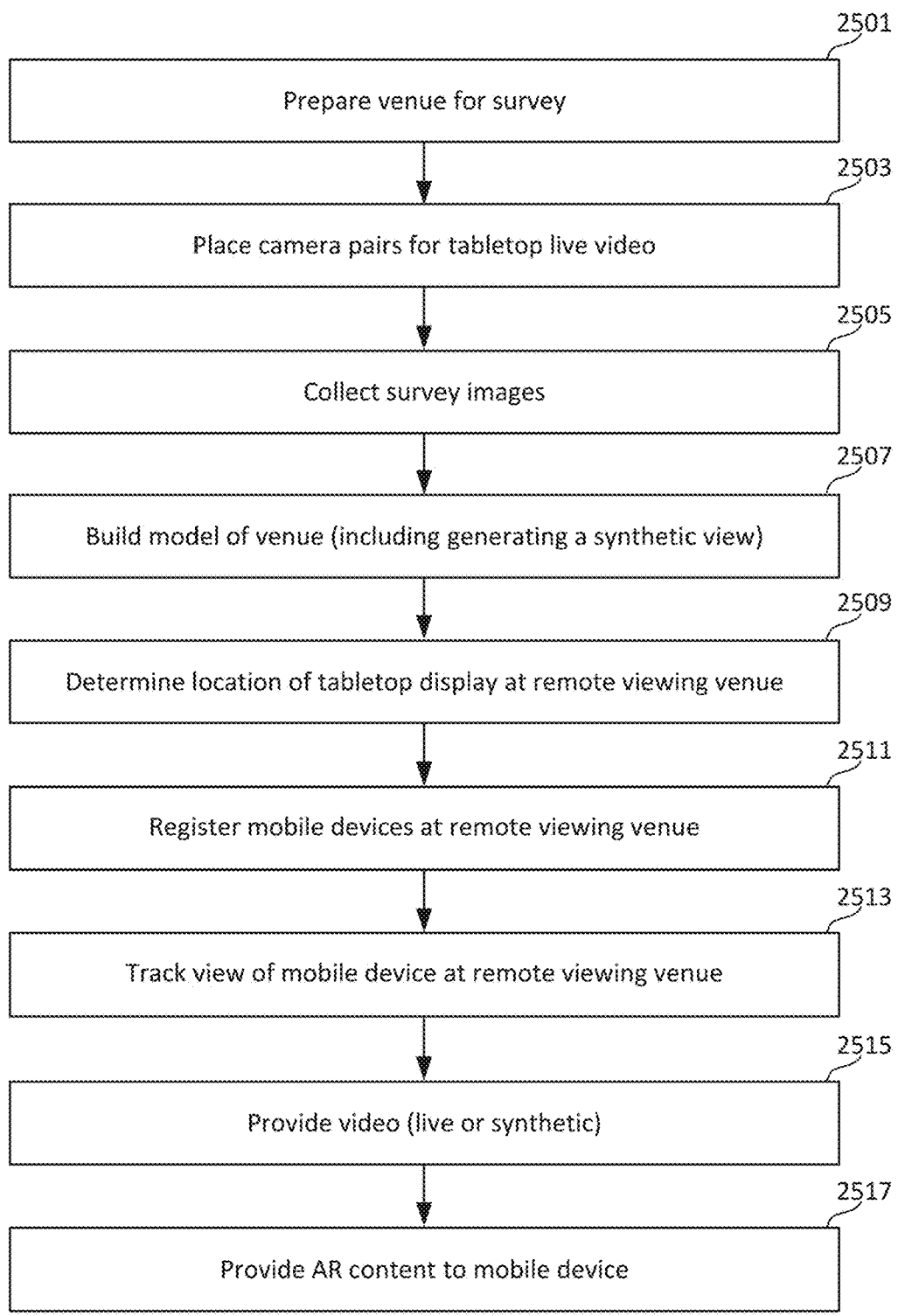
FIG. 25 is a high level flowchart for the operation of a tabletop embodiment.

FIG. 25 is a high level flowchart for the operation of a tabletop embodiment. As with the in-venue flow of FIG. 6, prior to an event a model of the venue is built. At step 2501 the venue is prepared for survey, at 2503 camera pairs are placed for the live video of the tabletop presentation, and the survey images collected at step 2505. Steps 2501 and 2505 can be as described above with respect to steps 601 and 603 and can be the same as these steps, with the process for in-venue enhanced viewing and the process for remote viewing being the same process. The camera pair placements of step 2503 can be made as described above with respect to camera pairs 2313-R,L and 2315-R,L of FIG. 23, where, in some embodiments, the camera pairs for providing video to the remote venues can also be used to collect survey images in step 2505. The 3D data from the camera pairs, and different pairs providing different views of the same region of interest, can extend the available data collected for the survey images.

At step 2507 a model of the venue is built in much the same way as described with respect to step 605, but now the data from the cameras for table live video placed in step 2503 can also incorporated into the registration and model building process. Step 2507 can also include building a model of the venue for a tabletop display if a synthetically generated video (instead of, or in addition to, live video from the cameras placed in step 2503) is to be included in the remote tabletop presentation. In the tabletop view such as 1830 or 1960, rather than being a display over a view of the venue as viewed through a head mounted display of the mobile device or on the display of the mobile device, in a tabletop presentation at a remote venue a representation of the venue (live video and/or synthetically generated video) is also presented as illustrated in FIGS. 21 and 22, with the AR graphics presented over the representation. When viewed with an augmented reality head mounted display 1823 or 1923, the venue's representation with graphics is displayed at a designed anchor location (i.e., a tabletop) within the remote venue.

At step 2509 a position for is determined for the where the tabletop view 1830/19604 is to be located when viewed by the head mounted displays is determined. This position can be determined by input from the view of the head mounted displays 1823/1923/2031 within venue, such as based on the location of a reference object placed at the anchor point 2160 as viewed through the AR headset, or by other user indication (e.g., pointing) with the field of view of the AR headset. At step 2511 the mobile devices (1821/1921, 1823/1923, 2021/2031) are registered similarly to step 607 of FIG. 6, but now the position of where the tabletop view 1830/1960 located from step 2509 is incorporated into the registration process. Tracking (similar to step 609) is performed at step 2513, both to accurately display the graphics, but also to maintain the tabletop presentation at its anchor location. The tracking of step 2513 can also be used to maintain a spatial synchronization of different views of the video provider to users at the remote venue who are viewing the tabletop presentation from different positions (e.g., from two different sofas placed at a right angle to each other). At step 2515 the video is provided to the viewer at the remote location, either live from the camera pairs or synthetically generated, and at step 2517 requested graphics are again provided to the views on their mobile devices. The request for and presentation of the AR graphic content at step 2517 can be as described above for the in-venue presentation. Although steps 2513, 2515, and 2517 are shown as separate steps in a particular sequence, the video of step 2515 and AR content of step 2517 will be going on concurrently and the tracking of step 2513 will also continue as content of steps 2515 and 2517 is received. The providing of the video at step 2515 is described in more detail with respect to FIGS. 26-29.

Figure 26:
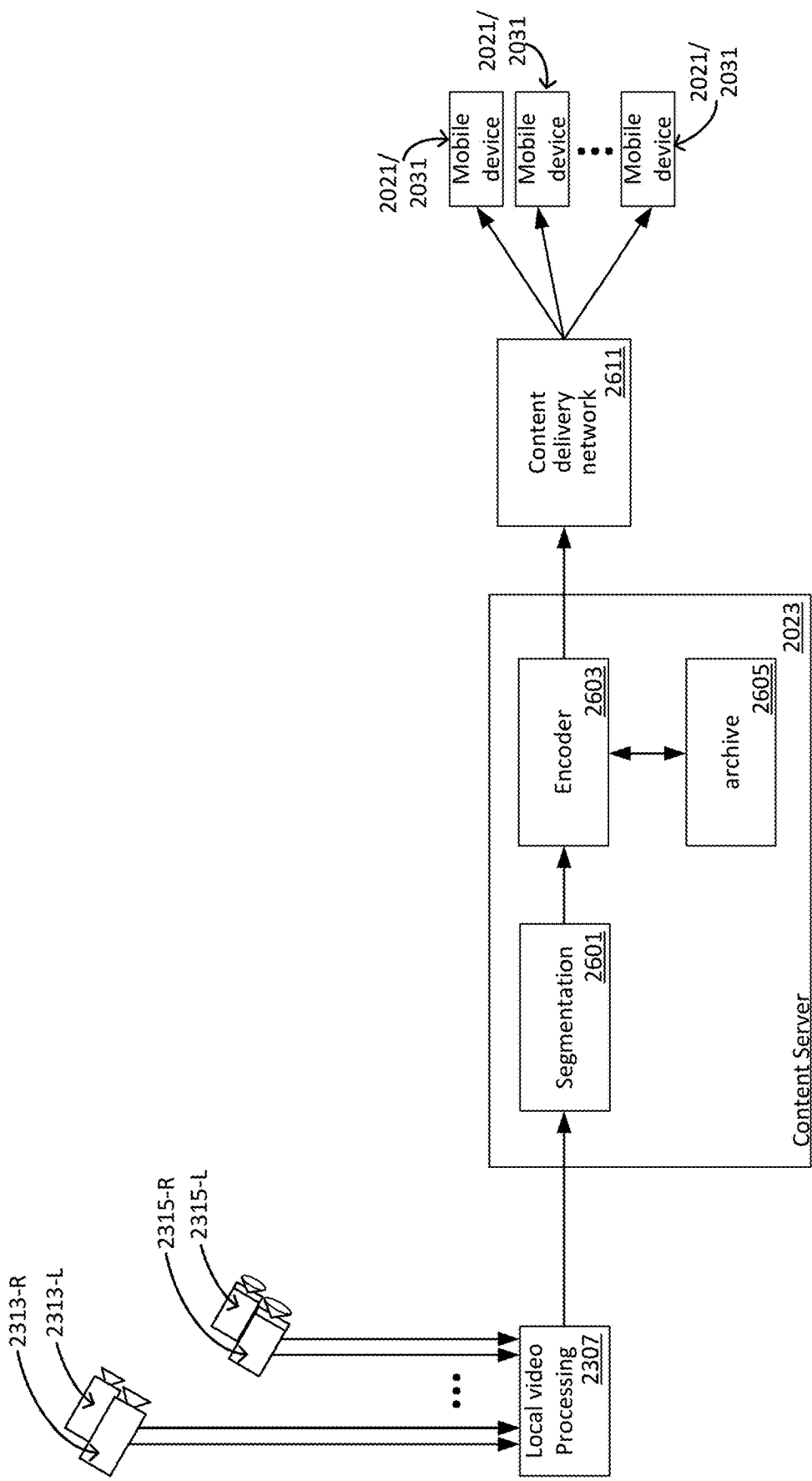
FIG. 26 is a block diagram illustrating an embodiment for providing the video from the camera pairs at a venue to viewers at a remote location.

FIG. 26 is a block diagram illustrating an embodiment for providing the video from the camera pairs at a venue to viewers at a remote location. The camera pairs, such as 2313-R, 2313-L and 2315-R/2315-L along with other pairs, can be placed at the venue as described above with respect to FIGS. 23 and 24 to provide the proper inclination and separation. The video from the cameras can be synchronized, so that they capture frames at the same time, and the frames time stamped, such as through use of precision time protocol (PTP) values received from GPS satellites. In one set of embodiments, the frames of video can be supplied to the local video processing 2307 in a serial data interface format using a 59.94 frames per second (FPS) video transmission standard for compatibility with broadcast content. At the local video processing 2307, such as a truck or in a structure at the venue, standard on-site processing can be performed, and in 3D presentation the video can be formatted as stereoscopic video in an internet protocol and transmitted to the content server at 60 FPS over the cloud or other transmission network to the content server 2023. The left and right images of the stereoscopic video can be encoded in the frames according to various embodiments. For example, corresponding right and left frames can encoded into a single frame for transmission, such as on the as being placed on the right and left (or left and right) portions of a single frame, or on the top and bottom portions of a single frame, with the correspond right and left frames of a pair then being extracted once received.

As with the in-venue presentation, depending on the embodiment, the content server 2023 can be one or more servers and can be distinct or share resources with the registration server 2011 and synch processor 2083. At the content server 2023, the video can go to a segmentation block 2601. As illustrated in FIG. 22, the tabletop presentation 2230 will show a region of interest, such as a golf green in this example, that is only a portion of the frames of video captured by a camera pair. This is achieved through segmentation. In digital image processing and computer vision, image segmentation is a process of partitioning a digital image into multiple segments (sets of pixels) in order to simplify and/or change the representation of an image into something that is more meaningful and easier to analyze. For example, using the example of FIG. 22, the image segmentation would locate the green and its boundaries (the lines and curves) with the frame, assigning labels to the pixels of in the image such that pixels with the same label share sets of characteristics. To improve the AR immersion when viewed through an AR headset, partial segmentation can be used. In partial segmentation, a geographic area of interest (e.g., the green) is masked out using basic pixel operations. Any objects of interest that extend outside of the masked area (such as the player 2281 of FIG. 22) can then be segmented out using machine learning, with the two composited together to generate the final segmented video for each camera.

After segmentation 2601, the video goes to an encoder 2603 to be encoded as, for example, a multi-bit rate internet protocol stereoscopic video format where, as discussed above, in the stereoscopic video format both the left and right image can be encoded into a single frame. The encoded stereoscopic video can also include "alpha", where an alpha channel is used to carry values used in the alpha compositing or alpha blending process of combining one image with a background to create the appearance of partial or full transparency. The encoder 2603 is also connected to an archive 2605 that can be used to store the video so that if, for example, a viewer would like to go back and look a replay of video of a portion of the event this video can be provided from the archive 2605. The archive 2605 can be a local memory, part of the content database 327, or some combination of these. The video is provided to the users over the internet or other content delivery network 2611 to be viewed with their mobile device 2021/2031. In the AR immersion as viewed through a head mounted display 2031, a 3D segmented view such as shown in the example of FIG. 22 can be provided to the viewer. In the case of a cell phone or other mobile device 2021 with a flat display screen, some embodiments can supply full (rather than segmented) frames of 2D video.

Figure 27:
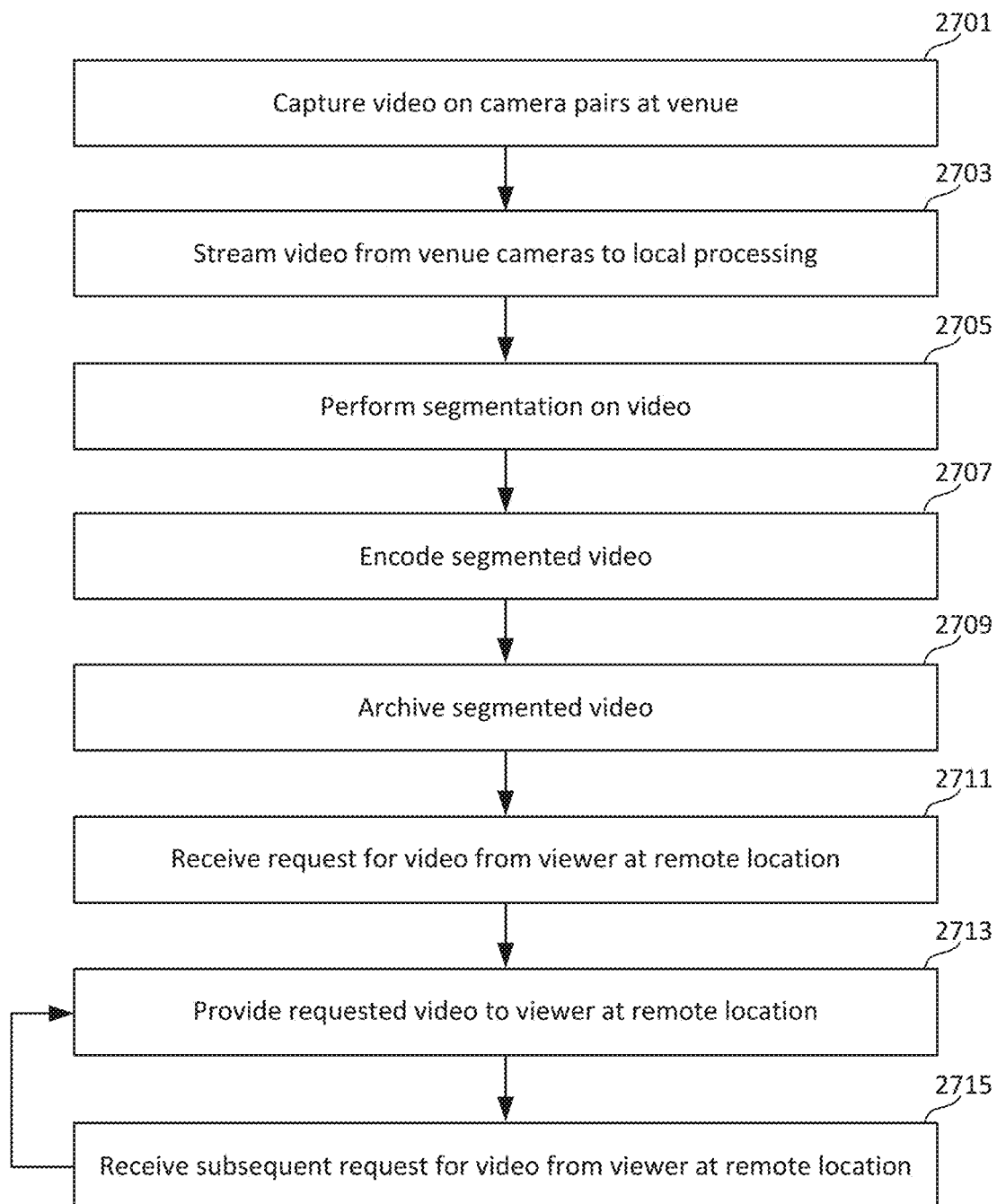
FIG. 27 is a flowchart for an embodiment for providing the video from the camera pairs at a venue to viewers at a remote location.

FIG. 27 is a flowchart for an embodiment for providing the video from the camera pairs at a venue to viewers at a remote location. Referring to the embodiment of FIG. 26, at step 2701 the previously positioned camera pairs (2313-R,L; 2315-R,L; . . . ) capture video and can stream it to the local video processing 2307, such as can be housed in a mobile facility or structure at the venue, at step 2703 over a serial data interface in 59.94 FPS format, for example. In step 2703 the video is converted into an internet protocol (IP), such as stereoscopic video at 60 FPS so that it can be sent over the cloud to processors and storage of the content server. Once the video is encoded into an IP based format, it can stay in an IP format for the rest of the process. Depending on the embodiment, some degree of additional processing, including segmentation, can be performed locally, but the local video processing 2307 may not have the needed processing ability to perform operations such as segmentation. As illustrated in the embodiment of FIG. 26, the encoded IP stereoscopic video is sent to the segmentation 2601 processing of the content server 2023 for segmentation.

Segmentation on the frames of video is performed at step 2705. In the segmentation process, a mask is created for the geographic area of interest of the venue, such as the green in the presentation 2230 in FIG. 22. Depending on the implementation, the masks can be created manually, using machine learning, or various combinations of these. Once the mask is determined for geographic area of interest, partial segmentation can be applied to determine masks for features within the primary mask, including features that extend beyond the primary mask, such as the upper torso of the player 2281 in the example of FIG. 22. In the partial segmentation process, a reverse mask can then be applied to the primary mask to remove such features, which can then be filled in and extend beyond the geographic area contained with the primary mask. As the video from the camera pairs is stereoscopic, it can be used to generate a depth map of the features within the area of interest and provide additional cues for the segmentation process, as can the views from different camera pairs recording the same area of interest.

The availability of the different views can consequently aid in the segmentation process, such as by tossing out objects that are too distant, and give keys to occlusion of views.

The encoder 2603 receives and encodes the segmented video at step 2707 into an IP based format with alpha and in multi-bit rates to accommodate different transfer rates to the end user for the stereoscopic video. The encoded video can then be stored in the archive 2605 at step 2709. At step 2711 the content server receives a request from a mobile device 2021/2031 for video content, where this can be live video or achieved video. The request can also specify information such as a bit rate for the IP stereoscopic video and a particular view if multiple views are available. The video is then provided to the viewer's device over the content delivery network at step 2713. If a viewer makes a subsequent request at 2715, say for a replay, a different view, or a return to live action, the flow loops back to step 2713 to provide the requested video.

Returning to FIG. 20, when viewing an event at a remote location on a television 2051 and also for viewers using a head mounted display 2031 or other mobile device 2021, the viewing experience can often be enhanced by synchronizing the video on the head mounted display 2031 or other mobile device 2021 with the video presented on the TV 2051. By "synchronized", this does not necessarily mean that the head mounted display 2031 or other mobile device 2021 is at always at the same presentation time since, for example, the viewer may request a replay or alternate view, but that the head mounted display 2031 or other mobile device 2021 will be able to coordinate its presentation with that of the TV 2051 by being at, or returning to, the same time point, present other viewers that relate to the presentation on the TV 2051, or introduce a delay into the viewing experience. In one set of embodiments, broadcast synchronization can be performed using perceptual hashing or other techniques so that the tabletop experience viewed through a head mounted display 2031 (or any additional AR viewing device) is synchronized with the user's primary viewing device (TV 2051). These aspects are discussed in more detail with respect to FIGS. 28 and 29.

Figure 28:
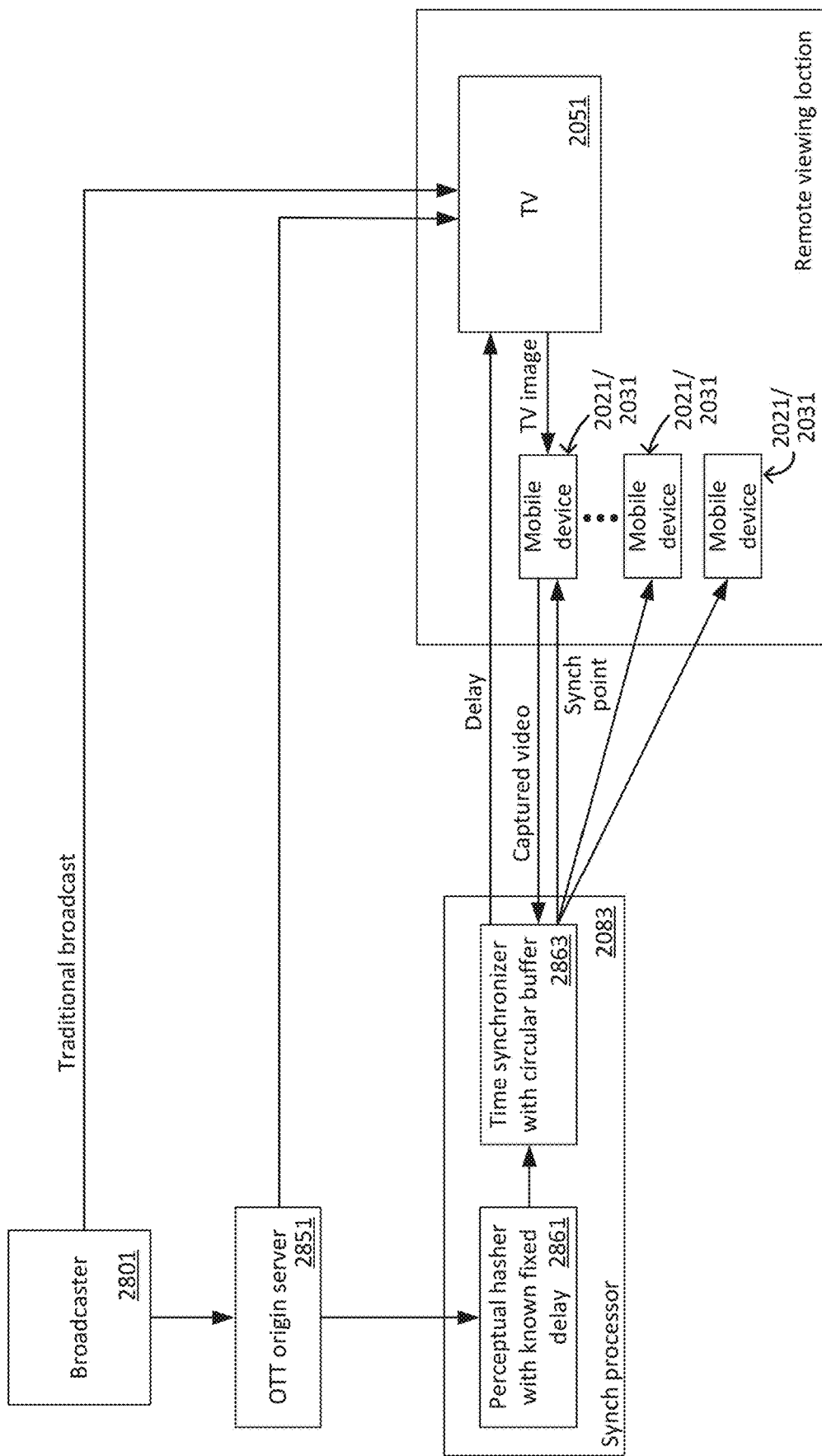
FIG. 28 is a block diagram for an embodiment of elements for the synchronization process.

FIG. 28 is a block diagram for an embodiment of elements for the synchronization process. The traditional television presentation at a TV 2051 in the remote venue can be based on a broadcaster 2081 of the event, such as from a network broadcaster like NBC, FOX, or other network that can provide the broadcast through a traditional broadcast channel, such as cable, satellite, or over-the-air, or by way of an over-the-top (OTT) origin server 2851 that can provide video as network broadcast IP video, for example. The AR head mounted displays 2031 or other mobile devices 2021 at the remote venue can also receive video from the in-venue camera pairs as described above with respect to FIGS. 26 and 27. The synchronization between what is presented on the TV 2051 and the AR content supplied to the AR head mounted displays 2031 or other mobile devices 2021, and between the different AR head mounted displays 2031 or other mobile devices 2021 at the remote venue, is performed by the synch processor 2083. The synch processor 2083 can be one or more processing units implemented as described above with respect to the computing system of FIG. 4 and, although represented as separate from the content server 2023 and registration server 2011 in FIG. 20, these elements can have overlapping resources and be implemented in the cloud.

As part of the synch processor 2083, a perceptual hasher 2861 with a known fixed amount of delay receives the broadcast video from the OTT origin server 2851, such as over the cloud as network broadcast IP video as is also provided to the TV 2051. The perceptual hasher 2861 forms a hash from pixels of the frames of video and supplies the hash, along with the delay value, to the time synchronizer 2863, where the hashes can be stored in a circular buffer for comparison with the captured video from the remote venue. In the embodiment of FIG. 28 the synchronization process is based on the video signals, but other embodiments could alternately or additionally base the synchronization on the audio portion of the signals.

At the remote viewing location, the broadcast for the event as received either by a traditional broadcast mechanism (e.g., cable, satellite, over-the-air) or by way of the over-the-top (OTT) server 2851 is displayed on the TV 2051. One or more of the AR head mounted displays 2031 or other mobile devices 2021 at the remote venue uses the device's camera to take a video of the content displayed on the TV 2051, where this can be a short, low-fidelity video capture using an app installed on the device. The app then sends the captured video over the cloud to the synch processor 2083 where the time synchronizer 2863 hashes the frames of captured video and compares it to the hashed video from the OTT origin server 2851 by searching the circular buffer for a match. The time synchronizer 2863 can then return a time synchronization point to the app of the AR head mounted displays 2031 and other mobile devices 2021 at the remote venue, both the device that sent the captured video and others at the remote viewing location so that they are synchronized in time with each other. As the app on each of the AR head mounted displays 2031 and other mobile devices 2021 at the remote venue now know the time differential between its content and that of the TV 2051, it can display the content from the content server 2023 at the same time point as on the TV 2051, coordinate other content it displays with the content displayed on the TV 2051 or the OTT origin server 2851, or offset the visuals as displayed on the AR head mounted displays 2031 and other mobile devices 2021 at the remote venue. Delays for coordinating with the display of the TV 2051 can also be introduced on a smart TV by an app installed on the TV 2051. As the AR head mounted displays 2031 and other mobile devices 2021 at the remote venue are synchronized in time, the users of these devices can share user experiences.

Figure 29:
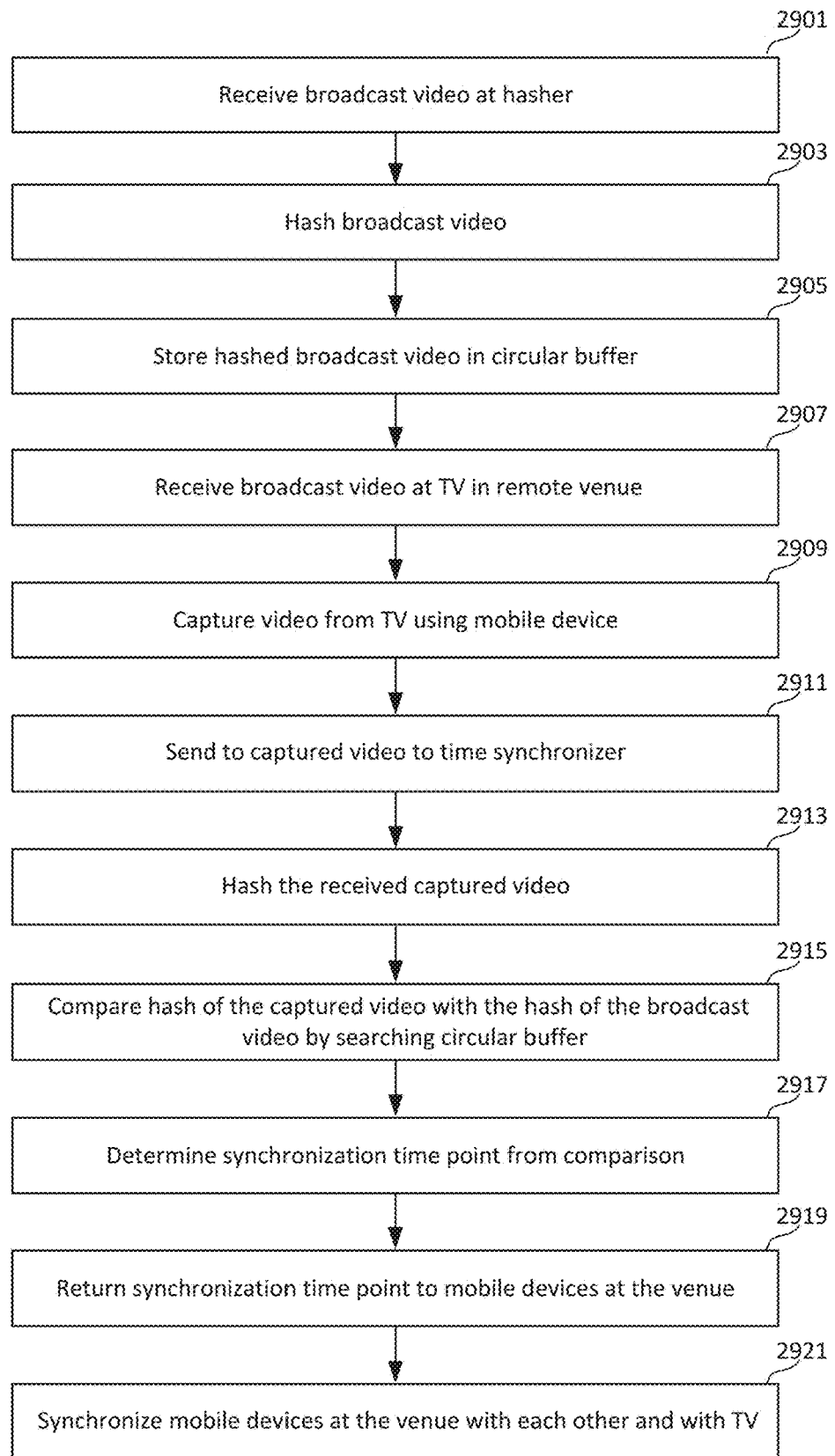
FIG. 29 is a flowchart for an embodiment of the time synchronization process for the AR head mounted displays and other mobile devices at the remote viewing location.

FIG. 29 is a flowchart for an embodiment of the time synchronization process for the AR head mounted displays 2031 and other mobile devices 2021 at the remote venue. Starting at step 2901, and referring to the embodiment of FIG. 28, the broadcast video is received at the perceptual hasher 2861 by way of the OTT origin server 2851. The broadcast video is then hashed at step 2903 by the perceptual hasher 2861 and stored in a circular buffer of the time synchronizer 2863 at step 2905. The broadcast video from the broadcaster 2801 is also received by the TV 2051 at the remote venue at step 2907, either by way of a traditional broadcast mechanism or by way of the OTT origin server 2851.

At step 2909 one or more of the AR head mounted displays 2031 and other mobile devices 2021 at the remote venue uses an app to capture video off of the TV 2051, where this can be a relatively short and low quality video and still meet the needs of the time synchronizer 2863. The captured video from the TV is sent to the time synchronizer at step 2911 and hashed at step 2913. In step 2915 the time synchronizer 2863 compares the hash of the video captured from the TV 2051 at the remote venue with the hash of the broadcast video received from the OTT origin server 2851 as stored in the circular buffer. After finding a match in the search, and accounting for the known fixed time delay from the perceptual hasher 2861, the time synchronizer 2863 determines a synchronization time point at step 2917. The time synchronizer 2863 returns the synchronization time point to the AR head mounted displays 2031 and other mobile devices 2021 at the remote venue. In some embodiments, if needed, an amount of delay can be sent to the TV 2051 to be issued by an app on a smart TV as part of step 2919 to be used as part of the synchronization process. Based on the synchronization time point, the AR head mounted displays 2031 and other mobile devices 2021 at the remote venue can synchronize with each other and also with the content on the TV 2051 at step 2921.

Figure 30:
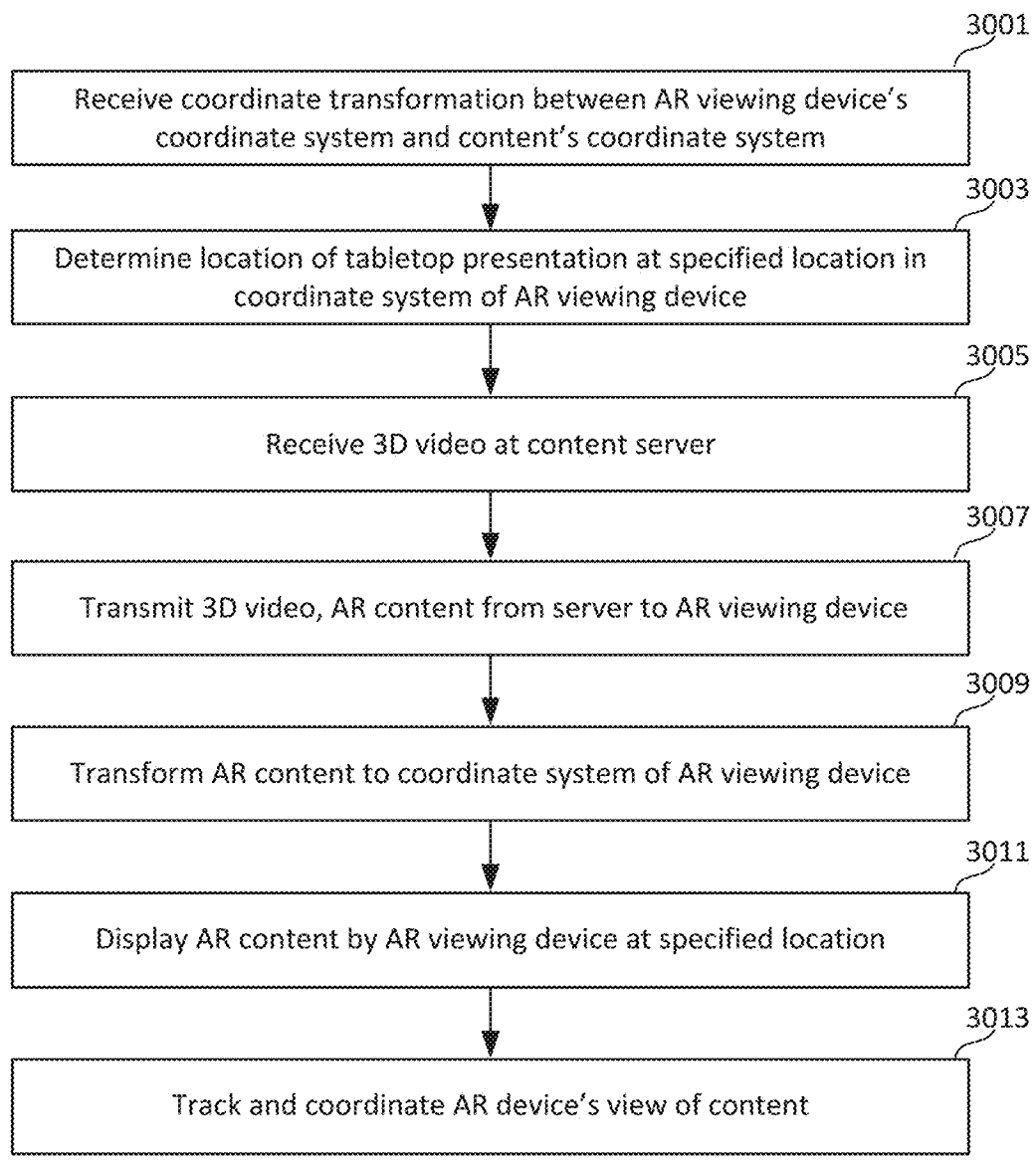
FIG. 30 is a flowchart for one embodiment of establishing and tracking the placement of a tabletop presentation as viewed through an AR headset or other AR viewing device for an immersive presentation.

FIGS. 26-29 focused on providing and synchronizing in time of the live video from the venue to the AR head mounted displays 2031 and other mobile devices 2021 at the remote venue, which is part of step 2515 of FIG. 25. The AR head mounted displays 2031 and other mobile devices 2021 at the remote venue can also be spatially synchronized, which is part of step 2513, as based on steps 2509 and 2511, of FIG. 25. FIG. 30 considers the tracking of step 2513 and its relation to the preceding and following steps of FIG. 25 in the context of FIG. 20.

FIG. 30 is a flowchart of an embodiment for establishing and tracking the placement of a tabletop presentation as viewed through an AR headset or other AR viewing device for an immersive presentation. Although the description here is in terms of a tabletop presentation at remote venue that is a different location from the venue where the event is occurring, the immersive presentation can also be used at the location of the event and is not limited to remote viewing locations. At step 3001, as part of the registration process the registration server 2011 provides the head mounted display 2031 or, more generally, other augmented reality viewing device a coordinate transformation between the device's coordinate system and the coordinate system of the content, both the stereoscopic video and 3D AR graphics to be displayed by the device. This can be as in the registration process described above for in-venue devices to display AR content in a real world coordinate system at the event's venue. If there are multiple augmented reality viewing devices at the remote venue, they can each receive their corresponding coordinate transformation and, if they are sharing the same tabletop presentation, the different devices can be spatially coordinated.

The location of the tabletop presentation in the coordinate system of the augmented reality viewing device is determined in step 3003. For example, the anchor location for the presentation can be specified by placing a reference object or by indicating manually, such as by pointing, within the field of view of the head mounted display 2031 or other augmented reality viewing device. If a suitable surface, either vertical or horizontal, is not available at the remote venue, a virtual tabletop can be generated as part of the AR content to provide a simulated tabletop. As described above with respect to FIGS. 23 and 24, in order to provide a 3D viewing experience the camera pairs 2313-R,L and 2315-R,L are arranged to provide a separation and a viewing angle φ relative to the horizontal. However, if there is not an actual surface at or near this angle, a virtual table standing on a real floor could be created, which could then be used as a virtual tabletop for the anchor surface for the AR video experience. If multiple augmented reality viewing devices are used at the location, to spatial synchronize the tabletop presentation for the different device the additional devices can also locate the anchor position in their field of view, where the additional devices can base their position on the determination of a first of the AR viewing devices (either by exchanging the information directly or by way of the registration server 2011), or a combination of these, depending on the embodiment.

At step 3005, the stereoscopic video from the cameras at the event's venue is received at the content server, as described above with respect to FIGS. 23-26. The video will be in the coordinate system used for the content, such as the real world coordinate system as described above for the registration process of FIGS. 13A and 13B. Requested 3D video, along with graphics and other AR content, is provided to the AR viewing device or devices at step 3007. The 3D video and other AR content provided by the content server can be requested directly by a viewer or automatically as part of the registration and tracking processes of steps 3001 and 3013. Different augmented reality viewing devices at the same location may receive the same or different views. For example, if two viewers at the same remote location at different positions, such as on sofas arranged at a right angle to each other, they could receive 3D video presentations taken by different camera pairs (e.g., 2313-R,L and 2315-R,L) to provide different, corresponding right angle views of the same location at the venue. In some embodiments, a remote viewer could also request different views in time (such as a replay) and location (such as switching to a different hole in a golf tournament). At step 3009 the augmented reality viewing device or devices convert the received video and other AR content into the devices' corresponding coordinate systems, after which it is displayed in the tabletop presentation at the specified location in step 3011.

At step 3013 the views of the content from the one or more augmented reality viewing devices is tracked and coordinated while presenting the video and other AR content. As discussed above with respect to FIG. 24, the incline and spacing of camera pairs at an event's venue are selected to mimic the expected viewing position of a viewer at the remote viewing location. Once the anchor position for the tabletop presentation is established, if the viewer moves too far from the corresponding viewing position, the right and left images of the 3D presentation at the anchor position may longer align properly to provide the proper 3D presentation for the viewer. In some embodiments, if the AR headset or other viewing device determines that the viewers position has changed far enough, such as the viewer's incline angle changing beyond a certain amount from the assumed incline angle φ if, for example, the viewer goes to a standing position, the anchor position could be shifted accordingly to a new, virtual anchor position. In other cases, if the viewer moves to a new viewing position, such as changing to a different seating position, the presented view of the event could be shifted to the video from a different camera pair, if available, to provide a change view of the event to correspond to the viewers change in viewing location at the remote viewing venue. If multiple AR viewing devices are being used at the remote venue, the spatial relationship between the different devices can also be tracked to maintain spatial synchronization between the devices, where, depending on the embodiment, this can be done locally by the devices exchanging signals, though the registration server, or a combination of these. The tracking can also include viewer input, such pointing within the field of view of the AR viewing device, to select graphics, request different view (either in space or time), and other features described above for the in-venue embodiments.

Considering now the presentation of AR graphics in a tabletop presentation, these can differ in presentation from those of an in-venue presentation as described above. For an in-venue presentation, the graphics are displayed over a view of the event provided by a camera on the device, as for mobile phone 121 or 221 of FIG. 1 or 2, or as viewed through the device, as in the example of an AR headset. As such, in the in-venue case, the graphics are contained with the frame of the view of the event. In a remote presentation as viewed through an AR headset of other immersive viewing device, the AR graphics can extend both beyond the segmented view, such as the view 2230 of the green in FIG. 22, but also beyond the frame of video from the which the segmented view was extracted. In FIG. 18, examples of this are illustrated by features such as player information at 1895 or the ball trajectory 1893 originating outside of the frame at 1891. This can also include graphics that cannot be contained within the same field of view of the AR viewing device concurrently with the segmented view of the event, such as a ball trajectory originating to the side or from behind a viewer that would require the viewer to turn their head sufficiently, such as would be the case for the shot trajectory 105 of FIG. 1 when provided as AR graphics for the tabletop presentation view of FIG. 22. This can be illustrated with respect to FIG. 31.

Figure 31:
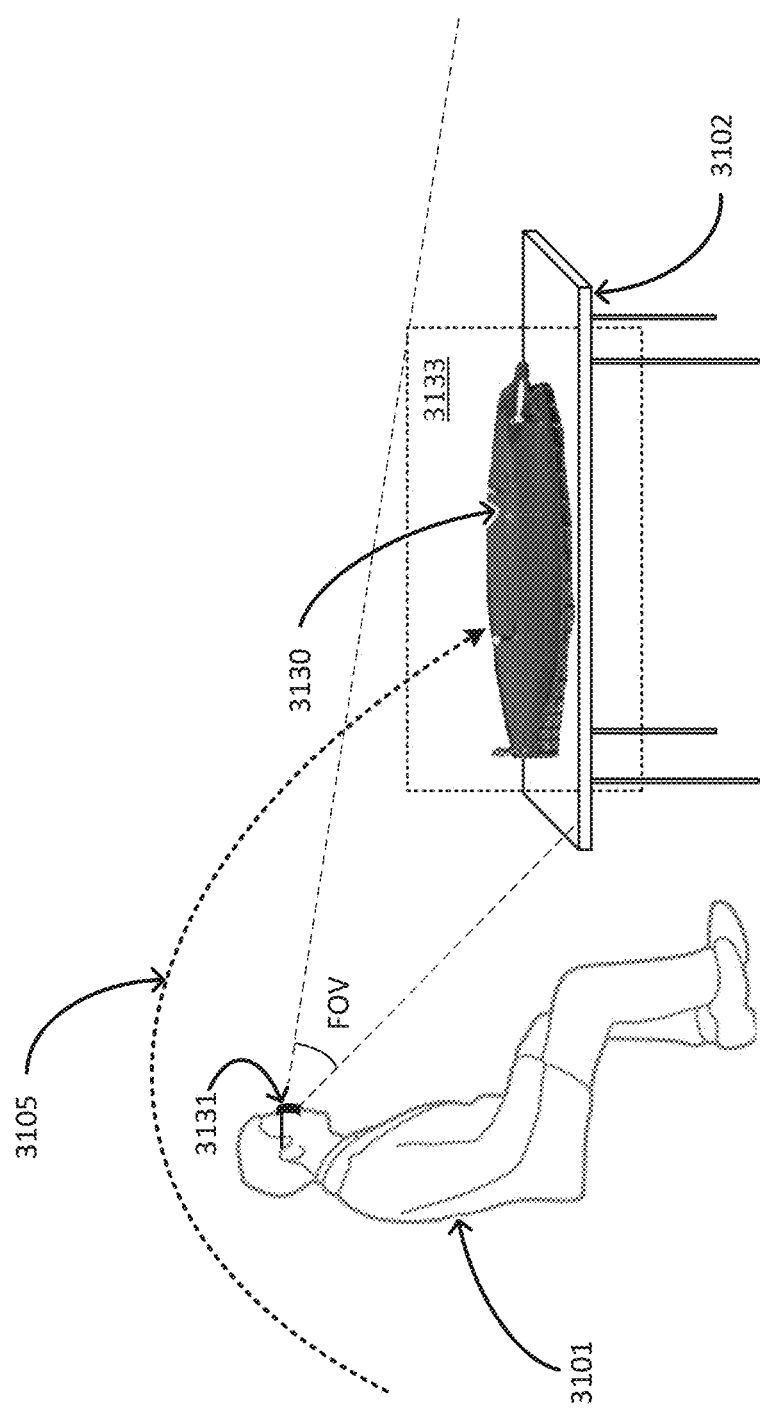
FIG. 31 illustrates a viewer watching a tabletop presentation including AR graphics that extend beyond the frame of the video.

FIG. 31 illustrates a viewer 3101 watching a tabletop presentation 3130 including AR graphics, such as dynamic content like the trajectory 3105, that extend beyond frame 3133 of the video. The viewer 3101 is at a remote venue viewing the tabletop presentation 3130 that is anchored at the table 3102, where the tabletop view 3130 is shown to be in the center of the field of vision FOV of the viewer 3101 through the viewer's AR headset 3131. As discussed above, the tabletop view 3130 is generated through a partial segmentation process from frames of video, where the frame of video from which the view is extracted is represented 3133. In addition to the video of the tabletop presentation 3130, AR graphics such as shown in FIGS. 18 and 19, are also provided for display over the tabletop presentation 3130 to the viewer 3101, of which only the ball trajectory 3105 is shown. AR graphics, such as the shot trajectory 3105, can provided from the content server (2023, FIG. 20) based on live data from the event's venue. The shot trajectory 3105 AR graphic can show the progression of the ball from the point of origin, that is outside of the frame 3133, to where it lands on the green, that is within the segmented tabletop presentation 3130. To watch the shot from the beginning of the trajectory 3105 the viewer 3101 would turn their head so that the tabletop presentation 3130 (and also the frame 3133) would no longer be in the field of view for the AR viewing device of the viewer 3101. These techniques can used to align the augmented reality graphics overlaying the 3D video within the frames of 3D video with the augmented reality graphics extending beyond the frames of 3D video, but can also be applied to AR content (e.g., video as well as graphics) within the frames, extending beyond the frame, or both: for example, the shot trajectory 3105 could be presented as graphics in the regions outside of the frames of video that aligns with video of the shot trajectory 3105 within the frames of video. As noted above, although the following discussion is primarily described in the context of a 3D presentation, embodiments can include both 3D presentations, such as through use of stereoscopic video viewed by a head mounted AR display device 1823, and also monoscopic presentations.

Figure 32:
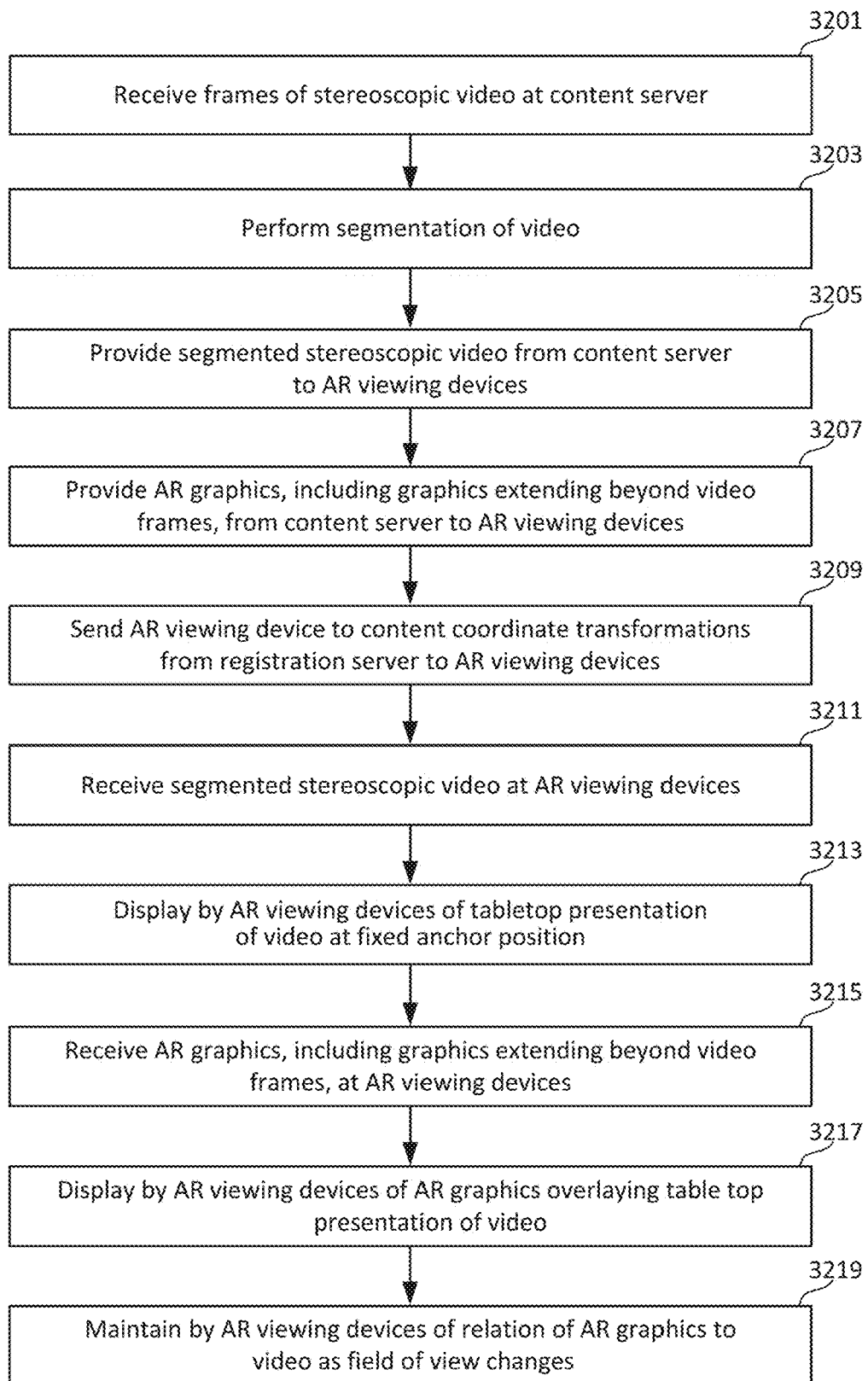
FIG. 32 is a flowchart for overlaying AR graphics in a tabletop video presentation in which the graphics can extend beyond the frame of the video.

FIG. 32 is a flowchart for overlaying AR graphics in a tabletop presentation in which the graphics can extend beyond the frame of the video. Beginning at step 3201 and referring to FIGS. 20 and 26, the frames of video are received from the camera pairs (2313-R,L and 2315-R,L) at the content server 2023. At the content server 2023, the frames of video undergo segmentation at step 3203 and is then provided to AR viewing device 3131 over content delivery network at step 3205. Steps 3201, 3203, and 3205 can be as described in more detail with respect to FIG. 27. At step 3207 the content server 2023 provides the AR graphics to the AR viewing device 3131 over the content delivery network 2611. The graphics can be as described above with respect to the in-venue embodiments, but can also extend beyond segmented view of the tabletop presentation video and also beyond the frames of video from which the tabletop presentation video was extracted. At step 3209 the registration server 2011 provides to the AR viewing device 3131 the coordinate transformation between the coordinate system of the AR viewing device 3131 and the coordinate system of the AR video and graphics content. With respect to the order of steps 3201, 3203, 3205, 3207, and 3209, step 3209 will be needed before AR content can be displayed on the AR viewing device 3131 and steps 3201, 3203, 3205, and 3207 will be ongoing as long as the AR viewing device 3131 continues to receive and display the content.

On the receiving side of the AR viewing device 3131, the stereoscopic video is received from the content server 2023 at step 3211 and displayed in a tabletop presentation as described above at the fixed anchor point in step 3213. The AR graphics content is received by the AR viewing device 3131 at step 3215 and displayed overlaid on the video at step 3217. The 3D video is generated by the processor on the AR viewing device 3131 by separating out the right and left frames of the segmented video and displaying these to the right and left eyes of the viewer, where the individual frames for each eye present the segmented image 3130 within the rectangular frame at the at the anchor position. The AR graphics, such as the trajectory 3105 are to be display accurately by the processor on the AR viewing device 3131 within the segmented video 3130 and its frame 3133 and accurately as it extends outside of the frame. At step 3219 the processor on the AR viewing device 3131 maintains the relation of the AR graphic overlay to the video as the field of view changes. For example, if the viewer 3101 were to look over the shoulder at the trajectory 3105, the segmented video 3130 would leave the field of view from the AR viewing device 3131 and later re-enter the field of view and the viewers head turned back so see where the trajectory ends. The AR viewing device 3131 maintains the continuity of relation of graphics to video as the elements enter and leave the field of view.

To maintain the relation of the graphics to video in step 3219, the processor of the AR viewing device 3131 receives the segmented video of the tabletop presentation 3130 in the content's coordinate's system, allowing it display to overlay the 3D graphics (such as the trajectory 3105) within the frame 3133. The graphics or video outside of the frame then can be aligned with the graphics or video within the frame 3133 at its boundary. A video camera within the AR viewing device 3131 can be used in a spherical mode to extend the rectangle 3133 into the spherical space of the coordinate system of the AR viewing device 3131.

According to one set of aspects, a method includes: receiving, by a first augmented reality viewing device, a coordinate transformation between a coordinate system of the first augmented reality viewing device and a coordinate system for augmented reality content to be displayed by the first augmented reality viewing device; determining, by the first augmented reality viewing device and in the coordinate system of the first augmented reality viewing device, a specified location within a field of view of the first augmented reality viewing device; and receiving, by the first augmented reality viewing device, augmented reality content, including video of an event at a venue, in the coordinate system for augmented reality content. The method also includes transforming, by the first augmented reality viewing device, the received augmented reality content to the coordinate system of the first augmented reality viewing device; and displaying the received augmented reality content by the first augmented reality viewing device at the specified location in the coordinate system of the first augmented reality viewing device.

In other aspects, a system includes one or more servers configured to receive data from and transmit data to one or more augmented reality viewing devices. The one or more servers are also configured to: receive video from a plurality of views of an event at an event venue in a first coordinate system; receive a request for video for a selected one of the views from a first augmented reality viewing device; provide to the first augmented reality viewing device the requested video from the selected view in the first coordinate system; and provide to the first augmented reality viewing device a coordinate transformation between the coordinate system of the first augmented reality viewing device and the first coordinate system.

Additional aspects include a method that comprises: receiving, at a system of one or more servers, video from a plurality of views of an event at an event venue in a first coordinate system; receiving at the system a request for video for a selected one of the views from a first of the augmented reality viewing devices; receiving at the system a request for overlay augmented reality graphics for the video from the first augmented reality viewing device; providing from the system to the first augmented reality viewing device the requested video from the selected view in the first coordinate system; providing from the system to the first augmented reality viewing device the requested overlay augmented reality graphics in the first coordinate system; and providing from the system to the first augmented reality viewing device a coordinate transformation between a coordinate system of the first augmented reality viewing device and the first coordinate system.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

We claim:

1. A method, comprising:
  receiving, by a first augmented reality viewing device, a coordinate transformation between a coordinate system of the first augmented reality viewing device and a coordinate system for augmented reality content to be displayed by the first augmented reality viewing device;
  determining, by the first augmented reality viewing device and in the coordinate system of the first augmented reality viewing device, a specified location within a field of view of the first augmented reality viewing device;
  receiving, by the first augmented reality viewing device, augmented reality content, including video of an event at a venue, in the coordinate system for augmented reality content;
  transforming, by the first augmented reality viewing device, the received augmented reality content to the coordinate system of the first augmented reality viewing device; and
  displaying the received augmented reality content by the first augmented reality viewing device at the specified location in the coordinate system of the first augmented reality viewing device.

2. The method of claim 1, wherein the first augmented reality viewing device is at a location remote from the venue of the event.

3. The method of claim 1, wherein the video of the event is three dimensional video and the augmented reality content further includes three dimensional graphics, wherein displaying the received augmented reality content at the specified location the coordinate system of the first augmented reality viewing device includes:
  displaying the three dimensional video of the event at the specified location in the coordinate system of the first augmented reality viewing device; and
  overlaying the three dimensional graphics over the three dimensional video.

4. The method of claim 1, wherein the video of the event is three dimensional video and the three dimensional video is received as frames of stereoscopic, each frame comprising a left image and a right image, wherein displaying the received augmented reality content includes:
  separating out the left image and the right image of each of the frames; and
  concurrently displaying the left image to a left eye of a viewer using the first augmented reality viewing device and displaying the right image to a right eye of the viewing.

5. The method of claim 1, further comprising:
  specifying the location within the field of view of the first augmented reality viewing device by a reference object within the field of view of the first augmented reality viewing device.

6. The method of claim 1, further comprising:
specifying the location within the field of view of the first augmented reality viewing device by manually indicating a location within the field of view of the first augmented reality viewing device.

7. The method of claim 1, further comprising:
determining a viewer using the first augmented reality viewing device has changed position; and
in response to determining that the viewer has changed position, changing the location at which the received augmented reality content is displayed.

8. The method of claim 1, wherein the first augmented reality viewing device receives the augmented reality content from one or more servers, the method further comprising:
determining a viewer using the first augmented reality viewing device has changed position; and
in response to determining that the viewer has changed position, requesting from the one or more servers video of the event with a different view of the event than previously received video of the event.

9. The method of claim 1, wherein the video of the event is monoscopic video.

10. A system, comprising:
one or more servers configured to receive data from and transmit data to one or more augmented reality viewing devices and to:
 receive video from a plurality of views of an event at an event venue in a first coordinate system;
 receive a request for video for a selected one of the views from a first augmented reality viewing device;
 provide to the first augmented reality viewing device the requested video from the selected view in the first coordinate system; and
 provide to the first augmented reality viewing device a coordinate transformation between the coordinate system of the first augmented reality viewing device and the first coordinate system.

11. The system of claim 10, the one or more servers further configured to:
perform segmentation on the received video, wherein the requested video provided to the first augmented reality viewing device is segmented.

12. The system of claim 11, wherein, to performing segmentation on the received video, the one or more servers further configured to:
mask out a portion of individual frames of the received video corresponding to a geographic area of interest within the individual frames;
determine objects of interest in the individual frames that extend outside of the masked out portion;
segment out objects of interest from the individual frames; and
composite the masked out portion and the segmented out objects of interest.

13. The system of claim 12, wherein masking out the portion of the individual frames includes a manual process.

14. The system of claim 12, wherein masking out the portion of the individual frames includes an automated process.

15. The system of claim 10, wherein the first augmented reality viewing device is at a location other than the event venue.

16. The system of claim 15, wherein the video is three dimensional (3D) video and the one or more servers further configured to:
provide to a second augmented reality viewing device the 3D video the event, wherein the second augmented reality viewing device is at the location other than the event venue;
provide to the second augmented reality viewing device a coordinate transformation between the coordinate system of the second augmented reality viewing device and the first coordinate system; and
provide to one or both of the first augmented reality viewing device and the second augmented reality viewing device information to coordinate display of the 3D video by the first augmented reality viewing device and the second augmented reality viewing device.

17. The system of claim 16, wherein the 3D video of the event provided to the second augmented reality viewing device is a different view of the 3D video of the event than the view of the 3D video of the event provided to the first augmented reality viewing device.

18. The system of claim 10, the one or more servers further configured to:
receiving at the system a request for overlay augmented reality graphics for the video from the first augmented reality viewing device; and
providing from the system to the first augmented reality viewing device the requested overlay augmented reality graphics.

19. A method, comprising:
receiving, at a system of one or more servers, video from a plurality of views of an event at an event venue in a first coordinate system;
receiving at the system a request for video for a selected one of the views from a first of the augmented reality viewing devices;
receiving at the system a request for overlay augmented reality graphics for the video from the first augmented reality viewing device;
providing from the system to the first augmented reality viewing device the requested video from the selected view in the first coordinate system;
providing from the system to the first augmented reality viewing device the requested overlay augmented reality graphics in the first coordinate system; and
providing from the system to the first augmented reality viewing device a coordinate transformation between a coordinate system of the first augmented reality viewing device and the first coordinate system.

20. The method of claim 19, further comprising:
masking out a portion of individual frames of the received video corresponding to a geographic area of interest within the individual frames;
determining objects of interest in the individual frames that extend outside of the masked out portion;
segmenting out objects of interest from the individual frames; and
compositing the masked out portion and the segmented out objects of interest for the individual frames, wherein the requested video provided to the first augmented reality viewing device are the composited individual frames.

* * * * *

UNITED STATES PATENT AND TRADEMARK OFFICE
CERTIFICATE OF CORRECTION

PATENT NO. : 12,244,782 B2  
APPLICATION NO. : 17/519121  
DATED : March 4, 2025  
INVENTOR(S) : Jayaram et al.

Page 1 of 1

It is certified that error appears in the above-identified patent and that said Letters Patent is hereby corrected as shown below:

In the Claims

Column 42, Line 5 (Claim 16, Line 5) please change "video the" to -- video of the --

Signed and Sealed this
Twenty-fourth Day of June, 2025

Coke Morgan Stewart
*Acting Director of the United States Patent and Trademark Office*